US010990371B2

United States Patent
Gutman et al.

(10) Patent No.: US 10,990,371 B2
(45) Date of Patent: Apr. 27, 2021

(54) DEVICE DRIVER NON-VOLATILE BACKING-STORE INSTALLATION

(71) Applicant: CrowdStrike, Inc., Irvine, CA (US)

(72) Inventors: Cameron Gutman, Redmond, WA (US); Aaron LeMasters, New York, NY (US); Ion-Alexandru Ionescu, Seattle, WA (US)

(73) Assignee: CrowdStrike, Inc., Irvine, CA (US)

( * ) Notice: Subject to any disclaimer, the term of this patent is extended or adjusted under 35 U.S.C. 154(b) by 117 days.

(21) Appl. No.: 16/248,551

(22) Filed: Jan. 15, 2019

(65) Prior Publication Data

US 2019/0220260 A1 Jul. 18, 2019

Related U.S. Application Data

(60) Provisional application No. 62/618,368, filed on Jan. 17, 2018, provisional application No. 62/618,413, filed on Jan. 17, 2018.

(51) Int. Cl.
*G06F 11/14* (2006.01)
*G06F 8/61* (2018.01)
(Continued)

(52) U.S. Cl.
CPC .............. *G06F 8/61* (2013.01); *G06F 9/4411* (2013.01); *G06F 9/44526* (2013.01);
(Continued)

(58) Field of Classification Search
CPC .............. G06F 11/1433; G06F 11/302; G06F 9/44526; G06F 9/4411; G06F 8/65; G06F 8/61
See application file for complete search history.

(56) References Cited

U.S. PATENT DOCUMENTS 6,658,489 B1 * 12/2003 Asselin ................ G06F 9/4411
709/221
7,216,344 B2 * 5/2007 Cobb ........................ G06F 8/61
717/174
(Continued)

FOREIGN PATENT DOCUMENTS

WO WO2006023685 3/2006

OTHER PUBLICATIONS

AnthonyUSIP et al., "K1000 Problem Deploying the Crowdstrike Falcon Sensor on our Client Machines Without User Interaction", Jul. 9, 2014, retrieved Jan. 10, 2019 from <<https://www.itninja.com/question/hi-i-m-trying-to-deploy-crowdstrike-falcon-sensor-on-our-client-machines-and-i-get-everything-right-however-it-pronts-the-users-to-hit-continue-and-i-don-t-want-any-user-interaction-if-possible>>, 3 pages.
(Continued)

*Primary Examiner* — Nadeem Iqbal
(74) *Attorney, Agent, or Firm* — Lee & Hayes, P.C.

(57) ABSTRACT

In some examples, a processing unit can install a second driver to an installed-driver backing store on a non-volatile (nonV) memory, and replace a first driver in a driver store of the nonV memory with the second driver without replacing the first driver in the volatile memory with the second driver. The processing unit can, subsequently, determine that the second driver has been loaded into the volatile memory, and write, by the second driver loaded into the volatile memory, a driver-configuration entry in a configuration datastore. An example computing system can include the first driver in volatile memory, and the nonV memory. The nonV memory can include a driver-configuration file, a driver store holding a first copy of the second driver, and an installed-driver backing store holding a second copy of the second driver. Some examples can roll back failed installation operations.

20 Claims, 16 Drawing Sheets

(51) Int. Cl.
G06F 9/445 (2018.01)
G06F 9/4401 (2018.01)
G06F 8/65 (2018.01)

(52) U.S. Cl.
CPC ............ *G06F 11/1433* (2013.01); *G06F 8/65* (2013.01); *G06F 2201/84* (2013.01)

(56) References Cited

U.S. PATENT DOCUMENTS

| | | | | |
|---|---|---|---|---|
| 7,979,869 | B2* | 7/2011 | Manczak | G06F 9/4411 719/327 |
| 8,464,238 | B1* | 6/2013 | Chakraborty | G06F 9/4411 717/168 |
| 8,582,139 | B2* | 11/2013 | Metz | G06F 9/4411 358/1.15 |
| 9,032,394 | B1 | 5/2015 | Shi et al. | |
| 9,256,440 | B1* | 2/2016 | Cattaneo | G06F 9/44505 |
| 2003/0037237 | A1 | 2/2003 | Abgrall et al. | |
| 2008/0034429 | A1 | 2/2008 | Schneider | |
| 2009/0089815 | A1* | 4/2009 | Manczak | G06F 9/45533 719/327 |
| 2014/0129846 | A1 | 5/2014 | Wang et al. | |

OTHER PUBLICATIONS

"Device Nodes and Device Stacks", Apr. 19, 2017, retrieved Dec. 26, 2018 from <<https://docs.microsoft.com/en-us/windows-hardware/drivers/gettingstarted/device-nodes-and-device-stacks>>, 8 pages.
"Driver Stacks", Apr. 19, 2017, retrieved Dec. 26, 2018 from <<https://docs.microsoft.com/en-us/windows-hardware/drivers/gettingstarted/driver-stacks>>, 5 pages.
"DriverEntry's Required Responsibilities", Jun. 15, 2017, retrieved Dec. 29, 2018 from <<https://docs.microsoft.com/en-us/windows-hardware/drivers/kernel/driverentry-s-required-responsibilities>>, 1 page.
The Extended European Search Report dated Jun. 12, 2019 for European Patent Application No. 19152042.8, 6 pages.
Ingebrigtsen, P., "How to Manage Updates in Falcon", Sep. 21, 2016, retrieved Jan. 10, 2019 from <<https://www.crowdstrike.com/blog/tech-center/update-falcon-sensor/>>, 7 pages.
Ionescu, A., "Bringing Call Gates Back", Aug. 7, 2017, retrieved Jan. 14, 2019 from <<http://www.alex-ionescu.com/?p=340>>, 10 pages.
"Meandering Through the Object Manager—How to Get from Create to a Target Device Object", The NT Insider, Mar. 16, 2005, vol. 12, Issue 2, 7 pages.
Microsoft, "Accessing and Modifying Files", Apr. 19, 2017, retrieved Jan. 2, 2019 from <<https://docs.microsoft.com/en-us/windows-hardware/drivers/install/accessing-and-modifying-files>>, 1 page.
Microsoft, "Avoiding System Restarts during Device Installation and Driver Updates", Apr. 19, 2017, retrieved Jan. 2, 2019 from <<https://docs.microsoft.com/en-us/windows-hardware/drivers/install/avoiding-system-restarts-during-device-installations>>, 2 pages.
Microsoft, "Changing Interfaces in a Backward Compatible Manner", May 30, 2018, retrieved Jan. 8, 2019 from <<https://docs.microsoft.com/en-us/windows/desktop/rpc/changing-interfaces-in-a-backward-compatible-manner>> 3 pages.
Microsoft, "Device Installations and System Restarts", Apr. 19, 2017, retrieved Jan. 2, 2019 from <<https://docs.microsoft.com/en-us/windows-hardware/drivers/install/device-installations-and-system-restarts>>, 1 page.
Microsoft, "Examples of Incompatible Changes" May 30, 2018, retrieved Jan. 8, 2019 from <<https://docs.microsoft.com/en-us/windows/desktop/rpc/examples-of-incompatible-changes>>, 1 page.
Microsoft, "INF DDInstall.HW Section", Apr. 19, 2017, retrieved Jan. 2, 2019 from <<https://docs.microsoft.com/en-us/windows-hardware/drivers/install/inf-ddinstall-hw-section>>, 4 pages.
Microsoft, "INF DelFiles Directive" Apr. 19, 2017, retrieved Jan. 2, 2019 from <<https://docs.microsoft.com/en-us/windows-hardware/drivers/install/inf-delfiles-directive>> 4 pages.
Microsoft, "INF Version Section" Apr. 19, 2017, retrieved Jan. 2, 2019 from <<https://docs.microsoft.com/en-us/windows-hardware/drivers/install/inf-version-section>> 6 pages.
Microsoft, "Step 1: The New Device is Identified", Apr. 19, 2017, retrieved Jan. 2, 2019 from <<https://docs.microsoft.com/en-us/windows-hardware/drivers/install/step-1--the-new-device-is-identified>>, 2 pages.
Microsoft, "Step 2 A Driver for the Device is Selected", Apr. 19, 2017, retrieved Jan. 2, 2019 from <<https://docs.microsoft.com/en-us/windows-hardware/drivers/install/step-2--a-driver-for-the-device-is-selected>>, 3 pages.
Microsoft, "Step 3: The Driver for the Device is Installed", Apr. 19, 2017, retrieved Jan. 2, 2019 <<https://docs.microsoft.com/en-us/windows-hardware/drivers/install/step-3--the-driver-for-the-device-is-installed>>, 2 pages.
Microsoft, "The Versioning Theory for RPC and COM", May 30, 2018, retrieved Jan. 8, 2019 from <<https://docs.microsoft.com/en-us/windows/desktop/rpc/the-versioning-theory-for-rpc-and-com>>, 1 page.
Microsoft, "Update Driver for Plug and Play Devices a Function", Dec. 4, 2018, retrieved Jan. 2, 2019 from <<https://docs.microsoft.com/en-us/windows/desktop/api/newdev/nf-newdev-updatedriverforplugandplaydevicesa>>, 4 pages.
Microsoft, "Updated Driver Files", Apr. 19, 2017, retrieved Jan. 2, 2019, from <<https://docs.microsoft.com/en-us/windows-hardware/drivers/install/updating-driver-files>>, 2 pages.
Microsoft, "Viewing Hidden Devices", Apr. 19, 2017, retrieved Jan. 2, 2019 from <<https://docs.microsoft.com/en-us/windows-hardware/drivers/install/viewing-hidden-devices>>, 2 pages.
"Registering for Device Notification", May 30, 2018, retrieved Dec. 28, 2018 from <<https://docs.microsoft.com/en-us/windows/desktop/devio/registering-for-device-notification>>, 11 pages.
Spero, Simon E., "Introduction to ASN.1 and the Packed Encoding Rules", Jan. 1, 2015, 3 pages.
Teng, C-L., "Enumerating Windows Device" Jun. 16, 2006, retrieved Dec. 26, 2018 from <<https://www.codeproject.com/Articles/14412/Enumerating-windows-device>>, 18 pages.
"Whats New for WDF Drives", Dec. 5, 2018, pp. 25-38, 41-45, 316-329, and 441-477.
The Extended European Search Report dated May 23, 2019 for European Patent Application No. 19152047.7, 6 pages.

* cited by examiner

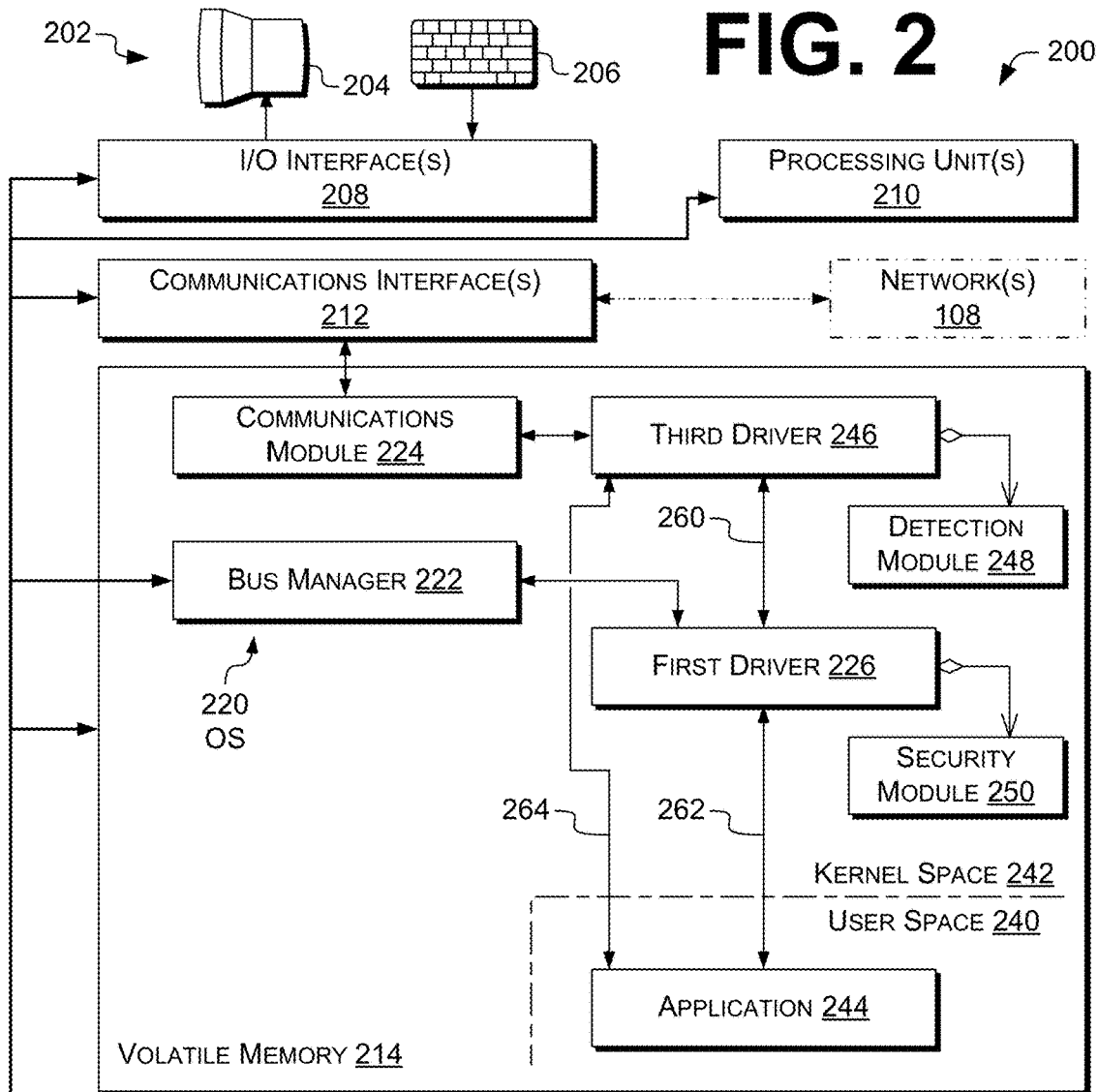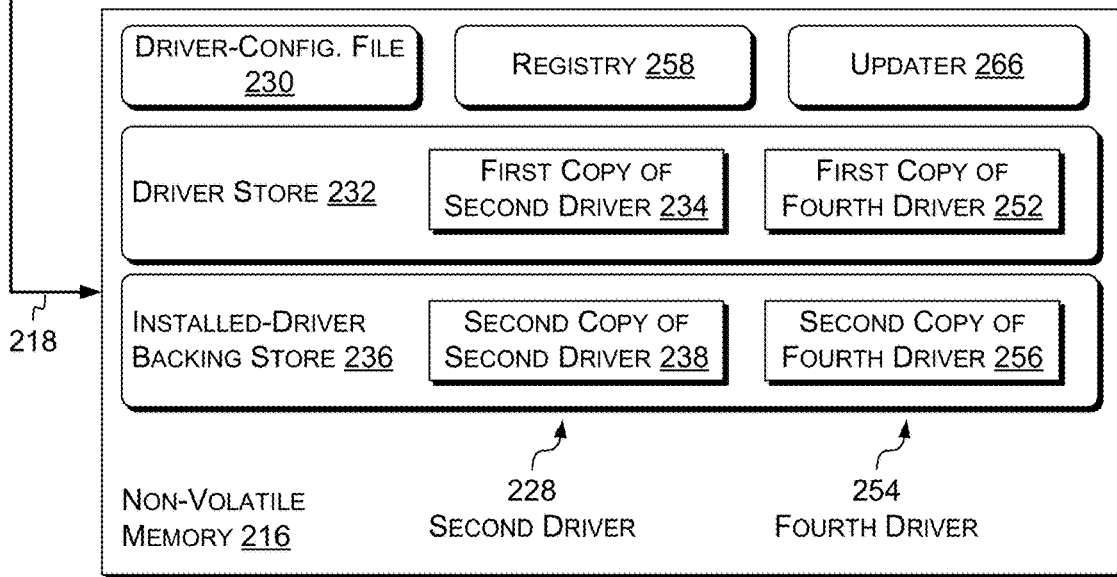
FIG. 2

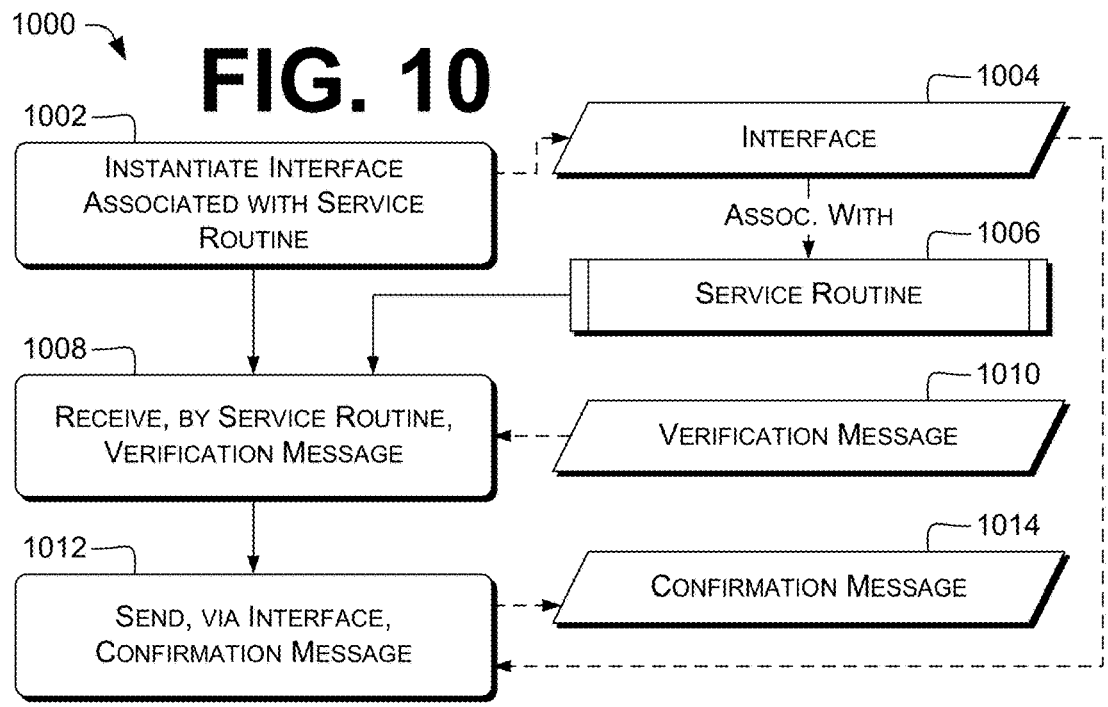
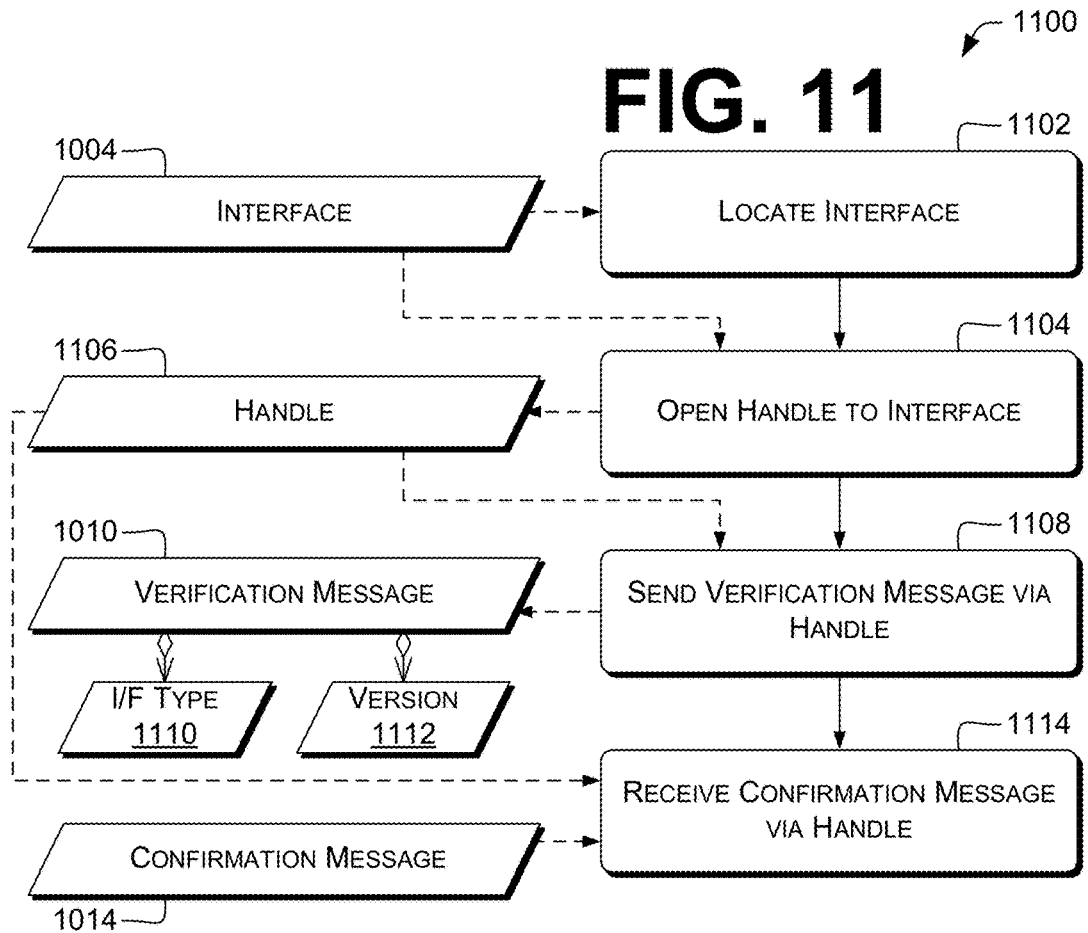

DEVICE DRIVER NON-VOLATILE BACKING-STORE INSTALLATION

CROSS-REFERENCE TO RELATED APPLICATIONS

This application is a nonprovisional application of, and claims priority to and the benefit of, U.S. Patent Application Ser. No. 62/618,368, filed Jan. 17, 2018, and entitled "Device Control Installation Technique," and is a nonprovisional application of, and claims priority to and the benefit of, U.S. Patent Application Ser. No. 62/618,413, filed Jan. 17, 2018, and entitled "Extensible Driver Interface," the entirety of each of which is incorporated herein by reference.

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, Trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

Many security exploits are delivered through devices on an enumerated bus, such as universal serial bus (USB) devices, or through devices, processes, or threads posing as such devices on an enumerated bus (e.g., loopback-mounted disk images). Other threats tied to devices on an enumerated bus include insider threats (e.g., stealing proprietary information) and insertion of a malicious or compromised device (e.g., on a laptop, by mistake or directly, by a malicious person). Security policies can be enforced with respect to enumerated-bus devices by drivers, e.g., function drivers for specific enumerated-bus device types or filter drivers that can be used with more than one enumerated-bus device type.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be included in the first component or operation.

FIG. 2 is a block diagram depicting an example computing device configured to participate in driver installation or operation or computer security according to various examples described herein.

FIG. 10 is a dataflow diagram that illustrates example techniques for providing an interface and communicating via the interface.

FIG. 11 is a dataflow diagram that illustrates example techniques for communicating via an interface.

DETAILED DESCRIPTION

Overview

Figure 1:
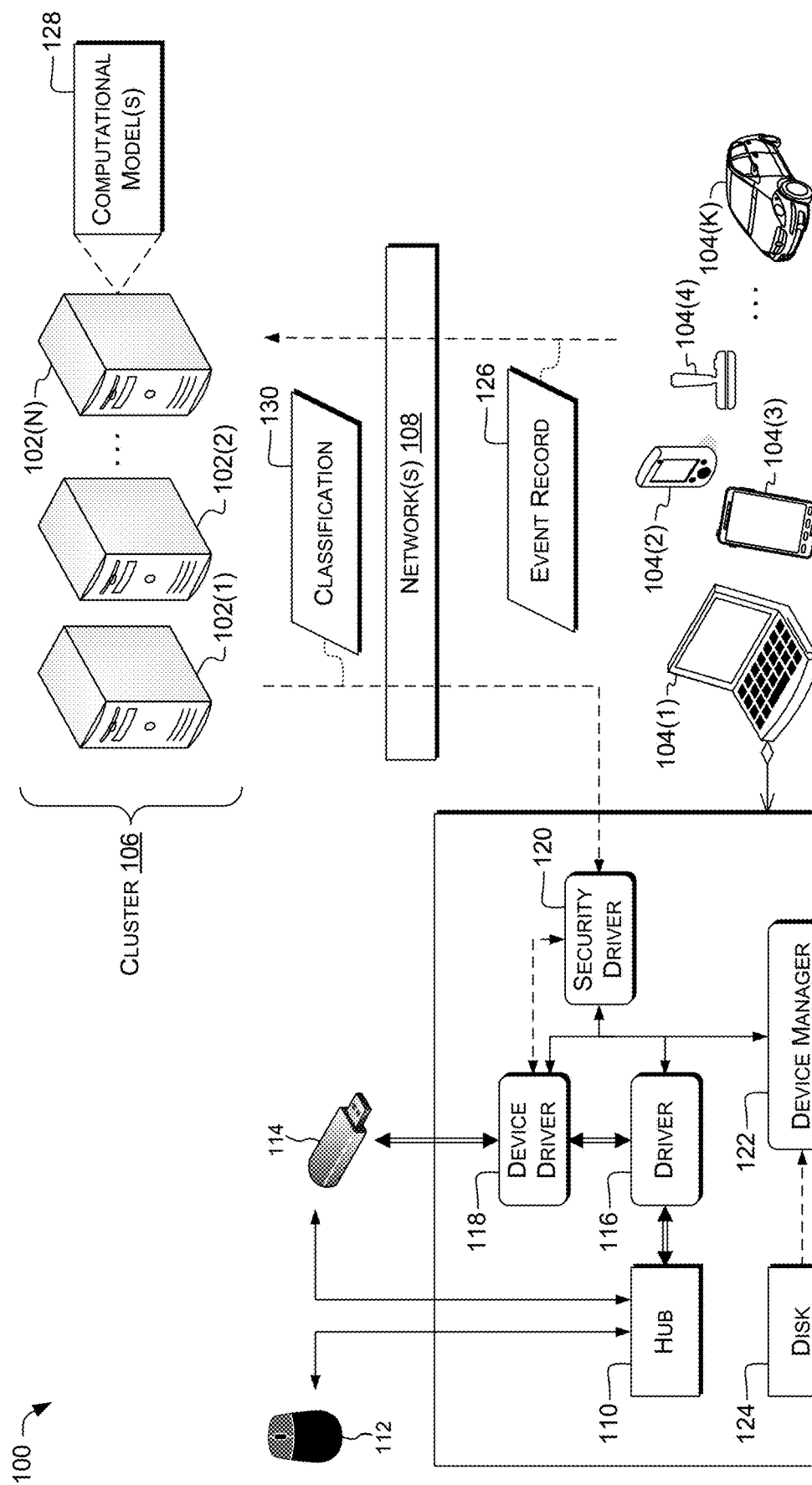
FIG. 1 is a block diagram depicting example scenarios for installing or operating device drivers as described herein.

In some examples, each of one or more monitored computing devices is equipped with a security agent (e.g., a service, driver, or daemon process) to monitor events on that device. Those monitored computing devices may be in communication with devices of a security service system, e.g., implemented using cloud technology. The security service system can filter and analyze events to detect threats or threat patterns. Threats may be introduced by enumerated-bus devices.

Some operating systems, such as MICROSOFT WINDOWS, operate enumerated buses or enumerated-bus devices using device drivers, such as Plug and Play (PnP) device drivers. However, the lifecycle of a PnP device driver (e.g., when the driver is loaded or unloaded) is controlled by the operating system (OS). Moreover, updating drivers requires OS support and, on WINDOWS, involvement. For example, some prior schemes using drivers on WINDOWS require a system reboot whenever a driver is updated. However, a security system may include multiple drivers, e.g., a PnP driver and a non-PnP security-agent device driver. Furthermore, on a modern, network-connected computer, may components of the system besides security drivers may receive updates—including the OS itself. There is therefore a need for ways of coordinating or staging updates to reduce the amount of computing-system downtime due to reboots. There is also an ongoing need, specific to computing technology, for techniques permitting computing-system administrators to coordinate updates of multiple components of a particular computing system.

Moreover, some prior schemes update security drivers or other computer-security components, and then reboot a system. Some of these schemes may provide reduced detection of, or protection against, cybersecurity threats during the time between the update and the reboot. There is therefore a need, unique to computer-security technology, to permit security drivers and other components to continue to protect a computing system after update operations have been performed and before the next reboot. There is a further need of ways of maintaining protection between update and reboot, even when multiple components are updated before a reboot.

Various examples relate to installing or updating a driver, e.g., a PnP driver, without triggering OS (e.g., WINDOWS 7 or later) interactions such as pop-up messages ("toasts") indicating that a reboot is required (e.g., "You need to restart your computer"). Various examples permit interfacing between PnP and non-PnP drivers with interface including versioning to reduce interruptions in functionality during upgrade and downgrade scenarios (i.e., updates that change the driver to a higher or lower version, respectively). Various examples permit installing a PnP driver without triggering notifications, and without negatively affecting a cooperating non-PnP driver. Accordingly, various examples permit updating multiple system components, and then performing a single reboot to cause all of the updates to take effect. This can permit more effective deployment and management of updates.

In some prior schemes, a PnP driver may be updated without a full-system reboot by restarting the physical device(s) served by that driver. However, this can result in those device(s) being unavailable during the device restart. There is, therefore, a need for ways of managing PnP driver updates that do not require device restarts other than during full-system reboots. As used herein, "reboot" refers to software- or user-initiated warm boots and software- or user-initiated cold boots (e.g., startups and shutdown+ startup sequences), unless otherwise indicated.

Moreover, multiple PnP or non-PnP device drivers or other software modules may be updated independently. Updating a module to a newer version may add capabilities to that module. However, other modules may still be expecting to interface with the older version. There is a need, therefore, for installation techniques that coordinate upgrades and downgrades of modules, as well as for communication techniques that permit software modules to communicate even across upgrades or downgrades of one of the modules.

Various aspects relate to interfacing a PnP driver with a non-PnP driver, e.g., a security agent implemented as a driver. PnP drivers, e.g., on WINDOWS, are controlled in part by the PnP manager's state machine. Various aspects permit establishing communication between such drivers and a consumer, e.g., other securi driver(s). Various aspects provide an interface ("I/F") that permits communication between modules of different versions or lifecycles by coordinating operations on queues, PnP notifications, or other mechanisms provided by an OS. Various examples operate even in the face of, e.g., surprise removal of a PnP device, or the security-agent driver unloading or updating on the fly while the interface is in use.

Various aspects relate to communication techniques an agent driver can use to communicate with a PnP driver (e.g., that provides control of enumerated-bus devices). Various embodiments are referred to for brevity, without limitation, as "ECL" (external component library). Various embodiments include a cross-platform, extensible communications library that a driver can use to expose multiple interfaces that use different technologies (for example, PnP) to a consumer (user or kernel). The ECL can be used with PnP (e.g., on WINDOWS), or other messaging technologies for WINDOWS or other OSes, including MACINTOSH or LINUX. For example, in addition to or instead of a PnP implementation, the ECL can provide a communications mechanism using Windows Device input/output (I/O) control (ioctl) I/O request packets (IRPs).

Some examples permit a non-PnP security-agent driver to communicate with a PnP enumerated-bus driver. The PnP driver attaches to device stacks of devices of an enumerated bus (also referred to herein as "enumerated-bus devices") of a computing device (e.g., as upper-device or lower-device filters) based on the device classes of the enumerated-bus devices. For example, the PnP driver may attach to the device stack of a hub or controller device as an upper-device filter and to device stacks of other devices as lower-device filters. While attaching or after attachment, the PnP driver may take action to alter, limit, or otherwise block functionality of an enumerated bus device, such as a USB device. The PnP driver may also perform a system inventory of enumerated-bus devices connected to the computing device and create fingerprints for one or more of the computing devices. For example, the PnP driver may collect information (e.g., USB VID/PID or other identifiers) of enumerated-bus devices connected or connecting to a computing device. In some examples, the security-agent driver is a PnP driver, e.g., a WDF or other root-enumerated PnP driver, as described herein with reference to FIG. 2.

Some examples provide coordinated installation or operation of a non-PnP (or root-enumerated PnP) security-agent driver and a PnP enumerated-bus driver, or other groups of software modules. Some examples roll back installation of one module if installation of another module fails. Some examples synchronize configuration data with a currently-running module independently of the timing of installation actions affecting that module.

In some implementations, in a decision phase prior to attachment to an enumerated bus device, the PnP driver may compare indicative features of a particular enumerated bus device to configuration policies of the PnP driver and may decide to alter, limit, block, or otherwise modify functionality of that enumerated bus device. Such configuration policies may include combinations of indicative features that form indicators of attack (IoA) associated with known security exploits or devices that contain known malicious firmware or firmware that is determined to be malicious based on static properties extracted from indicative features and/or behavioral properties extracted from inspection of data sent to/from the device. Upon determining that functionality of an enumerated bus device should be modified, the PnP driver stores an indication of the decision and may act upon it in one or more enforcement phases, as specified in configuration policy.

The PnP driver may receive configuration policy from the security-agent driver via an interface such as those described herein (e.g., interface 260 or 1004). The PnP driver may additionally or alternatively provide information of an enumerated-bus device to the security-agent driver via an interface 260, 1004, and receive decisions about whether to modify functionality of that enumerated-bus device. Additionally or alternatively, the security-agent driver may query the PnP driver via the interface for information about currently- or previously-attached enumerated-bus devices.

Additionally or alternatively, the security-agent driver may command the PnP driver via the interface to perform functions, such as power-cycling an enumerated-bus device.

As used herein, "enumerated-bus devices" include a broad range of device types, such as USB devices defined by the USB specification regardless of whether or not those device types are specifically classified as USB devices by the operating system of the computing device (e.g., printers or other devices that are associated with a device class other than a USB class).

Enumerated-bus devices may include, for instance, any internal or external devices on an enumerated bus. Example enumerated buses include, but are not limited to, USB, FIREWIRE, THUNDERBOLT 3, PCI EXPRESS, the SD card bus, and the PC Card (PCMCIA) bus.

In an enforcement phase, the PnP driver may alter, limit, or otherwise block the functionality of the enumerated bus device. Such altering, limiting, or blocking may occur during installation for the enumerated bus device, before its driver has been located, or after installation, during a device start for the enumerated bus device. In this latter case, the PnP driver attaches to the USB device as a filter in the device stack of the enumerated bus device. The PnP driver may then fail a device start command from a PnP manager, causing the device start to fail and the device stack for the enumerated bus device to be torn down. Other altering, limiting, or blocking techniques include altering installation strings or capability flags for the enumerated bus device; requesting powering off, disabling, or power cycling of the port for the enumerated bus device; returning a failure status for an add device routine; removing an identifier of the enumerated bus device from an enumeration of enumerated-bus devices; suspending the enumerated bus device by updating a state machine of a hub device; or taking any further action based on the configurable policies.

In some implementations, the PnP driver may also decide to alter, limit, or otherwise block an enumerated bus device after its installation and start based on analysis of traffic associated with the enumerated bus device. For example, the PnP driver, which may be attached to the device stack of the enumerated bus device, may generate traffic and transmit the traffic to the driver for that enumerated bus device. The PnP driver may then monitor the response, and if the response indicates that the enumerated bus device may be different from what it claims to be, the PnP driver may decide to alter, limit, or otherwise block functionality of the enumerated bus device or to monitor it further. The PnP driver may also communicate information determined through traffic analysis with a security agent via an interface 260, 1004 described herein.

In various implementations, the PnP driver may inventory the enumerated-bus devices connected to the computing device and provide that information to a security agent via an interface 260, 1004 described herein. Such an inventory may be provided in the form of a PnP device tree, for example. The information gathered while inventorying enumerated-bus devices may also be used to create a fingerprint for each enumerated bus device that may be used like a serial number to uniquely identify the enumerated bus device. Such gathered information may also be combined with information maintained by a remote security service to generate the fingerprints.

Throughout this document, "dirty" is used to refer to malicious behavior (e.g., any of the examples listed in the Background) or data associated with, produced by, representing, or indicative of malware, malicious behavior, or other security violations (e.g., activity by an advanced persistent threat adversary). "Clean" is used to refer to behavior or data that is not dirty. A "false detection" or "false positive" is a determination that behavior is malicious when, in fact, it is not. A "false miss" or "false negative" is a determination that behavior is not malicious when, in fact, it is. Various examples permit a security agent to more effectively collect data from other system components, which can reduce the occurrence of false detections or false misses. An example security agent is described in greater detail in U.S. patent application Ser. No. 13/492,672, entitled "Kernel-Level Security Agent" and filed on Jun. 8, 2012, which issued as U.S. Pat. No. 9,043,903 on May 26, 2015, incorporated herein by reference.

Some example techniques described herein refer to detecting and processing security-relevant information. However, installation, communications, and interfacing techniques described herein may also apply to other use cases, e.g., use by non-malicious software, processes, or other system components. In some examples, the described techniques are used to facilitate detection, and prevention of, malicious actions at a computer. Some examples use the described techniques for installation or communications in support of activities outside of the field of computer security. Some examples are described with reference to malware, but techniques described herein are not limited to files or events associated with malware.

As used herein, the term "unique identifier" and similar terms encompass both truly unique identifiers (e.g., Ethernet MAC addresses that are unique by construction, or Version 1 GUIDs or UUIDs) and identifiers with a negligible probability of collision (non-uniqueness) (e.g., SHA256 hashes of data uniquely identifying an object, or Version 4 UUIDs). As used herein, a "random" value can be a truly random value, e.g., measured from physical phenomena, or a pseudorandom value. Examples of random values include cryptographically-strong random numbers.

Illustrative Environment

FIG. 1 shows an example scenario 100 in which examples of installation techniques such as those described herein can be performed. Throughout this document, unless otherwise specified, "installation" refers to installing, uninstalling, repairing, or modifying system components such as software modules. Software modules can include, e.g., device drivers. Illustrated devices or components of scenario 100 include computing device(s) 102(1)-102(N) (individually or collectively referred to herein with reference 102), for integer N≥1, and computing devices 104(1)-104(K) (individually or collectively referred to herein with reference 104), for integer K≥1. In some examples, N=K; in other examples, N<K or N>K. Although illustrated as, e.g., desktop computers, laptop computers, tablet computers, or cellular phones, computing device(s) 102 or 104 can include a diverse variety of device categories, classes, or types and are not limited to a particular type of device.

In the illustrated example, computing device(s) 102(1)-102(N) can be computing nodes in a cluster computing system 106, e.g., a cloud service such as GOOGLE CLOUD PLATFORM or another cluster computing system ("computing cluster" or "cluster") having several discrete computing nodes (computing device(s) 102) that work together to accomplish a computing task assigned to the cluster as a whole. In some examples, computing device(s) 104 can be clients of cluster 106 and can submit jobs to cluster 106 or receive job results from cluster 106. Cluster 106 can implement a security service cloud or a remote security system.

In some examples, computing devices 102 or 104 can communicate via one or more network(s) 108, to participate in computer-security actions such as those described herein. For example, computing device 104(1) can be or include a monitored computing device or other data source owned or operated by or on behalf of a user, and computing device 102(1) can be a security service system, as described herein. A data source in a computing device 104(1) can provide to cluster 106 data of security-relevant events such as file installations, process launches, logins, or writes to system files. Additionally or alternatively, computing devices 104 can be data sinks and can receive from cluster 106 updates to blacklists or other security-relevant information. Network(s) 108 can include public networks such as the Internet, private networks such as an institutional or personal intranet, or combination(s) of private and public networks.

Computing device 104 can include an enumerated-bus hub 110, e.g., internal or external to the computing device 104. Hub 110 can be, e.g., a USB, FIREWIRE, or other hub. Hub 110 can be a root hub, a non-root hub, or a child hub connected to a root hub. Hub 110 may represent multiple connected hubs of the computing device 104. Hub 110 may include one or more external enumerated-bus ports for physically connecting to external enumerated-bus devices, such as a mouse 112, a thumb drive 114, a keyboard, a microphone, a display device, a speaker, a printer, a barcode reader, an image scanner, a webcam, a game controller, a light pen, a projector, or a digital camera. Any of these devices may include or be communicatively connectable with an enumerated-bus connector that couples with an enumerated-bus port of hub 110.

Hub 110 is controlled, in the illustrated example, by a driver 116. This relationship is depicted with a double-stroked arrow. Thumb drive 114 is controlled, at least in part, by a device driver 118 (a "device control" driver). The term "device driver" refers generically to drivers that are associated with a specific enumerated-bus device, e.g., a function device object (FDO) or filter device object (FiDO or filter DO). Device driver 118 communicates with a security driver 120. In some examples not shown, a non-driver is used instead of in addition to security driver 120. The lifecycle, installation, uninstallation, upgrading, or downgrading of drivers 116, 118, 120, is controlled at least partly by a device manager 122, which includes software modules configured to associate drivers with actual devices within or connected to computing system 104. Device manager 122 can load executable instructions of drivers 116, 118, 120 from disk 124 or another non-volatile medium into a random-access memory (RAM) for execution. In some examples, driver loading is performed by coordinated action of OS components described herein with reference to FIG. 2.

On WINDOWS, many drivers include at least three types of files. An INF file describes the attributes of the driver (e.g., driver 116 or 118), including the manufacturer, product name, product ID, and details on how to install the driver on the system. On some versions of WINDOWS that enforce driver signatures, a CAT file accompanies the INF file. The CAT file is digitally signed by the driver vendor to attest that the driver was produced by a legitimate vendor and has been certified. If the device needs additional binaries not included in Windows (e.g., service executables), SYS file(s) (or, for user-mode drivers, DLL file(s)) included in the driver package provide the functionality required to operate the new device. Together, all files required for driver installation make up the driver package. Some drivers additionally include, e.g., co-installer libraries (e.g., DLLs); libraries that implement user-mode APIs (e.g., graphics APIs such as DIRECTX or OPENGL); or applications (e.g., EXEs) that implement control panels or other configuration interfaces.

In the illustrated example, computing devices 104 transmit event records 126 (or other security-relevant information, and likewise throughout) to computing devices 102. Event records 126 can represent or describe activities detected at monitored computing device 104. Computing devices 102 filter and otherwise handle the event records 126 to determine whether events, processes, files, or other system components associated with the event records 126 or other security-relevant information are dirty or otherwise suspicious. For example, computing devices 102 can operate computational model(s), CM(s), 128, to determine a model output corresponding to event(s) on a monitored computing device 104. CM(s) 128 can include, e.g., neural networks, decision trees, regression models, or other models trained (in a supervised or unsupervised manner) to determine whether events or system components are dirty. The model output can include a classification 130, e.g., indicating whether the event(s) or related component(s) are dirty. In some examples, classification 130 is provided to computing device(s) 104. This can permit computing device(s) 104 to, e.g., take mitigation actions in the event of a security violation. Examples of mitigation actions are discussed in the following paragraph.

For example, computing device(s) 102 can use the CM(s) 128 to categorize an event or event sequence represented by an event record 126 with respect to association with malware or with a targeted attack. A computing device 104 receive a classification 130 from cluster 106 (e.g., upon request, or as a push notification) and take action based on classification 130. For example, the computing device 104 can terminate process(es), or delete or quarantine file(s), indicated by classification 130 as being dirty. Additionally or alternatively, the computing device 104 can reboot in order to remove dirty software or data from RAM. Additionally or alternatively, the computing device 104 can disable, block, reset, or otherwise alter or control the operation of enumerated-bus devices determined to be dirty, e.g., by adjusting driver behavior, or by causing hub 110 to power-cycle, power-limit, shutdown, or disconnect an enumerated-bus device (e.g., devices 112, 114). In the illustrated example, security driver 120 can receive classification 130 from cluster 106. Security driver 120 can then command device driver 118 (or driver 116) to affect the behavior of thumb drive 114.

In some examples example, the classification 130 includes a rational or real number (e.g., in floating- or fixed-point representation), a bitmask, an attribute list, a softmax output, or another representation of categories to which the event represented by or associated with an event record 126 belongs, as determined by CM(s) 128. For example, classification(s) 130 can include Boolean value(s) indicating whether or not corresponding event(s) are associated with security violation(s). Additionally or alternatively, classification(s) 130 can include enumerated value(s) indicating with which of several categories the analyzed event(s) are associated (e.g., "benign," "virus," or "spyware"). Classification 130 can additionally or alternatively include one or more confidence values or other values indicating the likelihood of a classification.

Except as expressly indicated otherwise, a determination of whether an event or system component is dirty is carried out programmatically, e.g., by or using CM(s) 128. Various examples herein can be performed without human judgment of whether a component, data stream, or event is in fact malicious. Using CM(s) 128 can permit more identifying potential computational threats, e.g., in the context of an antivirus program, cloud security service, or on-premises security appliance, more readily than in some prior schemes.

In some examples, a security service cloud (e.g., cluster 106) may aggregate and analyze information received from computing device(s) 104 (such as system inventories, enumerated bus device fingerprints, traffic information, user-login identifications, etc.) and may take actions, such as updating configurations of security agents, PnP drivers, or both, or sending commands to the computing devices to take some action (e.g., alter, limit, or otherwise block functionality of a device or process). The security service cloud may also participate in creating fingerprints for enumerated bus devices By way of example and not limitation, computing device(s) 102 or 104 can include, but are not limited to, server computers or blade servers such as Web servers, map/reduce servers or other computation engines, or network-attached-storage units (e.g., 102(1)), laptop computers, thin clients, terminals, or other mobile computers (e.g., 104(1)), wearable computers such as smart watches or biometric or medical sensors, implanted computing devices such as biometric or medical sensors, computer navigation client computing devices, satellite-based navigation system devices including global positioning system (GPS) devices or other satellite-based navigation system devices, personal data assistants (PDAs), or other specialized portable electronic devices (e.g., 104(2)), tablet computers, tablet hybrid computers, smartphones, mobile phones, mobile phone-tablet hybrid devices, or other telecommunication devices (e.g., 104(3)), portable or console-based gaming devices or other entertainment devices such as network-enabled televisions, set-top boxes, media players, cameras, or personal video recorders (PVRs) (e.g., 104(4), depicted as a joystick), automotive computers such as vehicle control systems, vehicle security systems, or electronic keys for vehicles (e.g., 104(K), depicted as an automobile), desktop computers, or integrated components for inclusion in computing devices, appliances, or other computing device(s) configured to participate in or carry out installation or communications as described herein, e.g., for file-analysis or malware-detection purposes.

Some cluster-based systems can have all or a portion of the cluster deployed in the cloud. Cloud computing allows for computing resources to be provided as services rather than a deliverable product. For example, in a cloud-computing environment, resources for computation, data manipulation, or other programmatically-controlled operations (e.g., resources such as processor cycles, disk space, RAM space, network bandwidth (uplink, downlink, or both), network connectivity, prioritized network channels such as those used for communications with quality-of-service (QoS) guarantees, backup tape space or mounting/unmounting services, electrical power, software, or information) are provided (for example, through a rental agreement) over a network, such as the Internet. Cloud resources can be provided for internal use within an organization or for sale to outside customers. In some examples, computer security service providers can operate cluster 106, or can operate or subscribe to a cloud service providing computing resources.

In other examples, cluster 106 or computing device(s) 102 can be deployed as a computing appliance operated by or on behalf of a particular user, group, or organization. For example, a corporation may deploy an appliance per office site, per division, or for the company as a whole. In some examples, the computing appliance can be a central, single-tenant, on-premises appliance. In some examples, a computing appliance can be used to implement at least one of the computing device(s) 102 in addition to, or instead of, a cloud service.

Network(s) 108 can include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Network(s) 108 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, network(s) 108 can also include a number of devices that facilitate network communications or form a hardware infrastructure for the networks, such as switches, routers, gateways, access points, firewalls, base stations, repeaters, backbone devices, and the like. Network(s) 108 can also include devices that facilitate communications between computing devices 102 or 104 using bus protocols of various topologies, e.g., crossbar switches, INFINIBAND switches, or FIBRE CHANNEL switches or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX.

As noted above, network(s) 108 can include public network(s) or private network(s). Example private networks can include isolated networks not connected with other networks, such as MODBUS, FIELDBUS, or Industrial Ethernet networks used internally to factories for machine automation. Private networks can also include networks connected to the Internet or other public network(s) via network address translation (NAT) devices, firewalls, network intrusion detection systems, or other devices that restrict or control the types of network packets permitted to flow between the private network and the public network(s).

Illustrative Configurations

FIG. 2 is an illustrative diagram that shows example components of a computing device 200, which can represent computing device(s) 102 or 104, and which can be or implement an installation, communications, or computer-security system, device, or apparatus, according to various examples described herein. Computing device 200 can include or be included in a system or device for preventing malicious activity by enumerated-bus devices as described herein. In some examples, computing device 200 can be or include at least a portion of a monitored computing device 104. In some examples, a computer-security system includes one or more computing device(s) 200 representing computing device(s) 102 and one or more computing device(s) 200 representing monitored computing device(s) 104.

Computing device 200 can include or be connected to a user interface 202. User interface 202 can include various types of output devices configured for communication to a user or to another computing device 200, such as a display 204 or a printer. User interface 202 can include a user-operable input device 206 (which can represent mouse 112, FIG. 1), such as a keyboard, trackball, touchscreen, or voice-input device.

Computing device 200 can further include one or more I/O interface(s) 208 to allow computing device 200 to communicate with input, output, or I/O devices (for clarity, some not depicted). Examples of such devices can include components of user interface 202 and enumerated-bus devices (such as thumb drive 114, FIG. 1).

The computing device 200 can include one or more processing units 210. Processing units 210 can be or include one or more single-core processors, multi-core processors, CPUs, GPUs, GPGPUs, or hardware logic components configured, e.g., via specialized programming from modules or APIs, to perform functions described herein. For example, processing units 210 can be or include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), or hybrid devices such as a FPGA fabrics with embedded central processing unit (CPU) cores.

The computing device 200 can also include a communications interface 212, which can include a transceiver or other network-interface device such as a network interface controller (NIC) to send and receive communications over a network 108 (shown in phantom).

Communications interface 212 can include any number of network, bus, memory, or register-file interfaces, in any combination, whether packaged together or separately. In some examples, I/O interface 208 and communications interface 212 are combined in one unit that performs at least some of the functions of each. Processing units 210 can be operably coupled to the I/O interface 208 and the communications interface 212.

The computing device 200 can also include at least one memory 214, 216, e.g., a RAM, cache, or computer-readable medium (CRM) such as a tangible, non-transitory CRM. Processing units 210 can include or be operably coupled to memory 214, 216. Memory 214, 216 can store instructions executable by the processing units 210, or instructions executable by external processing units such as by an external CPU or external processor of any type discussed herein. Any of these instructions are referred to herein as "executable," "computer-executable," or "processor-executable" instructions. In the illustrated example, memory 214 is a volatile memory, e.g., a RAM such as a dynamic RAM (DRAM) or static RAM (SRAM) (e.g., a processor cache), or another high-speed memory from which processing units 210 may fetch instructions for execution. In the illustrated example, memory 216 is a non-volatile memory, e.g., a Flash drive or hard-disk drive (HDD), storing executable instructions or other data in a manner permitting the stored data to persist across reboots of computing device 200, or when computing device 200 loses power. For brevity and clarity herein, the term "nonV" is used as an abbreviation for "non-volatile."

In some examples, a "control unit" as described herein includes processing units 210. A control unit can also include, if required, memory 214, 216. For example, a control unit can include a CPU or DSP and a computer storage medium or other tangible, non-transitory computer-readable medium storing instructions executable by that CPU or DSP to cause that CPU or DSP to perform functions described herein. Additionally or alternatively, a control unit can include an ASIC, FPGA, or other logic device(s) wired (e.g., physically, or via blown fuses or logic-cell configuration data) to perform functions described herein. In some examples of control units including ASICs or other devices physically configured to perform operations described herein, a control unit does not include computer-readable media storing computer-executable instructions.

In some examples, communications interface 212 can include a memory bus internal to a particular computing device 102 or 104, "transmitting" or "providing" data via communications interface 212 can include storing the data in volatile memory 214, and "receiving" via communications interface 212 can include retrieving data from volatile memory 214. In some examples, communications interface 212 can include a datapath providing a connection to a register file within a processing unit. For example, a first software module can load parameters into the register file via the datapath, and then and issue a function call to a second software module. The second software module can retrieve the parameters from the register file and return a result via the register file.

In some examples, the processing units 210 can access module(s) (e.g., drivers) or other instructions or data in memory 214 or 216 via a bus 218. I/O interface 208 and communications interface 212 can also communicate with processing units 210 via bus 218. Bus 218 can include, e.g., at least one of a system bus, a data bus, an address bus, a Peripheral Component Interconnect (PCI) Express (PCIe) bus, a PCI bus, a Mini-PCI bus, any variety of local, peripheral, or independent buses, or any combination thereof.

Computer-readable media described herein, e.g., memory 214, 216, includes computer storage media and communication media. Computer storage media includes tangible storage units such as volatile memory, non-volatile memory, or other persistent, non-transitory, or auxiliary computer storage media, removable and non-removable computer storage media implemented in any technique or technology for storage of information such as computer-readable or -executable instructions, data structures, program modules (e.g., drivers), or other data. Computer storage media includes tangible or physical forms of media included in a device or hardware component that is part of a device or external to a device, including but not limited to RAM, SRAM, DRAM, phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by a computing device 200.

In contrast to computer storage media, communication media can embody computer-readable or -executable instructions, data structures, program modules (e.g., drivers), or other data in a modulated data signal, such as a carrier wave, or other transmission mechanism. As defined herein, computer storage media does not include communication media.

In the illustrated example, memory 214 is a volatile memory comprising at least one tangible, non-transitory volatile computer-readable medium, e.g., at least one volatile computer storage medium. In the illustrated example, memory 216 is a nonV memory comprising at least one tangible, non-transitory non-volatile computer-readable medium, e.g., at least one nonV computer storage medium.

Volatile memory 214 can store instructions of an operating system 220. Operating system 220 can include a bus manager 222 (e.g., on WINDOWS, the PnP manager or a subsystem including the PnP manager) and a communications module 224. Bus manager 222 can support PnP functionality for the OS 220, and may be part of OS 220 or a separate, interfacing component. The bus manager 222 is responsible for PnP device detection and enumeration during a boot phase of the computing device 200 or of attached PnP devices (e.g., enumerated-bus devices) and for adding/removing PnP device drivers while the system is running. PnP devices include enumerated-bus hosts or devices, such as hub 110, mouse 112, or thumb drive 114. Bus manager 222 accordingly manages and interfaces with such devices.

Some examples use the WINDOWS DRIVER FOUNDATION (WDF) framework for at least one of the drivers 226, 228, 246, 254. For example, third driver 246 can be a root-enumerated PnP driver (e.g., loaded using WDF mechanisms) instead of a WINDOWS DRIVER MODEL (WDM) or other non-PnP driver. The third driver 246 can be attached to the WDF root bus, which generally does not correspond directly with particular enumerated-bus hardware, but which is considered an enumerated bus for purposes of this application. Root-enumerated PnP drivers can be user-mode or kernel-mode drivers.

Communications module 224 may operate communications interface 212, e.g., to send event records 126 or receive classifications 130, or to otherwise transfer security-relevant information via network 108. In some examples, communications interface 212 can be a PnP device, and communications module 224 can interact with bus manager 222 to carry out communication functions.

Volatile memory 214 can store instructions of a first driver 226. NonV memory 216 can store instructions of a second driver 228. In some upgrade scenarios, the first driver 226 comprises an earlier version of a particular driver, and the second driver 228 comprises a later version of the particular driver. In some downgrade scenarios, the second driver 228 can comprise the later version, and the first driver 226 the earlier version. The second driver 228 can differ from the first driver 226.

NonV memory 216 can store a driver-configuration file 230, e.g., a WINDOWS INF file or other file including data for configuring the second driver 228. For example, driver-configuration file 230 can store information (such as a USB VID and PID) indicating which PnP device(s) are associated with first driver 226 or second driver 228.

NonV memory 216 can include a driver store 232. Driver store 232 can be, e.g., the WINDOWS driver store or another staging area into which drivers can be loaded. Bus manager 222 can access drivers from driver store 232, e.g., when a new PnP device is connected. Driver store 232 can hold a first copy 234 of second driver 228. In some examples, such as WINDOWS, the first copy 234 can be staged for installation after a reboot of computing device 200. In some examples, driver loading involves various subsystems of OS 220, e.g., the PnP manager (bus manager 222), an I/O manager, and a memory manager.

NonV memory 216 can include an installed-driver backing store 236, e.g., c:\Windows\system32\drivers on WINDOWS, or another location where drivers, dynamically-loadable kernel modules, or similar modules may be stored. In some examples, backing store 236 includes a copy of any drivers that are presently installed and loaded into volatile memory 214.

In some prior schemes implemented in WINDOWS, a PnP manager handles the installation of PnP drivers. When installing a new driver, it copies the driver files from the source media to a driver store, where the files are staged for new devices to use. During installation, the system also creates registry entries, e.g., under the Services registry key. These entries determine when the driver is loaded during system startup, where the SYS file resides, and what to do if the driver fails to load. After installing the service, the PnP manager associates the new service with the target device by creating the Service value under the Enum registry key for the target device. It also stores any associated device properties specified in the INF file.

Unlike these or other prior schemes, in the illustrated example, backing store 236 includes a second copy 238 of the second driver 228. Loading backing store 236 with second copy 238 can permit staging second driver 228 for installation on the next reboot without triggering reboot requirements of some OSes, e.g., WINDOWS. Examples are discussed herein, e.g., with reference to operation 714. Also unlike some of these prior schemes, as discussed below, various examples do not create at least some registry keys until a new (e.g., updated) driver actually loads.

In some examples, bus manager 222 may activate first driver 226 when an enumerated-bus device is connected to computing device 200. For example, the bus manager 222 may call the DriverEntry( ) and AddDevice( ) routines of any PnP device driver (including enumerated-bus device drivers), e.g., first driver 226 in this example. Bus manager 222 may send a start-device command (e.g., IRP_MJ_PNP/IRP_MN_START_DEVICE) to PnP device drivers (including drivers for enumerated-bus devices). The bus manager 222 may also build and maintain a PnP device tree of PnP devices on the computing device 200 based on information received from drivers of those PnP devices. The bus manager 222 may deactivate first driver 226 when the enumerated-bus device is disconnected from computing device 200, e.g., by sending a remove-device command (e.g., IRP_MJ_PNP/IRP_MN_REMOVE_DEVICE) to corresponding PnP device driver(s).

As shown, volatile memory 214 or contents thereof can be divided into user space 240 and kernel space 242. For example, RAM can be divided into a portion (user space 240) accessible to code running in a user mode of processing units 210 and a separate portion (kernel space 242) not accessible to (or, in some examples, at least partly not writeable by) code running in the user mode. For example, kernel space 242 can be accessible to code running in a kernel mode of processing units 210. In some examples, volatile memory 214 is divided into spaces 240, 242 but nonV memory 216 (e.g., a disk) is not. In some examples, access controls applied to nonV memory 216 (e.g., access-control lists, ACLs) are different from access controls applied to volatile memory 214 (e.g., processor protection bits).

Various processor architectures implement user mode and kernel mode in various ways. "Kernel mode" as used herein can refer to any privilege level above a normal user-mode (non-privileged) level. For example, in x86 or x64 32-bit protected mode, user mode can be ring 3 and kernel mode can be any of rings 0-2. In x64 64-bit modes, user mode can be ring 3 and kernel mode can be ring 0. Similarly, "kernel mode" can include privileged processor modes used by supervisors or hypervisors in virtualization environments.

In the illustrated example, an application 244, e.g., a user program or system-service application, is loaded into user space 240. Application 244 communicates with first driver 226 loaded into kernel space 242 to access enumerable-bus devices. For example, application 244 can communicate via ioctls, reads, or writes of handles (e.g., HANDLE, file descriptor, or FILE*), named system-local communications mechanisms such as named pipes, UNIX-domain sockets, shared memory areas, message queues, or other SysV or POSIX IPC mechanisms, or other mechanisms. Examples are discussed herein, e.g., with reference to FIGS. 10-18.

Volatile memory 214 can include a third driver 246, e.g., a non-PnP or root-enumerated PnP driver. In some examples, at least one of the first driver 226 and the third driver 246 (e.g., the first driver 226) is a PnP driver. First driver 226 or third driver 246 can communicate with each other or with bus manager 222, e.g., to detect security-relevant information or perform computer-security actions. For example, third driver 246 can include a detection module 248, e.g., configured to detect malicious activity that affects or might potentially affect computing device 200. In some examples, communications module 224 conveys data between third driver 246 (e.g., a kernel-level security agent) and a security service cloud (cluster 106) accessible via network 108. In some examples, at least one of first driver 226 and third driver 246 is a driver for a virtual device. In some examples, functions of third driver 246 are performed in whole or in part by application 244, e.g., a security application running with administrative, normal, or restricted privileges.

First driver 226 can include a security module 250, e.g., configured to detect or mitigate attacks via an enumerated bus. In various examples, security module 250 can perform functions of PnP drivers discussed above (e.g., in the "Overview" section). In some examples, first driver 226 or another interface provider can maintain a queue of data, e.g., security-relevant information or event information, even before a consumer (e.g., third driver 246) connects via the interface. Upon connection, the provider can transmit the contents of the queue to the consumer.

The driver store 232 can store a first copy 252 of a fourth driver 254, e.g., a non-PnP or root-enumerated PnP driver. The fourth driver 254 can differ from the third driver 246. In some examples, fourth driver 254 is an earlier or later version of third driver 246, as discussed above with reference to second driver 228 and first driver 226. The installed-driver backing store 236 can include a second copy 256 of the fourth driver 254. As discussed above with reference to second driver 228, storing copies 252 and 256 can permit staging updates without triggering OS reboot requirements.

In some examples, e.g., of a non-PnP fourth driver 254, driver store 232 does not include first copy 252 of fourth driver 254, or installed-driver backing store 236 does not include second copy 256 of fourth driver 254. Some non-PnP drivers do not require staging, so do not require storage in both of driver store 232 and backing store 236 during updates.

In the illustrated example, security module 250 or detection module 248 e.g., running at a monitored computing device 104, can detect activity at monitored computing device 104 and determine corresponding event record(s) 126. In some examples, communications module 224 can transmit event records 126 determined by detection module 248 to cluster 106. Communications module 224 can receive policy information, whitelists, blacklists, classifications 130, or other security-relevant information from cluster 106 and provide that information to security module 250 or detection module 248. In some examples, security module 250 communicates with detection module 248 but not with communication module 224, and detection module 248 manages communication of security-relevant information regarding enumerated buses or enumerated-bus devices.

Memory 214, 216 can represent or include computer-executable instructions of any of components 220, 222, 226, 228, 246, 244, 248, 250, or 254 (individually or collectively, "modules") stored on disk or loaded into a RAM or other high-speed memory (or otherwise prepared for execution by processing units 210). In various examples, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, first driver 226 and security module 250 can be combined in a single module that performs at least some of the example functions described below of those modules, or likewise third driver 246 with detection module 248, or communications module 224 with third driver 246 or detection module 248. In some examples, memory 214, 216 can include a subset of the above-described modules.

Processing units 210 can be configured to execute modules of the plurality of modules. For example, the computer-executable instructions stored in memory 214, 216 can upon execution configure a computer such as a computing device 200 to perform operations described herein with reference to the modules of the plurality of modules. The modules stored in the memory 214, 216 can include instructions that, when executed by the one or more processing units 210, cause the one or more processing units 210 to perform operations described below. For example, the computer-executable instructions stored in memory 214, 216 can upon execution configure a computer such as a computing device 102 or 104 to perform operations described herein with reference to the operating system 220 or the above-listed modules 220-254.

For brevity, discussions of functions performed "by" module(s) (e.g., drivers, executable file(s), object files, linked executables, or similar functional divisions or artifacts) refer, in the context of processor-executable instructions, to functions performed in response to processor-executable instructions of the referred-to module(s). In the context of FPGAs or other control units not using processor-executable instructions, discussions of functions performed "by" module(s) refer to functions performed by the special-purpose logic or other configuration of those module(s).

In some examples, nonV memory 216 includes registry 258 or other configuration datastore. Registry 258, e.g., a WINDOWS registry, represents a database or other collection of data of low-level settings for the OS 220 and for applications 244 of computing device 200 that are configured to use the registry 258. The registry 258 may also be part of OS 220 or a separate component that interfaces with the OS 220. The kernel of OS 220, device drivers (including enumerated-bus device drivers such as, in this example, first driver 226 or bus manager 222), and other services may all use the registry 258. Settings stored in the registry 258 may be stored as values associated with registry keys of the registry 258. Registry 258 may be stored entirely in user space 240 or entirely in kernel space 242, or (as shown) may include user-space and kernel-space portions. Access controls, e.g., user-specific access controls, may be applied to various portions of the registry.

First driver 226 and third driver 246 can communicate via interface 260. Interface 260 can permit communication between two drivers, e.g., a PnP driver and a non-PnP (or root-enumerated PnP) driver, loaded in kernel space 242 and running in kernel mode. Examples are discussed herein with reference to FIGS. 10-18, e.g., with reference to read, write, ioctl, and query-functions operations, executive callbacks, driver-object extensions, notification callbacks, and system-local communications interfaces. Application 244 can communicate with first driver 226 via interface 262, e.g., between a PnP driver and user-mode code. Examples are discussed herein with reference to FIGS. 10-18, e.g., with reference to read, write, and ioctl operations, notification messages, and synchronization signals. Application 244 can communicate with third driver 246 via interface 264, e.g., between a non-PnP driver and user-mode code. Examples are discussed herein with reference to FIGS. 10-18, e.g., with reference to read, write, and ioctl operations, and synchronization signals. Each of the interfaces 260, 262, 264 can support at least a read operation, a write operation, or an ioctl operation. A particular computing device 200, in operation, may have zero or more of each interface 260, 262, 264 active at any given time.

In some examples, omitted for brevity, techniques described herein with reference to interfaces 260, 262, 264 are used for communications between two user-mode system components, e.g., application 244 and another application loaded into user space 240, or application 244 and a driver loaded into user space 240 (e.g., a LINUX FUSE driver). For example, two user-mode processes can communicate via a UNIX-domain socket or other communications mechanism provided by OS 220 for use by user-mode processes. Examples are discussed herein, e.g., with reference to communications mechanisms and system-local communications interfaces. In some examples, e.g., of root-enumerated PnP drivers, any of drivers 226, 228, 246, 254 can be user-mode drivers.

For clarity, some examples are described herein with reference to interactions between first driver 226 and third driver 246 via interface 260. In some of these examples, first driver 226 is a provider of interface 260, and third driver 246 is a consumer of interface 260. For example, first driver 226 can be a PnP driver that makes available information regarding enumerated-bus devices via interface 260 to third driver 246, e.g., a security agent. However, these examples are not limiting.

In some examples of first driver 226, third driver 246, and interface 260, first driver 226 includes a first linked executable (e.g., a SYS file) and third driver 246 includes a second linked executable. Each linked executable has statically linked therein a respective object file (provider functions and consumer functions, respectively). The object files include processor-executable instructions to, respectively: provide interface 260 (e.g., FIG. 10, 12, or 16-18); and operate interface 260 to control or make requests of first driver 226 (e.g., FIG. 11 or 13-15). The instructions in the object files can cause exchange of data using a communications mechanism provided by OS 220, e.g., IPC, RPC, IRPs, pipes, UNIX-domain sockets, direct function calls permitted by OS 220, or other mechanisms described herein (e.g., with reference to FIGS. 10-18). In other examples, functions of the object files can additionally or alternatively be provided by dynamically-linked modules. In various examples, routines in an object file can invoke callbacks or otherwise notify code in an executable of events pertinent to interface 260. Such events can include, e.g., establishment or teardown of a connection via interface 260; availability of new data to be provided to a consumer; receipt of a command from a consumer; or queuing/flow-control events such as XON and XOFF. First driver 226 can include or otherwise access command data indicating functions supported by first driver 226 over an interface. First driver 226 can include or otherwise access capability data indicating interface types or versions supported by first driver 226. In some examples, command data and capability data are combined into one dataset.

In some examples, nonV memory further comprises executable instructions of an updater 266. Updater 266 can be a component of OS 220 or can cooperate with OS 220. Updater 266 can trigger system reboots and driver loads. Examples are discussed herein, e.g., with reference to FIG. 5. The at least one processing unit 210 can, e.g., under control of second driver 228, updater 266, or other modules (e.g., drivers) described herein, implement processes of various aspects described herein. The at least one processing unit 210 and related components can, e.g., carry out processes for handling the IRP_MN_QUERY_PNP_DEVICE_STATE request, updating driver binaries in the C:\Windows\system32\drivers folder, setting device interface properties directly rather than via an INF file, using uninstall/reinstall rather than upgrade/downgrade for version changes, and rolling back failed installation operations.

In some examples, detection module 248 can include a kernel-level security agent (as shown) or a user-level security agent. In various embodiments, the kernel-level security agent can be installed on the host computing device in the form of a driver, e.g., third driver 246. For example, a driver or other implementation of detection module 248 can use hooks or filter drivers, or monitor memory or log files, as discussed below. In some examples, the detection module 248 can be received from or operable with a security service, e.g., cluster 106.

In some examples, the kernel-level security agent can operate on computing device 104 as a virtual machine/shadow operating system. The kernel-level security agent can load before the operating system 220 of the host computing device, e.g., very early in the boot-time of the host computing device, by some of the first few dozen instructions in some examples. Pre-boot components of detection module 248 can leverage hardware-provided security features, e.g., firmware signing, although this is not required. By loading early in boot-time, the kernel-level security agent significantly reduces the window in which malware can become active and interfere with operation of the host computing device or run unobserved on the host computing device. In some embodiments, by leveraging hardware-based security features, the agent can also validate the integrity of its computing operations and data and additionally enhance the level of security provided.

In some examples, detection module 248 (or security module 250, and likewise throughout this document) can include various components, e.g., various software modules. Components can include collectors, filters, routers/dispatchers, or event consumers. Collectors can receive notifications of events (e.g., file writes and launching executables) from host operating system hooks or filter drivers, from user-mode event monitors, or from threads monitoring log files or memory locations. Filters can filter data of these events, e.g., to remove the need to perform further processing on benign events. Routers/dispatchers can provide data from the filters to event consumer(s), such as correlators or actor components. A correlator component notes the fact of the occurrence of the filtered events. An actor component may, for example, gather forensic data associated with an event and provide an event record including the forensic data. In some examples, routers or dispatchers can transfer information via interfaces such as those described herein.

In various embodiments, a collector may register with a hook or filter driver offered by the operating system 220 to receive notifications of the occurrence or non-occurrence of certain events, such as file creates, reads, and writes, and loading executables. A collector may monitor locations in memory or log files, or spawn a thread to do so, observing events associated with the log files or memory locations. A collector may observe multiple kinds of activities or data, or each kind may be associated with a different collector. The events observed by the collectors may be specified by a configuration of the detection module 248. In some embodiments, the collectors observe all events on the computing device 104 and the configuration specifies configurable filters for filtering and dispatching those events. In other embodiments, the configuration specifies which collectors should be loaded to observe specific types of events. In yet other embodiments, the configuration both specifies which collectors should be loaded and configurable filters for filtering and dispatching events observed by those collectors.

Additionally or alternatively, the detection module 248 may include user mode collectors to observe events that may not be visible to kernel mode processes. Such events could include, for example, rendering of display graphics for display on a display screen of the computing device 104. To observe these events, the detection module 248 is further configured to load user mode collectors as user-mode modules of the computing device 104. Like the kernel-mode collectors described above, user mode collectors may observe multiple kinds of events or activities, or each kind may be associated with a different user mode collector. The events observed by the user mode collectors may be specified by a configuration of the detection module 248. In some embodiments, the user mode collectors observe all user mode events on the computing device 104 and the configuration specifies configurable filters for filtering and dispatching the events. In other embodiments, the configuration specifies which user mode collectors should be loaded to observe specific types of events. In yet other embodiments, the configuration both specifies which user mode collectors should be loaded and configurable filters for filtering and dispatching those events.

Figure 3:
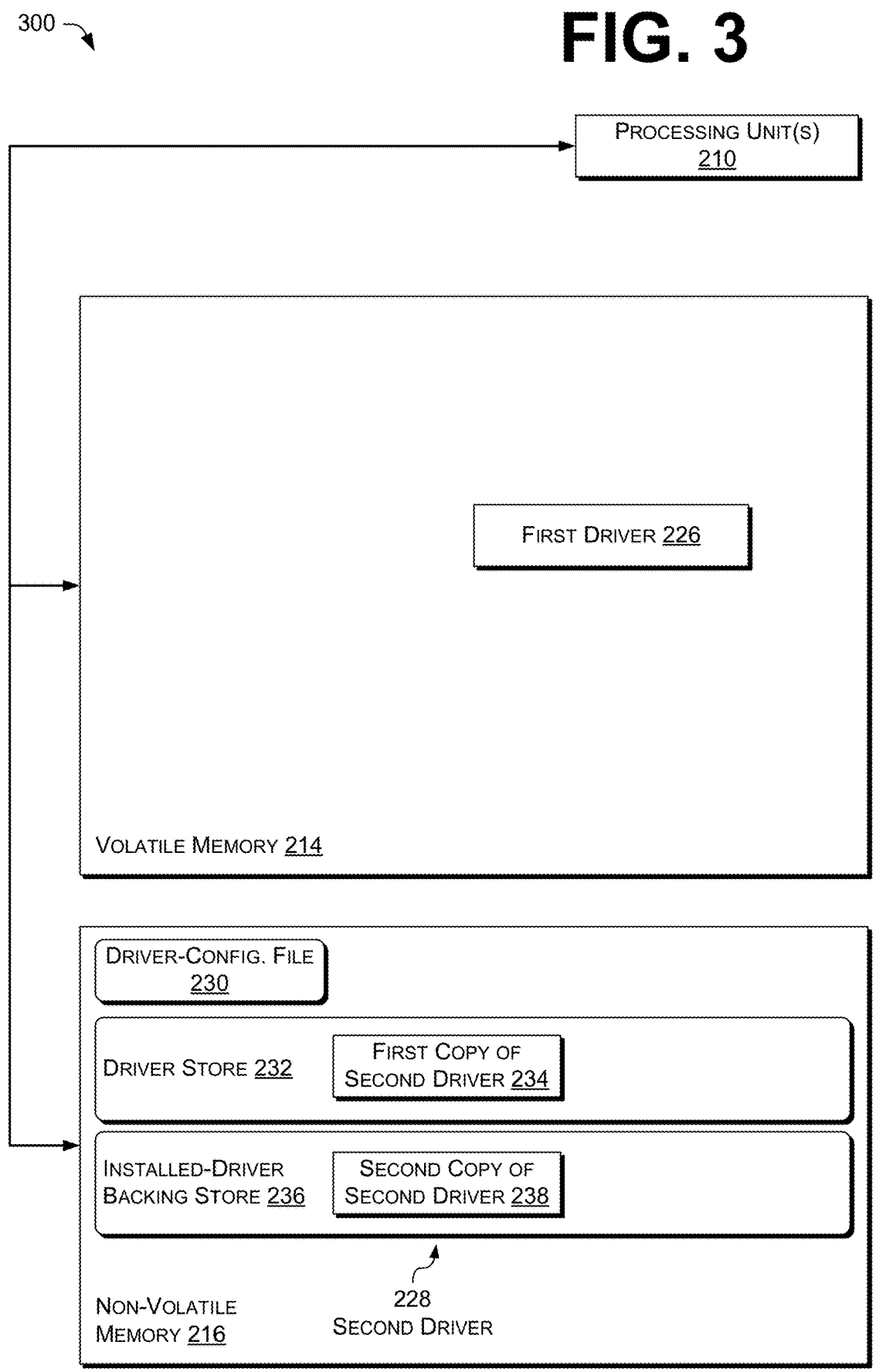
FIG. 3 is a block diagram depicting an example computing device configured to participate in driver installation according to various examples described herein.

FIG. 3 is a block diagram illustrating a system 300, e.g., a computing device. For the sake of illustration, the example system 300 is described below with reference to processing unit 210 and other components shown in FIGS. 1 and 2. However, other equivalent components, additional components, or other components in FIGS. 1 and 2 not specifically referenced in the following discussion, can additionally or alternatively be used in system 300. Similarly, systems shown in FIGS. 4 and 5 may include additional, alternative, or equivalent components. System 300 includes at least one processing unit 210, e.g., a control unit, CPU, FPGA, or other processing unit 210 described above.

System 300 also includes a volatile memory 214 comprising at least one tangible, non-transitory volatile computer-readable medium (e.g., RAM). Volatile memory 214 includes first driver 226. First driver 226 can be, e.g., a first version of a PnP driver.

System 300 also includes a nonV memory 216 communicatively connected with the at least one processing unit 210 and comprising at least one tangible, non-transitory non-volatile computer-readable medium (e.g., a disk drive, solid-state disk, or Flash drive). NonV memory 216 includes a driver-configuration file 230, e.g., an INF file.

NonV memory 216 also includes a driver store 232 comprising a first copy 234 of a second driver 228. Second driver 228 can be different from first driver 226. E.g., second driver 228 can be a different version of the driver, staged in driver store 232 to be loaded and activated after the next reboot of system 300.

NonV memory 216 also includes installed-driver backing store 236 comprising a second copy 238 of the second driver 228. Backing store 236 can include nonV copies of drivers currently loaded into volatile memory 214.

In some examples, system 300 represents, or components of system 300 are included in, a personal computer (PC) (e.g., WINDOWS, MAC, LINUX, ANDROID, BSD, or other). System 300 can represent a PC after a driver update has been performed (e.g., using techniques described herein with reference to FIGS. 6-8), but before system 300 has rebooted. Unlike some prior schemes, installed-driver backing store 236 includes second copy 238 of second driver 228, rather than a copy of first driver 226, which is loaded in volatile memory 214.

As discussed herein, this difference represents the results of herein-described manipulations of interactions with OS 220 that yield a desired result. In some examples, because backing store 236 includes second driver 228, a comparison by OS 220 of the current driver, as represented in backing store 236, with the driver staged for installation, as represented in driver store 232, indicates to OS 220 that second driver 228 is already running, even when second driver 228 is not, in fact, running. This causes OS 220 to behave other than in its normal, expected manner, namely by not presenting a reboot prompt, even though it normally would have. In some examples, accordingly, the volatile memory 214 excludes operating-system data indicating that a reboot is required. Such operating-system data can include, e.g., a flag, data of a notification, data in a framebuffer of a message presented on a display device prompting the user to reboot, or a running process that presents a reboot prompt.

In some examples, FIG. 3 represents a system in which first driver 226 continues to operate, even if it is unloadable. For example, a first driver 226 that monitors security-relevant information of system 300 can continue running until reboot, even if it could be replaced in volatile memory 214 with second driver 228 before a reboot. This can permit collecting security-relevant information without the gap in collection that might occur during the time first driver 226 was being unloaded from volatile memory 214 and second driver 228 was being loaded into volatile memory.

Figure 4:
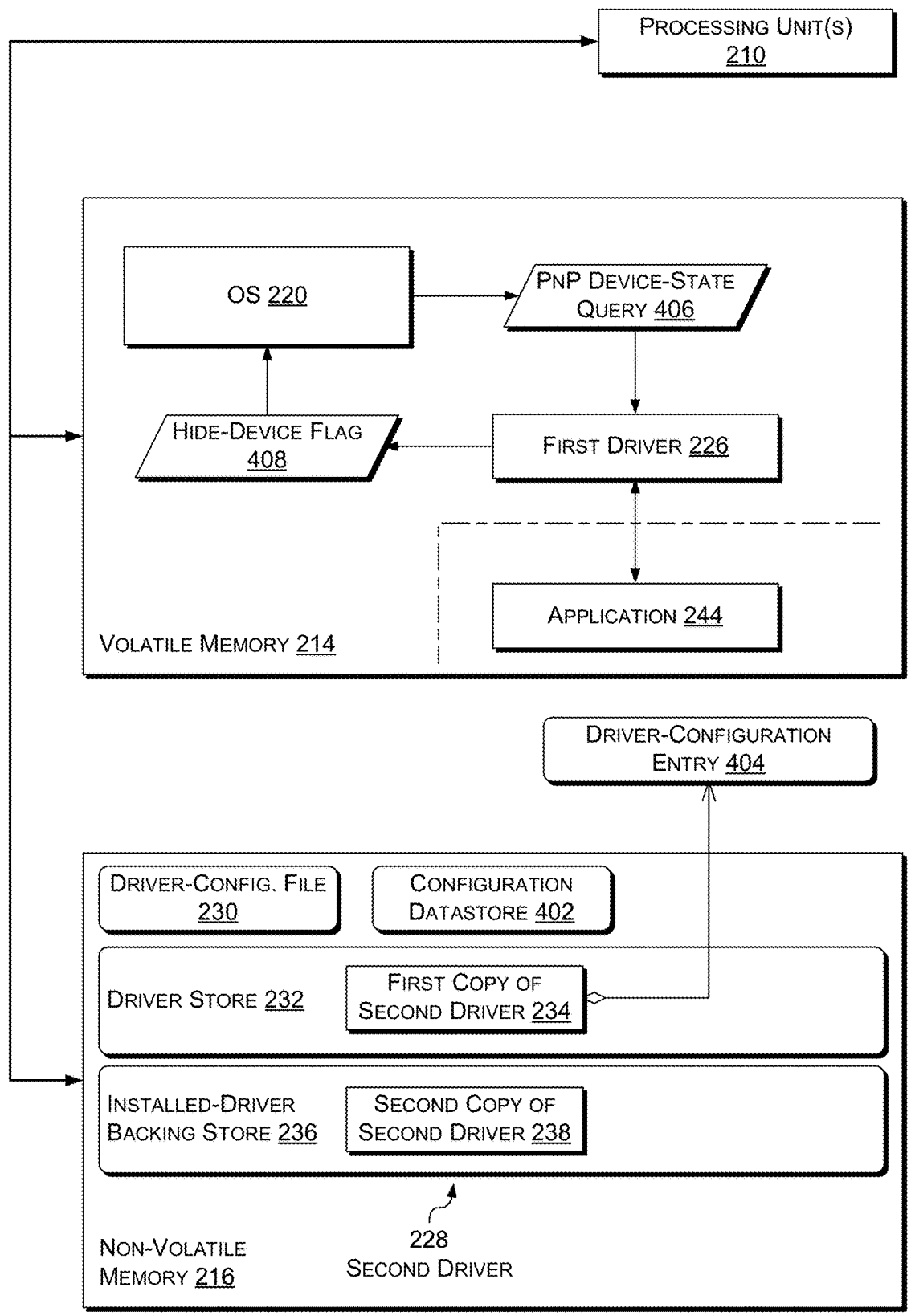
FIG. 4 is a block diagram depicting an example computing device configured to participate in driver installation or management according to various examples described herein.

FIG. 4 is a block diagram illustrating a system 400, e.g., a computing device. System 400 includes a configuration datastore 402, which can represent registry 258, the WINDOWS device metadata store that holds device-property values, or another datastore that can retain values, e.g., across system reboots.

In some examples, operations of OS 220 with respect to driver-configuration file 230 are manipulated to yield a desired result. For example, whereas the normal operation of WINDOWS is to write registry entries at the time of driver installation, system 400 can write registry entries at the time of driver startup.

In some examples, second driver 228 stored in the nonV memory 216 comprises executable instructions that, when executed by the at least one processing unit 210, cause the at least one processing unit 210 to perform second-driver operations. Examples of second-driver operations are described herein with reference to operations 616 and 708, and FIGS. 10, 12, and 16-18. In some examples, the second-driver operations comprise writing at least one driver-configuration entry 404 to configuration datastore 402. In various examples that manipulate interactions with driver-configuration file 230, the driver-configuration file 230 excludes the driver-configuration entry 404.

The driver-configuration entry 404 can include, e.g., a registry key, device property, device interface property, or other entry. The driver-configuration entry 404 can include an interface version or other configuration used by application 244 for communication with first driver 226 or second driver 228 (e.g., interface type 1110, 1708 or version 1112, 1710). In some examples, driver-configuration entry 404 is or includes a WINDOWS device property (e.g., accessible by invoking SetupDiGetDeviceProperty( ) (e.g., from user or kernel modes) or IoGetDeviceProperty( ) (from kernel mode)), e.g., a device property value associated with a custom device property category (e.g., a GUID) and a property identifier (e.g., numeric). See, e.g., operation 714.

In some examples, the driver-configuration file 230 omits a non-chronological version identifier distinguishing the second driver from the first driver. The non-chronological version identifier can be, e.g., a GUID, integer, or semantic version (semver). The non-chronological version identifier can be driver-configuration entry 404, or can be included therein. In some examples, exactly one of the first driver 226 and the second driver 228 includes the non-chronological version identifier (e.g., as data of interface type 1110, 1708 or version 1112, 1710).

In some examples, the driver-configuration file 230 includes at least one entry different from driver-configuration entry 404. For example, driver-configuration file 230 can include service-installation keys such as AddService or ServiceBinary, configuration sections such as *.NT.Services (wildcard *), or file-manipulation sections or keys such as CopyFiles, DestinationDirs, or SourceDisks*. In some examples, driver-configuration file 230 includes entries necessary to permit operations 612 or 714 to be performed, e.g., only those entries. In some examples, driver-configuration file 230 includes such necessary entries and excludes driver-configuration entry 404 or other entries necessary for other software modules (e.g., application 244 or fourth driver 254) to interact with first driver 226. In some examples, driver-configuration file 230 includes data permitting OS 220 to load second driver when booting off an enumerable-bus device, e.g., thumb drive 114.

In some examples, the normal operation of the WINDOWS Device Manager or other system-inspection tools is manipulated. For example, first driver 226 can include executable instructions that, when executed by the at least one processing unit 210, cause the at least one processing unit 210 to perform first-driver operations. The first-driver operations can include receiving a PnP device-state query 406, e.g., a WINDOWS IRP_MN_QUERY_PNP_DEVICE_STATE, e.g., from bus manager 222, and responding to the query with a hide-device flag 408, e.g., a WINDOWS PNP_DEVICE_NO_DISPLAY_IN_UI flag. Device-state query 406 can be provided by OS 220 or components thereof. Flag 408 can be sent to OS 220. In response to flag 408, OS 220 can remove first driver 226 from display in, or refrain from adding first driver 226 to, a list of active drivers. Various examples include providing flag 408 when indicated by, e.g., stored preference data of customer, user, or security administrator preferences. In some examples, the device-state query 406 is issued by OS 220 after first driver 226 loads, e.g., after device enumeration. The first-driver operations therefore provide improved control of device visibility compared to schemes using, e.g., the NoDisplayInUi bit in response to an IRP_MN_QUERY_CAPABILITIES request. In some examples, the device-state query 406 can be retriggered by invoking an OS 220 routine, e.g., IoInvalidateDeviceState( ). Therefore, first-driver operations can permit updating the visibility of first driver 226 even after driver-load time.

In some examples, flag 408 causes OS 220 to disregard first driver 226 when determining whether a reboot is required, or when determining whether to notify the user that a reboot is required. In some examples, flag 408 causes a device manager or other administration tool of OS 220 to show first driver 226 as a driver that does not currently have an update pending, or for which a reboot is not required, even after completion of installation operations 606. In some examples, flag 408 causes SNMP or other remote-management systems to show device 200 as a device that does not currently require a reboot. This permits, e.g., staging multiple updates to independent software components, then rebooting once to apply all of the updates. This can increase the availability (e.g., uptime) of computing device 200. In some examples, regardless of flag 408, the fact that first driver 226 is installed is still visible to system-management utilities, which permits more accurately cataloging the contents of computing device 200.

Figure 5:
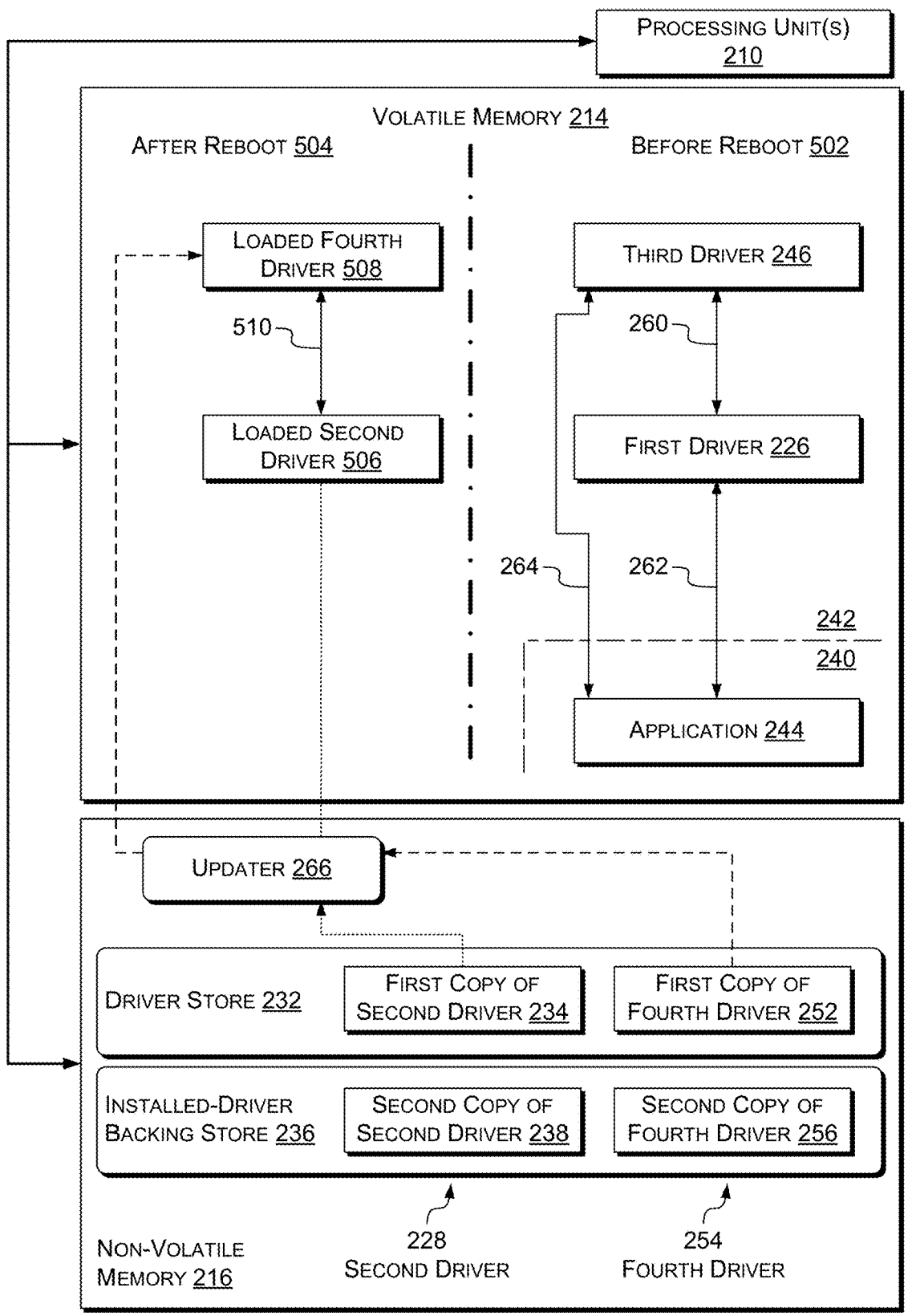
FIG. 5 is a block diagram depicting an example computing device configured to participate in driver installation according to various examples described herein, including before-reboot and after-reboot memory contents of the device.

FIG. 5 is a block diagram illustrating a system 500, e.g., a computing device. Volatile memory 214 is shown with contents 502 before a reboot and contents 504 after a reboot, separated by the heavy dash-dot line. Volatile memory 214 of system 500 can include, e.g., in contents 504, a third driver 246, e.g., a non-PnP or root-enumerated PnP driver such as a security agent. Driver store 232 can include a first copy 252 of a fourth driver 254, e.g., a non-PnP driver. Installed-driver backing store 236 can include a second copy 238 of the fourth driver 254.

In some examples, the first driver 226 (e.g., stored in contents 502 of volatile memory 214) comprises executable instructions that, when executed by the at least one processing unit 210, cause the at least one processing unit 210 to perform first-driver operations. Examples are discussed herein, e.g., with reference to FIG. 1, 2, 10, 12, or 16-18. In some examples, the second driver 228 (e.g., stored in the nonV memory 216) comprises executable instructions that, when executed by the at least one processing unit 210, cause the at least one processing unit 210 to perform second-driver operations. Examples are discussed herein, e.g., with reference to FIG. 1, 2, 4, 6, 7, 11, or 13-15. In some examples, the third driver 246 (e.g., stored in volatile memory 214) comprises executable instructions that, when executed by the at least one processing unit 210, cause the at least one processing unit 210 to perform third-driver operations. Examples are discussed herein, e.g., with reference to FIG. 1, 2, 10, 12, or 16-18. In some examples, the fourth driver 254 (e.g., stored in the nonV memory 216) comprises executable instructions that, when executed by the at least one processing unit 210, cause the at least one processing unit 210 to perform fourth-driver operations. Examples are discussed herein, e.g., with reference to FIG. 1, 2, 6, 7, 11, or 13-15.

Some examples use updater 266 to coordinate or perform updates, such as driver updates. In some examples, nonV memory 216 includes executable instructions that, when executed by the at least one processing unit, cause the at least one processing unit to perform update instructions. The update instructions can be performed by updater 266 (as shown), or by a kernel of OS 220, or other system components, alone or in combination with updater 266.

In some examples, the update instructions include rebooting system 500. The update instructions also include a portion that is executed after reboot and that loads the first copy 234 of the second driver 228 from the driver store 232 of the nonV memory 216 into contents 504 of the volatile memory 214 to provide a loaded second driver 506, as represented by the stippled arrows. Accordingly, in some examples, volatile memory 214 comprises loaded second driver 506. Loading can include copying content from first copy 234 into volatile memory 214, fixing up dynamic-linking references, or performing other loading actions for drivers or executables.

The update instructions can also include instructions to, subsequent to loading the loaded second driver 506, activate the loaded second driver 506 in the volatile memory 214. For example, the update instructions can include calling DriverEntry( ), AddDevice( ), or a similar startup routine to cause loaded second driver 506 to initialize itself.

In some examples, the update instructions additionally or alternatively include corresponding instructions to, after reboot, load first copy 252 of fourth driver 254 from driver store 232 of nonV memory 216 into contents 504 of volatile memory 214 to provide loaded fourth driver 508, as represented by the dashed arrows, or to activate loaded fourth driver 508. Accordingly, in some examples, volatile memory 214 comprises loaded fourth driver 508. In some examples, loaded second driver 506 and loaded fourth driver 508 can communicate via interface 510 (which can represent interface 260, 262, or 264). Examples are discussed herein, e.g., with reference to FIGS. 10-18.

Some examples provide interface versioning, e.g., during upgrades. For example, the second driver 228, staged in nonV memory 216, can be configured to respond to a protocol or other interface version that the first driver 226, in volatile memory 214, cannot. An interface version can represent, e.g., format or contents of data sent via an interface 260, 262, or 264. In some of these examples, the second-driver operations comprise receiving a second-driver request, determining that the second-driver request specifies a second-driver version identifier, and at least partly in response to the second-driver version identifier, sending a second-driver success response. The first-driver operations, by contrast, comprise receiving a first-driver request, determining that the first-driver request specifies the second-driver version identifier, and at least partly in response to the second-driver version identifier, sending a first-driver failure response. Examples are discussed herein, e.g., with reference to FIGS. 1, 2, 6, and 7.

Some examples provided coordinated updates, e.g., of multiple drivers, such as a PnP driver and a non-PnP or root-enumerated PnP driver. In some of these example, the first driver 226 comprises a first PnP driver and the second driver 228 comprises a second PnP driver. The fourth-driver operations comprise transmitting a request, e.g., via an interface 260, 262, or 264, and the second-driver operations comprise receiving the request. The second-driver operations may also include verifying a version identifier in the request, and, at least partly in response, sending a success response. Examples are discussed herein, e.g., with reference to FIGS. 1, 2, 6, and 7. In some examples, first driver 226 and third driver 246 are also configured to communicate, e.g., via an interface 260 (or, for user-mode drivers, interface 262 or 264). On reboot, for example, the first driver 226 can be replaced in volatile memory 214 with the second driver 228, and the third driver 246 can be replaced in volatile memory 214 with the fourth driver 254. Therefore, before reboot, first driver 226 and third driver 246 can cooperate to perform computer-security functions, e.g., with respect to enumerated buses. After reboot, second driver 228 and fourth driver 254 can cooperate to perform those functions. This can reduce the amount of time during which system 500 is unprotected during updates.

Moreover, loading second driver 506 (and also fourth driver 508, in some examples) upon reboot can permit updating drivers without disrupting operation of enumerable-bus devices, and without update failures due to locked files. In some examples in which first driver 226 and second driver 228, 506 provide different version of a particular interface 260, 510, or of a particular API or other service, staging, and then updating upon reboot (e.g., FIG. 6), can prevent concurrent operation of two versions of that interface, API, or service. This can increase system reliability by reducing the probability that two software modules supporting incompatible interface versions will attempt to communicate.

Some prior schemes identify interfaces using unique identifiers, and then identify versions within those interfaces using other identifiers. Some of these prior schemes update registry 258 as part of an installation process of a new driver. However, this can lead to race conditions and consequent system instability. For example, a module attempting to use an interface may read registry 258 to determine which version is available. That module may then send messages according to the version indicated in registry 258. However, in parallel, updater 266 may be updating driver files, and then updating registry 258. Therefore, by the time the module sends the message, a different driver may have been installed to receive those messages. That different driver may then reject the messages as being of an unrecognized version. If the messages are not tagged with a specific version (e.g., ASN.1 packed encoding rules, PER), the different driver may accept the messages but misinterpret them, resulting in improper functioning.

Figure 6:
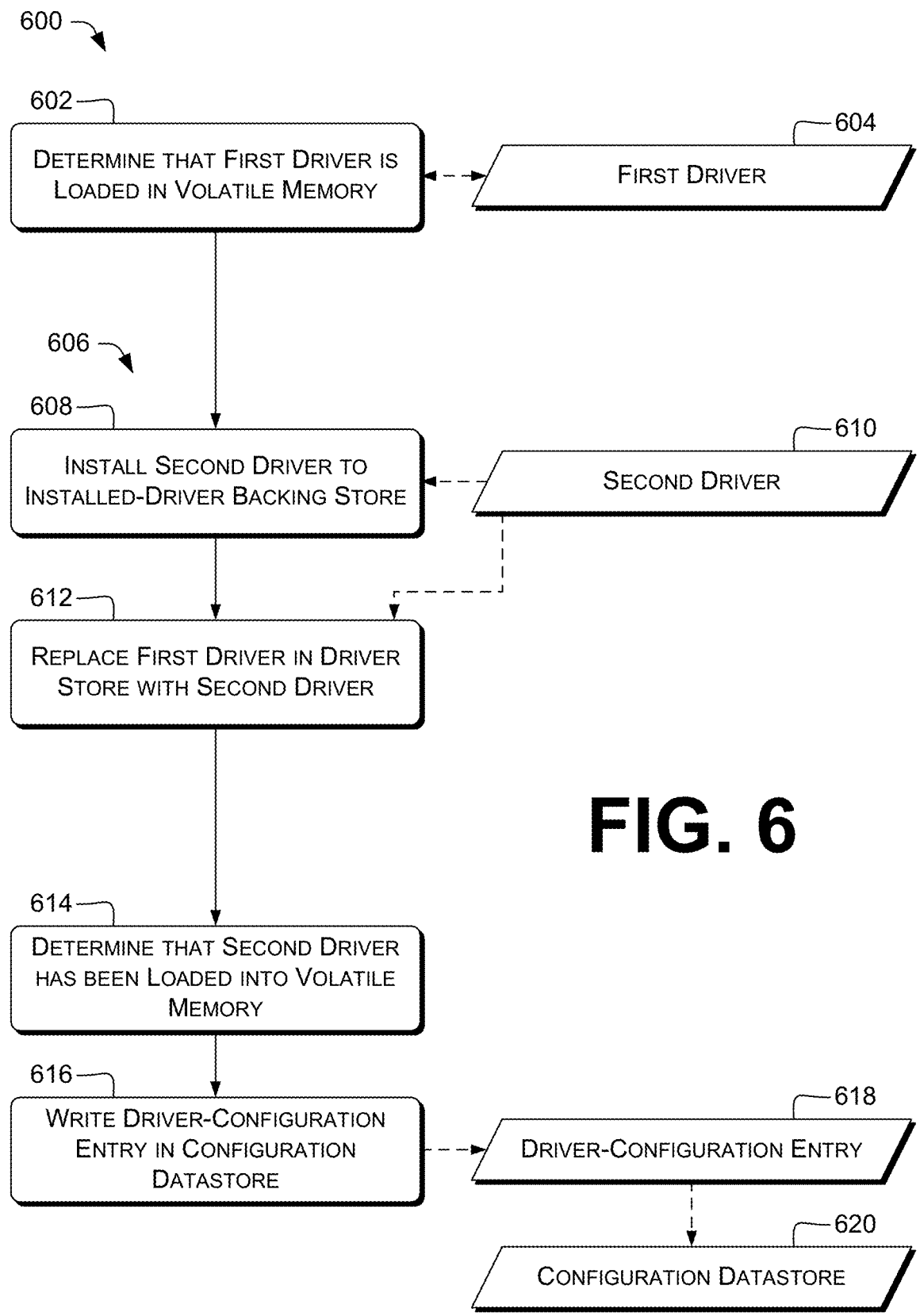
FIG. 6 is a dataflow diagram that illustrates an example technique for installing a driver.

By contrast, techniques herein using loads associated with reboots, or other examples described herein with reference to FIG. 4 or 6, have significantly lower probabilities of race conditions. In some examples herein, the installed first driver 226 and associated registry 258 entries are consistent until reboot. Upon reboot, second driver 228, 506 is loaded. Once second driver 506 is running, e.g., before applications 244 run or are able to attempt to communicate with second driver 506, second driver 506 updates registry 258. Therefore, whenever applications 244 attempt to communicate with a driver 226, 228, 506, the registry 258 will be consistent with the loaded driver. A race condition such as that described above therefore will not occur, even if an update operation is running in parallel with the operation of application 244.

In some examples, some drivers are updated independently of other drivers. For example, a non-PnP or root-enumerated PnP driver can be updated, and a PnP driver can be staged for update at the next reboot. Staging may be necessary as an enumerated-bus device may be using the PnP driver. The non-PnP driver can be configured to communicate with the current PnP driver or the staged PnP driver. This can reduce the amount of time during which system 500 is unprotected during updates.

In some of these examples, the first driver 226 comprises a first PnP driver and the second driver 228 comprises a second PnP driver. The first-driver operations comprise processing a request indicating a first interface version and rejecting a request indicating a second interface version different from (e.g., greater than) the first interface version. The second-driver operations comprise processing a request indicating the second interface version.

The third driver 246 can be configured for communication with both the first driver 226 and the second driver 228. For example, the third-driver operations can include transmitting a request indicating the second interface version, receiving a rejection of the request, and in response to the rejection, transmitting a second request indicating the first interface version. The third driver 246 can try the second interface version and fall back to the first interface version if the second interface version is unavailable.

In some examples, FIG. 5 represents a system in which first driver 226 continues to operate, even if it is unloadable. For example, a first driver 226 that monitors security-relevant information of system 500 can continue reporting events to third driver 246 until reboot, even if it could be replaced in volatile memory 214 with second driver 228 before a reboot. Similarly, a third driver 246 that collects events can continue to operate in volatile memory 214 until reboot, even if it could be replaced in volatile memory 214 with fourth driver 254 before a reboot. This can permit collecting and receiving security-relevant information without the gaps in collection or processing that might occur during the time first driver 226 was being unloaded from volatile memory 214 and second driver 228 was being loaded into volatile memory, or during the time third driver 246 was being unloaded from volatile memory 214 and fourth driver 254 was being loaded into volatile memory.

Illustrative Techniques

Figure 7:
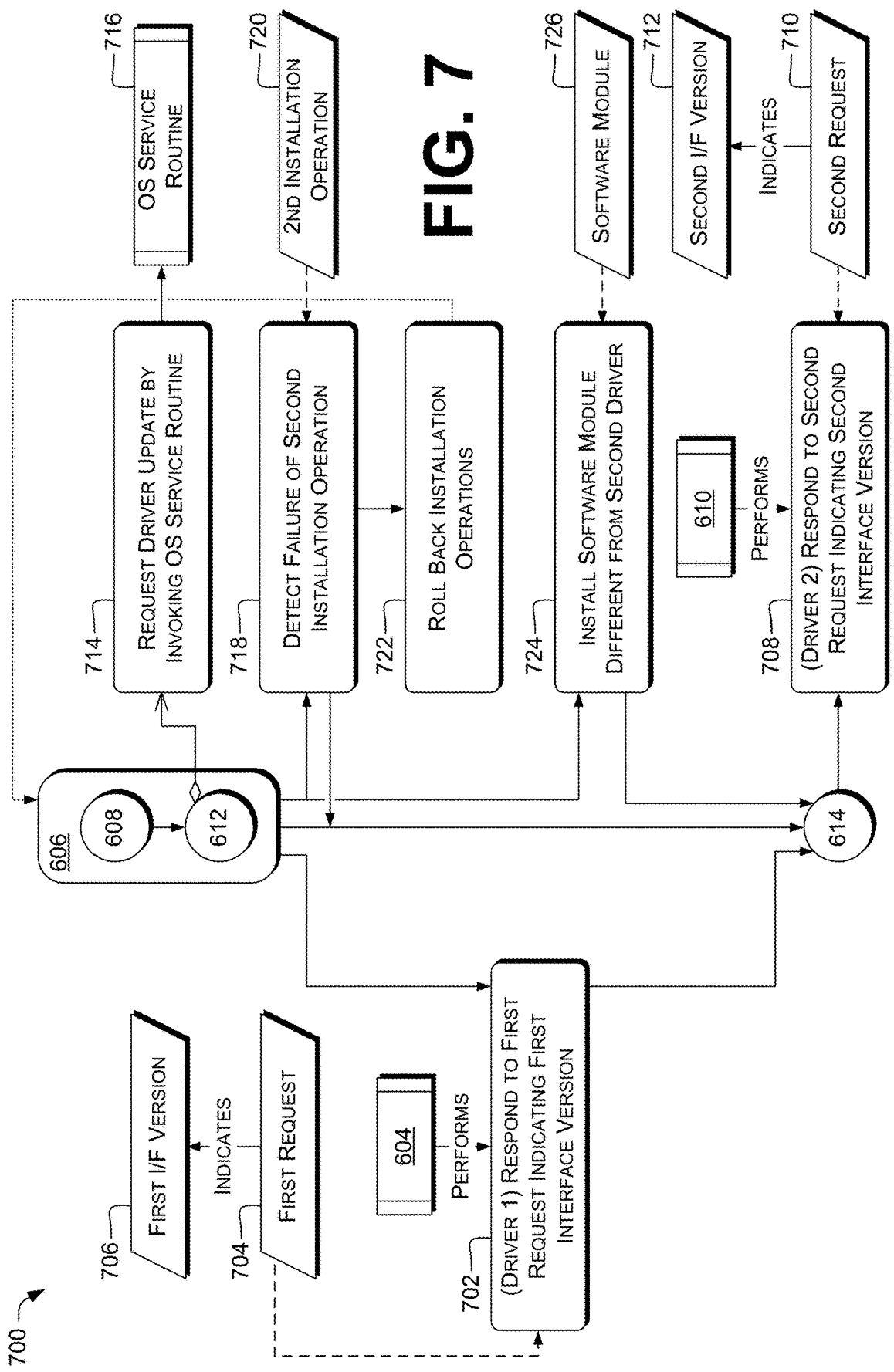
FIG. 7 is a dataflow diagram that illustrates example techniques for installing or interacting with a driver.
Figure 8:
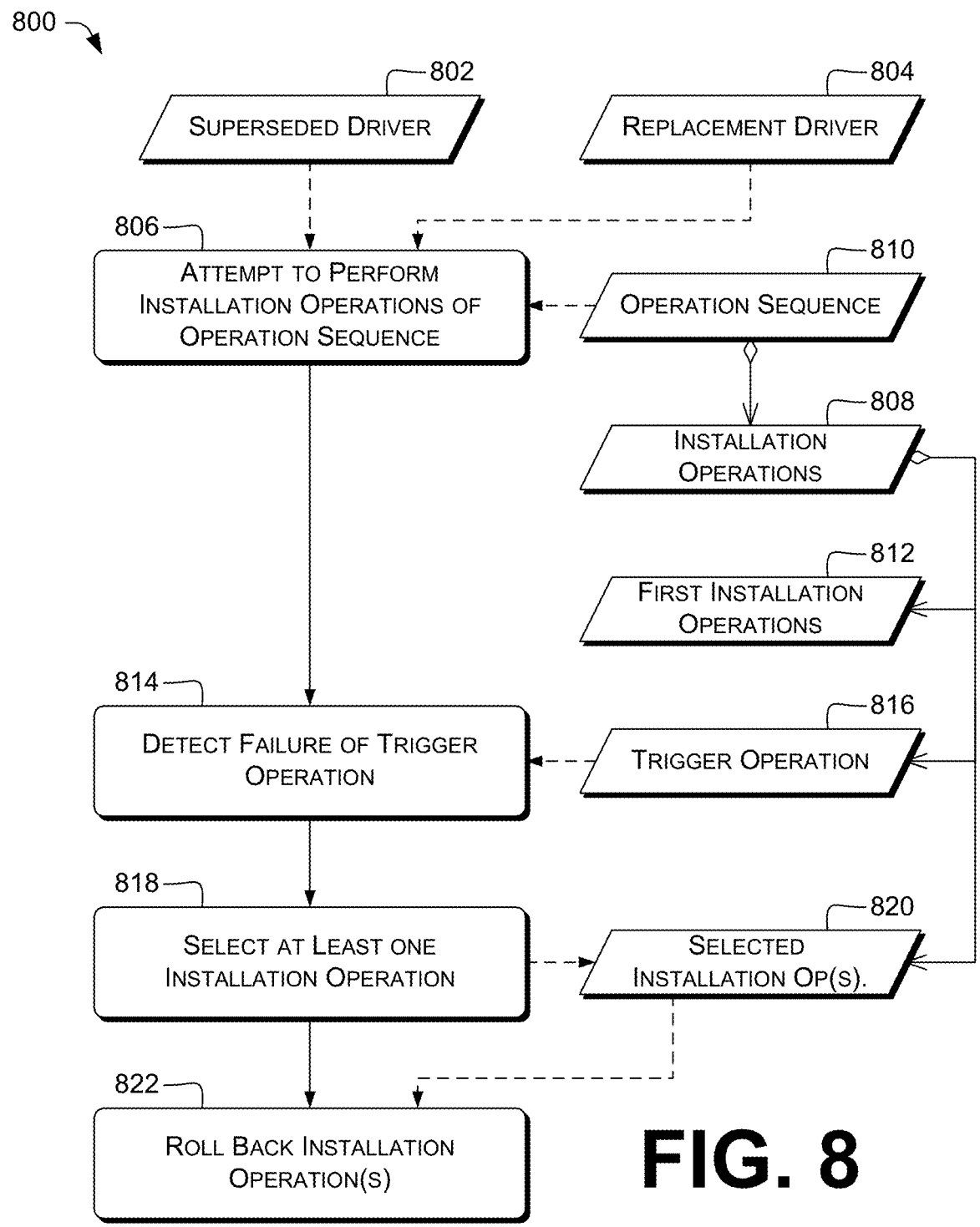
FIG. 8 is a dataflow diagram that illustrates an example technique for rolling back a failed installation sequence.
Figure 9:
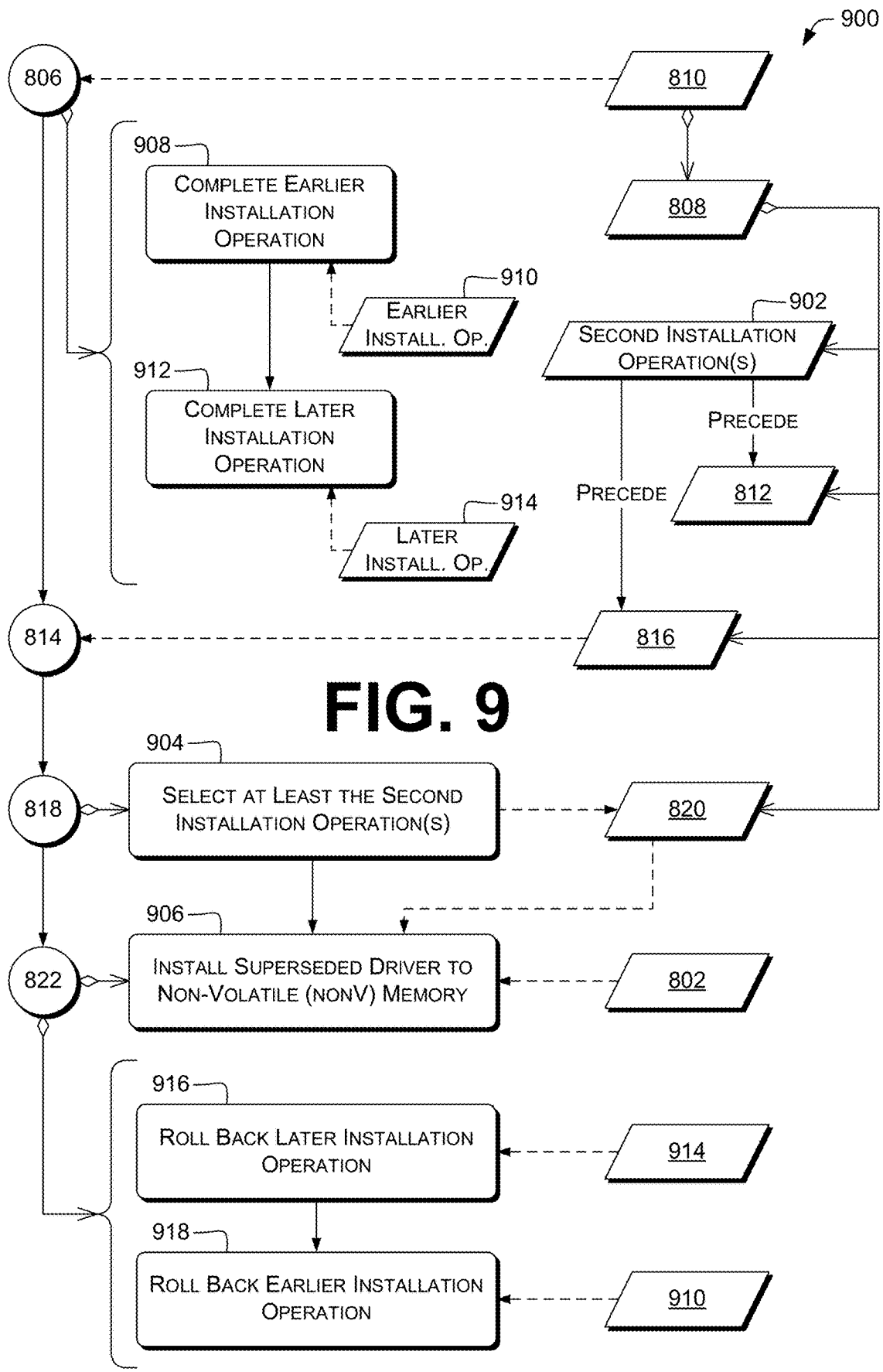
FIG. 9 is a dataflow diagram that illustrates example techniques for installing a driver or rolling back an installation.

FIG. 6 is a dataflow diagram that illustrates an example technique 600 for installing a driver, and related dataflow (shown dashed for clarity). Example functions shown in FIG. 6 and other flow diagrams and example techniques herein can be implemented on or otherwise embodied in one or more computing device(s) 104, e.g., by updater 266 (e.g., an MSI or EXE installer on WINDOWS). For the sake of illustration, the example technique 600 is described below with reference to computing device 200, processing unit 210, and other components shown in FIGS. 1-5 that can carry out or participate in the steps of the example technique (e.g., a control unit), and with reference to data structures shown in FIGS. 1-5. However, other processing units such as processing units 210 or other components of computing device(s) 102, 104, or 200 can carry out step(s) of described example techniques such as technique 600. Similarly, example technique(s) shown in FIGS. 7-9 are also not limited to being carried out by any specifically-identified components. In some examples, operations described herein with reference to second driver 610 can additionally or alternatively be performed by fourth driver 254.

In software embodiments, the number or arrangement of modules performing functions described herein may be different from that shown in FIG. 2. Accordingly, references to specific modules performing operations described herein are for clarity, and also envision other modules that may perform those operations. In embodiments using a control unit that does not execute computer program instructions, e.g., an FPGA or ASIC, references to specific modules below also envision sections of the hardware of such a control unit that cause the control unit to perform the described operations.

At 602, the control unit can determine that a first driver 604 (which can represent first driver 226) is loaded in a volatile memory 214 communicatively connected with the at least one processing unit 210. For example, the control unit can invoke routine(s) provided by OS 220 for determining whether a driver identified by a particular unique identifier is loaded, and receive from those routine(s) a result indicating that first driver 604 is loaded. For example, the control unit can call SetupDiGetClassDevs( ) and SetupDiEnumDeviceInterfaces( ) functions from user mode to enumerate devices and interfaces that are active on a WINDOWS system, e.g., based on a predetermined device interface class GUID. Additionally or alternatively, the control unit can call IoGetDeviceInterfaces( ) from kernel mode to perform this enumeration. On a UNIX (including UNIX-like, e.g., GNU/Linux, and likewise throughout) system, the control unit can use readdir(3) or getdents(2) to read directory entries in the/dev or/proc trees, or in another predetermined location on a filesystem, e.g., to find a/dev entry associated with a given (major, minor) device-number pair (e.g., (13, 37)).

Additionally or alternatively, the control unit can open a handle to a file or other system resource associated with first driver 604. For example, the control unit can call CreateFile( ), open(2), fopen(3), connect(2) (e.g., for UNIX-domain sockets) shmat(2) (e.g., for a POSIX shared-memory communications mechanism), or other file-access or IPC functions using a path or other identifying information. The OS 220 can provide the handle. The handle can include a file number, file descriptor, FILE*, HANDLE, pointer to an attached shared-memory segment, or other value usable with, or facilitated by, services of OS 220 to identify a communications channel with first driver 604.

In some examples, operation 602 can include determining that first driver 604 is in use or otherwise not possible to unload at the time of operation 602. For example, first driver 604 may be a PnP driver included in a driver stack for a currently-connected enumerated-bus device. For example, operation 602 can invoke OS 220 routines to attempt to stop a service associated with first driver 604 or to unload first driver 604, and receive a failure response. Additionally or alternatively, the control unit can send a query to first driver 604 via an open handle thereto, and can receive a response from first driver 604 indicating that first driver 604 is in use.

After operation 602 (e.g., in response to the determination that first driver 604 is loaded or in response to the determination that first driver 604 is in use), the control unit can perform installation operations 606. Installation operations 606 can include at least one of, or all of, operations 608-612. Any of the installation operations 606 can include, e.g., copying, deleting, creating, overwriting, or writing files, e.g., by invoking corresponding OS 220 routines (e.g., WriteFile or write(2)); renaming or backing up files, e.g., by invoking corresponding OS 220 routines or system utilities (e.g., tar, bzip2, or CAB utilities); or manipulating file attributes (e.g., using attrib or chmod).

At 608, the control unit can install a second driver 610 (which can represent second driver 228), or at least a portion thereof, to an installed-driver backing store 236 on a nonV memory 216. For example, the control unit can copy at least one file of second driver 610 into C:\windows\system32\drivers or another backing store 236. This can prevent triggering reboot requirements (e.g., reboot notifications indicating that system reboot is required to apply a newly staged driver) of OS 220. Examples are discussed herein, e.g., with reference to updater 266 and FIGS. 2-5. Various examples using operation 608 cause the system to treat the staging (operation 612) as an operation for which no reboot is required.

At 612, the control unit can replace the first driver 604 in a driver store 232 of the nonV memory 216 with the second driver 610. The control unit can do so without replacing the first driver 604 in the volatile memory 214 with the second driver 610. As a result of operation 608, e.g., the driver can be updated in the driver store 232, to be loaded by OS 220 or updater 266 after the next reboot of computing device 200. Operation 612 can include operations of types listed above with reference to installation operations 606.

Examples are discussed herein, e.g., with reference to updater 266 and FIGS. 3 and 5.

At 614, the control unit can determine that the second driver 610 has been loaded into the volatile memory 214. Operation 614 can be performed after operation 612. In some examples, a reboot can take place between operations 612 and 614. In some examples, operation 614 includes, by the OS 220, loading second driver 610 from driver store 232 and executing second driver 610 from volatile memory 214. Examples are discussed herein, e.g., with reference to OS 220, updater 266, and FIG. 5.

In some examples, installation operations 606 are followed by, or operation 614 is otherwise followed by, operation 616. In some examples, the installation operations 606 may be followed by a reboot. The reboot may occur, e.g., at a time not determined by the installation operations 606 themselves. Operation 616 can be performed, in some examples, after the reboot.

At 616, the control unit can write a driver-configuration entry 618 (which can represent driver-configuration entry 404) (e.g., a registry key) in a configuration datastore 620 (which can represent configuration datastore 258 or 402), e.g., the WINDOWS registry. Operation 616 can include creating, deleting, or modifying one or more registry keys or values, or other data in configuration datastore 620. Operation 616 can be performed by the second driver 610 loaded into the volatile memory 214. In this way, the configuration datastore 620 is kept up to date with the second driver 610 that is currently loaded. Examples are discussed herein, e.g., with reference to second driver 228 and FIGS. 2 and 4. In some examples, such as those discussed in the remainder of the discussion of FIG. 6 or elsewhere herein, technique 600 includes performing at least one of the installation operations 606 based at least in part on the driver-configuration file 230, and the driver-configuration file 230 excludes the driver-configuration entry 618.

In some examples, installation operations 606 can include writing an UpperFilter or LowerFilter registry value or other configuration entry (e.g., of a type described herein with reference to driver-configuration entry 404), e.g., to the registry, configuration datastore 620, or another datastore. This configuration entry can trigger OS 220 to load the second driver 610 when conditions corresponding to the value are met, e.g., when an enumerated-bus device is connected to the computing device. For example, this configuration entry can indicate devices for which second driver 606 should be loaded, or other drivers with which second driver 606 should be loaded.

In some examples, operation 616 is performed after each boot of computing device 200. This can permit maintaining current information in configuration datastore 620 even if an installation does not succeed. Some prior schemes store configuration-entry data in driver-configuration file 230. Driver-configuration file 230 may also store instructions used by operation 612, e.g., names of files to update. However, some OSes 220 (e.g., some versions of WINDOWS), may not apply all the information in driver-configuration file 230 transactionally (all or nothing). Instead, OS 220, in these prior schemes, may both copy files and update configuration datastore 620. As a result, if one file-copy or datastore-update fails and another does not, driver store 232 may become inconsistent with configuration datastore 620. Moreover, even if all operations succeed, configuration datastore 620 may not accurately reflect the state of the system until after a reboot, which may lead to incorrect driver or device operation. Some prior schemes attempt to avoid incorrect operation by forcing a reboot immediately after the update. However, as noted above, this can be very disruptive to system operation, particularly if multiple reboots are triggered by successive updates.

By contrast, in some examples, operation 616 does not use driver-configuration file 230 to update configuration datastore 620. Instead, operation 616 is performed by a loaded driver and permits configuration datastore 620 to accurately reflect information associated with the currently-loaded driver. This reduces the probability of system malfunction when upgrading, downgrading, or otherwise replacing a driver.

In some examples, operation 616 is performed when second driver 610 is attached to a device, e.g., when an AddDevice( ) routine of second driver 610 is invoked by OS 220. This reduces the probability of system malfunction due to misconfigured communications between second driver 610 and other system components with respect to a particular device, e.g., an enumerated-bus device.

FIG. 7 is a dataflow diagram that illustrates example techniques 700 for installing or interacting with a driver, and related dataflow (shown dashed for clarity). In some examples, techniques 700 can be performed by a control unit, as described herein, e.g., of a computing device 200. For example, techniques 700 can be performed by updater 266. In some examples, installation operations 606 are preceded or followed by operation 702, operation 702 is followed by operation 614; installation operations 606 are followed by operations 718 or 724; operation 722 is followed by installation operations 606 (e.g., a retry); operation 724 is followed by operation 614; operation 612 includes operation 714; or operation 614 is followed by operation 708. In some examples, operations described herein with reference to second driver 610 can additionally or alternatively be performed by fourth driver 254.

Some examples use operations 702 and 708, e.g., to provide versioning of interfaces or other APIs. For example, before a reboot, a first driver 604 can respond to requests; after the reboot, the second driver 610 can respond to a different interface version. Examples are discussed herein, e.g., with reference to FIG. 5.

At 702, the control unit can respond, by the first driver 604 and before the determining at operation 614, to a first request 704 indicating a first interface version 706. Examples are discussed herein, e.g., with reference to FIGS. 2, 4, and 5, e.g., first driver 226. For example, first driver 604 can respond to first requests 704 after second driver 610 has been stored into nonV memory 216, but before a system reboot or other event has caused second driver 610 to be loaded into volatile memory 214. In some examples not shown, operation 702 is additionally or alternatively performed before performing the installation operations 606.

At 708, the control unit can respond, by the second driver 610 loaded into the volatile memory 214, to a second request 710 indicating a second, different interface version 712. Operation 708 can be performed, e.g., after installation operations 606 or (as shown) after the detection at operation 614. Examples are discussed herein, e.g., with reference to FIGS. 2, 4, and 5, e.g., loaded second driver 506.

At 714, in some examples of operation 612, the control unit can request a driver update by invoking an operating system service routine 716 such as (on WINDOWS) UpdateDriverForPlugAndPlayDevices( ). The driver-configuration file 230 can include or exclude specific items, e.g., as discussed herein with reference to FIG. 2-4 or 6, to manipulate the operation of service routine 716 to provide a desired result, e.g., continued operation of first driver 604 until second driver 610 loads into volatile memory 214. Operation 608 and related operations described herein can also manipulate the operation of service routine 716 to provide a desired result, e.g., absence of a reboot requirement or notification. Service routine 716 can, e.g., cache INF and CAT files for later use, install driver binaries to system folders (e.g., driver store 232); update device interface properties; or reconfigure affected devices to use a new driver.

In some examples, service routine 716 compares drivers in backing store 236 with drivers being installed to determine whether a driver being installed contains a different driver binary than a currently active driver. For example, service routine 716 can use backing store 236 as a proxy for the contents of volatile memory 214. Accordingly, updating backing store 236 (operation 608) before invoking service routine 716 manipulates service routine 716 to determine that the driver binary is the same, and therefore that no reboot (or, in some examples, enumerated-bus device reset, power-cycling, or disconnection) is required.

In WINDOWS, device interface properties are registry values attached to a device instance that can store small pieces of metadata about a device (e.g., an enumerated-bus device or virtual device). The device's driver or other programs (e.g., application 244 or third driver 246) can query device interface properties. In some prior schemes, service routine 716 sets device interface properties based on driver-configuration file 230 when a driver is installed.

In some examples, by contrast, at least some device interface properties are not included in driver-configuration file 230. These properties are set using IoSetDevicePropertyData( ) within the AddDevice( ) routine of second driver 228 (or corresponding initialization routines applicable to drivers on other OSes). This causes the device interface properties to reflect the active driver, since it is the active driver itself that writes them.

Some examples permit rolling back staging of second driver 610 for installation in the event of a failure of another installation or other procedure comprising second installation operations. Accordingly, some examples include performing operations 718 and 722 after performing the installation operations 606 and before determining at operation 614 that the second driver 610 has been loaded into the volatile memory 214. In some examples, operation 722 can be followed by a retry of installation operations 606 (stippled arrow). Various examples of rollback are described herein with reference to FIGS. 8 and 9.

At 718, the control unit can detect failure of a second installation operation 720. For example, a single installer or installation bundle may include two MSI (MICROSOFT Installer) packages or other installation packages, one to perform the installation operations 606 and the other to perform at least the second installation operation 720. The two packages may include related software, e.g., one for second driver 228, 610 and the other for fourth driver 254. Installation of the first package may succeed, but installation of the second package may fail. Operation 718 can include, e.g., determining that the ERRORLEVEL or process exit code from an installation package is nonzero, that an HRESULT or other return value from an installation routine is an error (e.g., −1) or S_FALSE return, or that another system component has flagged an error (e.g., by throwing an exception). Examples are discussed herein, e.g., with reference to updater 266 or FIG. 6, e.g., failure-detection techniques described herein with reference to operation 602.

At 722, the control unit can roll back the installation operations 606. Operation 722 can be performed in response to, or after, operation 718. Operation 722 can include creating, removing, or modifying files or configuration entries, or performing other operations described herein with reference to installation operations 606 in order to reverse the effects of those operations. For example, operation 722 can include restoring files from backups made during installation operations 606. Further examples are described herein with reference to updater 266 and FIGS. 1 and 2. In some examples, the MSI rollback process is used at operation 722 to roll back at least some of the installation operations 606.

In some examples, operation 722 can include selecting at least some of the installation operations 606 to be rolled back. In some examples, any installation operation 606 that completed successfully is selected to be rolled back.

In some examples, a contiguous subsequence of a sequence of the installation operations 606, arranged in the order they were performed, is selected. For example, some of the installation operations 606 may include prerequisite updates to OS 220, or other updates or installations that are required for successful completion of the full installation (possibly including multiple packages' installations, operation 724), but that are meaningful or useful even if the full sequence is not completed. Operation 722 can include selecting all completed installation operations 606 performed after completion of the prerequisite updates, rolling back the selected installation operations, and leaving the prerequisite updates installed.

In some of the above examples and other examples that install multiple interrelated system components, operation 724 is performed after performing the installation operations 606 and before determining at operation 614 that the second driver 610 has been loaded into the volatile memory 214. In some examples, operation 724 is performed before, or repeatedly both before and after, installation operations 606.

At 724, the control unit can install a software module 726 different from the second driver 610. For example, software module 726 can include an application 244, a service or daemon, or another driver, such as fourth driver 254. Operation 724 can include manipulating files or performing other operations described herein with reference to installation operations 606. Examples are discussed herein, e.g., with reference to updater 266 and FIGS. 5 and 6. In some examples, operation 724 can run before installation operations 606 to install prerequisites, and can run after installation operations 606 to install software module 726.

In some examples, an installation process includes installing multiple modules (e.g., drivers or other software modules) configured to interoperate, e.g., by using compatible interface versions. If any of the multiple modules fails, rollback is performed as in FIGS. 7-9. In some examples, each module updates its own driver-configuration entries 404, 618. In this way, whether installation of any particular module of the multiple modules succeeds or fails, it will be possible to roll back to the previous consistent state, e.g., before the commencement of the installation process.

FIG. 8 is a dataflow diagram that illustrates an example technique 800 for attempting to install a driver and rolling back a failed installation, and related dataflow (shown dashed for clarity). In some examples, technique 800 can be performed by a control unit, as described herein, e.g., of a computing device 200. For example, technique 800 can be performed by at least one processing unit 210, e.g., under control of executable instructions of updater 266. In some examples, the control unit, e.g., the processing unit 210, is communicatively connected with a volatile memory 214 and a nonV memory 216. Various examples relate to updating, e.g., by replacing a superseded driver 802 with a replacement driver 804. Replacement driver 804 may have a higher or lower version number than superseded driver 802, or may have the same version number as superseded driver 802 but differ in other ways. For example, superseded driver 802 and replacement driver 804 may have the same interface version number (e.g., provide the same API), but replacement driver 804 may include the fix to a bug present in superseded driver 802.

Some prior schemes, described herein with reference to operation 616, perform multiple update steps in a way that may lead to inconsistent system state. Various examples of technique 800, by contrast, permit rolling back failed installations of drivers or other software modules. Some examples avoid triggering reboot requirements of OS 220.

At 806, the control unit can attempt to perform two or more installation operations 808 (which can represent installation operations 606) of a predetermined operation sequence 810. Each installation operation 808 can include any number of steps. The order of installation operations 808 in operation sequence 810 can be specified in code, e.g., by an ordering of function calls, or in data, e.g., in a configuration file used by an installer. The predetermined operation sequence 810 (e.g., the installation operations 808 thereof) can include first installation operations 812 such as those discussed in the following paragraphs. The term "installation operation" is used for clarity in reference to installation operations 808 and other elements described herein of operation sequence 810. This term does not require that the operations so described relate only to adding new software. "Installation operations" herein can include operations for uninstalling or otherwise removing, installing or otherwise adding, repairing, or modifying software modules (e.g., drivers) or other system components. Examples are discussed herein, e.g., with reference to updater 266, operations 608, 612, or 714, and FIG. 7.

In some examples, installation can include, e.g., enumerating devices; searching for a unique ID among installed devices; creating software (virtual) device(s) and assigning them the unique ID; caching the driver installation package for later use; installing the cached package for use with the software device(s); or creating an UpperFilters registry value under the USB interface class registry key which causes the driver to be loaded during, e.g., initialization of a USB or other enumerated-bus device stack. In some examples, uninstallation can include, e.g., enumerating devices; invoking DiRemoveDevice( ) or another OS 220 service to remove any drivers matching selected criteria (e.g., a unique ID); removing cached driver installation files from the driver store 232; or removing driver-configuration entries 404, 618, e.g., the UpperFilters registry entry.

Technique 800 includes successfully performing zero or more of the installation operations 808, since any of the installation operations may fail. Failure may be due, e.g., to lack of disk space, lack of available RAM, resource conflicts (e.g., a file to be replaced being open in an application 244), network-communication failure (e.g., when retrieving installation files from a server via a network), permission denials (e.g., prohibition of installation operations by system policy or security software), or system or application aborts (e.g., termination due to an uncaught exception, a division by zero, or a general protection fault, GPF, or other attempt to access inaccessible memory).

The first installation operations 812 in operation sequence 810 can include an operation ① (for brevity, not depicted) for installing at least a portion of a replacement driver 804 to an installed-driver backing store 236 (e.g., c:\windows\system32\drivers) on nonV memory 216. Examples are discussed herein, e.g., with reference to operation 608.

The first installation operations 812 in operation sequence 810 can include an operation ② (for brevity, not depicted) for installing the replacement driver 804 in a driver store 232 of the nonV memory 216 without replacing the superseded driver 802 in the volatile memory 214 with the replacement driver 804. Examples are discussed herein, e.g., with reference to operation 612.

For example, the superseded driver 802 can represent the first driver 226, 604 or the third driver 246. The replacement driver 804 can represent the second driver 228, 610 or the fourth driver 254, respectively. In some examples, the first installation operations 812 can permit updating the driver in the driver store 232, to be loaded on or after a subsequent reboot. In some examples, having performed operation ① avoids triggering reboot requirements from OS 220 when operation ② is performed. Examples are discussed herein, e.g., with reference to updater 266 and FIGS. 2-5.

In some examples, the installation operations 808 exclude operations for writing driver-configuration entries 404 or other configuration entries to configuration datastore 620 (e.g., the WINDOWS registry or device-properties store). In some examples, replacement driver 804 updates configuration datastore 620. Driver-configuration entries 404 can include, e.g., interface type 1110, 1708 or version 1112, 1710. Examples are discussed herein, e.g., with reference to FIG. 4 and operation 616.

At 814, the control unit can detect failure of a trigger operation 816 of the two or more installation operations 808, e.g., of one of the first installation operations 812 or of another one of the installation operations 808. Trigger operation 816 is shown separately from first installation operations 812 for clarity, and may or may not be included in first installation operations 812. The trigger operation 816 represents any installation operation 808 that fails, e.g., the first installation operation 808 in operation sequence 810, the last installation operation 808 in operation sequence 810, or any installation operation 808 in operation sequence 810 in between the first and last installation operation 808. Therefore, operation 814 can include detecting failure of any of the two or more installation operations 808, and labeling the failed operation as the trigger operation 816. In some examples, the control unit can detect the failure by inspecting a return value of an executable or routine carrying out trigger operation 816, output data from trigger operation 816, files in nonV memory 216, contents of volatile memory 214, or other data produced by trigger operation 816. Examples are discussed herein, e.g., with reference to updater 266 or operations 602 or 718.

At 818, the control unit can select, in response to the detecting, at least one installation operation 820. The at least one installation operation 820 can precede the trigger operation 816 in the predetermined operation sequence 810. In some examples using operation 818, trigger operation 816 is not the first installation operation 808 in operation sequence 810, e.g., is any operation after the first installation operation 808 in operation sequence 810. In some examples, the at least one installation operation 820 can include at least two installation operations 808 preceding trigger operation 816 in operation sequence 810, e.g., all of the installation operations 808 preceding trigger operation 816 in operation sequence 810. Examples are discussed herein, e.g., with reference to operation 722.

At 822, the control unit can roll back the selected at least one installation operation 820. In some examples, operation 822 can also include rolling back any changes made during the attempt (operation 806) to perform trigger operation 816. Rollback of those changes can be performed, e.g., before rollback of the selected at least one installation operation 820. Examples of rollback are discussed herein, e.g., with reference to operation 722.

FIG. 9 is a dataflow diagram that illustrates example techniques 900 for installing a driver or rolling back an installation, and related dataflow (shown dashed for clarity). In some examples, techniques 900 can be performed by a control unit, as described herein, e.g., of a computing device 200. For example, techniques 900 can be performed by updater 266. In some examples, operation 806 can include operations 908, 912, operation 822 can include operations 916, 918, or both. In some examples, operation 818 can include operation 904. In some examples, operation 822 can include operation 906.

Some examples permit rolling back uninstallation of a superseded driver 802. In some examples, the predetermined operation sequence 810 (e.g., the installation operations 808 thereof) comprises second installation operation(s) 902 for uninstalling the superseded driver 802 from the nonV memory 216. The second installation operation(s) 902 precede (immediately, or with at least one intervening operation, and likewise throughout this document) the first installation operations 812 in the predetermined operation sequence 810. The second installation operation(s) 902 precede the trigger operation 816 in the predetermined operation sequence 810. Therefore, detection of failure of the trigger operation 816 at operation 814 permits determining that the second installation operation(s) 902 succeeded, in examples in which performance of installation operations 808 of operation sequence 810 is discontinued on the first failure (e.g., make(1) for non-"-" commands).

Some examples using second installation operation(s) 902 increase computing-system robustness by causing only one version of a particular driver 226, 228 or 246, 254 to be installed on a computing device 200 at any given time. Some prior schemes permit installing later versions, e.g., of PnP drivers, without first removing earlier versions. This can increase the probability that modules will attempt to communicate with superseded modules, or modules providing an incompatible interface. By contrast, techniques herein using uninstallation before installation permit a module to readily determine whether the expected module is currently functioning, which can increase system robustness.

At 904, which can be part of the selecting operation 818, the control unit can select at least the second installation operation(s) 902 as, or in, the selected installation operation(s) 820. Operation 904 can be performed, e.g., in response to both failure of the trigger operation 816 and the second installation operation(s) preceding the trigger operation 816. Examples are discussed herein, e.g., with reference to operation 722.

At 906, the control unit can install the superseded driver 802 to the nonV memory 216. Operation 906 can be performed as part of the operation of rolling back the first installation operation(s) (operation 822). For example, the control unit can install the superseded driver 802 to driver store 232, backing store 236, or both. Operation 906 can include loading the superseded driver 802 into volatile memory 214 in some examples. Examples are discussed herein, e.g., with reference to updater 266, FIGS. 2 and 5, installation operations 606, and operation 724.

Some examples permit rolling back multiple installation operations in reverse order. Some of these examples include operations 908-918.

At 908, the control unit can complete an earlier installation operation 910 of the two or more installation operations 808. Earlier installation operation 910 can be the first installation operation 808 or any installation operation 808 other than the last. Examples are discussed herein, e.g., with reference to updater 266 and installation operations 606. In some examples, earlier installation operation 910 includes installing a first MSI, RPM, tarball, or other package.

At 912, the control unit can complete, subsequent to operation 908, a later installation operation 914 of the two or more installation operations 808. Later installation operation 914 can be the second installation operation 808 or any installation operation 808 other than the first. Earlier installation operation 910 and later installation operation 914 are described as "earlier" and "later" with reference to each other. Examples are discussed herein, e.g., with reference to updater 266 and installation operations 606. In some examples, later installation operation 914 includes installing a second, different MSI, RPM, tarball, or other package.

At 916, e.g., as part of the rolling back (operation 822), the control unit can roll back the later installation operation 914. Examples are discussed herein, e.g., with reference to operation 722.

At 918, the control unit can roll back, subsequent to operation 912, the earlier installation operation 910. Examples are discussed herein, e.g., with reference to operation 722. Rolling back installation operations 910, 914 in the opposite order of that in which they were performed can increase the probability of successful rollback.

FIG. 10 is a dataflow diagram that illustrates an example technique 1000 for providing an interface and communicating via the interface, and related dataflow (shown dashed for clarity). In some examples, techniques 1000 can be performed by a control unit, as described herein, e.g., of a computing device 200. For example, techniques 1000 can be performed by first driver 226, 604 or second driver 228, 610.

At 1002, the control unit can instantiate an interface 1004, which can represent interface 260, 262, 264, or 510. The interface 1004 is associated with a service routine 1006. Service routine 1006 can be, e.g., a callback or other function invoked by OS 220 (e.g., by bus manager 222) when a message is sent across the interface. Service routine 1006 can additionally or alternatively be a process, thread, or other unit of execution that interacts with consumers via a system-local communications interface such as a UNIX-domain socket. Operation 1002 can include invoking OS-provided routines to create resources of any of the types discussed in the following examples of service routine 1006.

In some examples, service routine 1006 can directly implement operations described herein, or other communications or use-case-specific functions. Additionally or alternatively, service routine 1006 can call a worker function through a reference ("ref" or, in the figures, "(ref)") accessible to service routine 1006, and the worker function can perform operations described herein with reference to service routine 1006. Additionally or alternatively, service routine 1006 can perform some functions described herein, and can invoke a worker function to perform other functions described herein.

A ref can include, e.g., a function pointer such as a C "void (*fptr)( )"; a subroutine reference such as a Perl "\&routine"; a call gate, interrupt gate, or other invokable gate, e.g., of an x86 or x64 CPU architecture; an interrupt or system-call number, e.g., the EAX value for an int 0x80 syscall on x86 LINUX or the RAX value for a SYSCALL on x64 LINUX; a pointer to an instance (e.g., a vtable) supporting a predetermined interface or operation, e.g., in C++, "T*" or "T&", where instances of type T support "predetermined_operation( )" or where type T inherits from a predetermined class (concrete, pure-virtual, or otherwise), or in Java, "T", where instances of type T support "predetermined_operation( )" or where type T inherits from a predetermined class, or implements a predetermined interface; both an instance pointer (or equivalent, e.g., a C++ reference) and a member-function pointer, e.g., in C++, "instance_pointer->*mfptr( )"; or a pointer to a COM, DCOM, CORBA, D-Bus, XPCOM, or other object-system interface supporting a predetermined operation. In some examples, a function pointer or method pointer comprises a memory location at which can be found executable code that expects parameters and provides results using a predefined calling convention (e.g., specifying register assignments, memory layouts, stack cleanup, or other function-calling details).

In some examples, operation 1002 can include performing, or requesting or triggering OS 220 to perform, any of the following: allocating memory, allocating hardware resources (e.g., IRQ lines or I/O ports), initializing or populating device-descriptor structures, or communicating with other driver(s) or with device(s). In some examples, operation 1002 includes invoking the WINDOWS IoCreateDevice( ) routine to create a DEVICE_OBJECT device-descriptor structure.

In some examples, the interface 1004 can support a query-functions operation by which a consumer can request refs to routines implemented by the interface 1004. For example, a PnP driver (e.g., first driver 226) can respond to a PnP IRP_MN_QUERY_INTERFACE IRP with a structure containing one or more refs to routines. Additionally or alternatively, a provider can respond to an NmrClientAttachProvider request by providing, in a ProviderAttachCallback, an NPI dispatch table including one or more refs to routines. A consumer (e.g., third driver 246) can then invoke any of those routines as indirect function calls, rather than having to invoke via OS 220. OS 220, in some examples, facilitates use of the query-functions operation by making memory of first driver 226 executable by third driver 246 so that third driver 246 can make such a function call. In these and other examples, service routine 1006 can be a routine listed in such a structure or other response to a query-functions operation. In some examples, the structure can be or include a vtable or other object structure, e.g., a COM/DCOM interface pointer.

At 1008, the control unit can receive, by the service routine 1006, a verification message 1010. For example, the service routine 1006 can be invoked or otherwise called by the OS 220. In some examples, the service routine 1006 is a dispatch function referenced by a function-pointer member of a WINDOWS DRIVER_OBJECT descriptor structure, the function-pointer member associated with a request type (IRP_MJ_*). The dispatch-function service routine 1006 is called by OS 220 to handle a request of that request type. Verification message 1010 can include at least: a message type or other data indicating that message 1010 is a verification message; parameters of message 1010, e.g., an interface type or version (as discussed below); pointers or other references to parameters; or information indicating how the sender of the verification message 1010 expects to receive outputs provided by the control unit or responses to message 1010 (e.g., pointers or other references to output buffers).

In some examples, the service routine 1006 can be invoked by a module other than OS 220, and provided the verification message 1010 as one or more parameters, or in a buffer that is provided as a parameter. This can be done, e.g., after a query-functions operation—the consumer can invoke the service routine 1006 directly rather than relying on OS 220 to invoke service routine 1006. In some examples, query-functions operations and direct invocation are used only between a kernel-mode producer and a kernel-mode consumer. In some examples, OS 220 invokes a handler routine provided by an object file (e.g., as discussed herein with reference to FIG. 2). That handler routine then invokes a service routine 1006 of a linked executable of first driver 226.

In some examples, the service routine 1006 blocks on a select(2) or read(2) call, e.g., of a UNIX-domain socket. OS 220 wakes up service routine 1006 when data become available or the conditions of the select( ) are satisfied. Service routine 1006 then performs operation 1008, e.g., including receiving a return value of the select( ) or read( ).

In some examples, the service routine 1006 is a POSIX signal handler for a particular signal (e.g., SIGUSR1). When the signal is sent to a process implementing service routine 1006, OS 220 schedules service routine 1006 to be executed in a thread of that process. In some examples, OS invocation of service routine 1006, select( ), read( ), or other IPC, or signal delivery can be used between user-mode and kernel-mode processes, or between two user-mode processes.

In some examples, the service routine 1006 is a provider function associated with a Network Programming Interface (NPI) of the WINDOWS Network Module Registrar (NMR), and interface 1004 is an NPI associated with a predetermined identifier, e.g., a GUID. The NMR consumer receives a provider dispatch table when attaching, and can then invoke provider functions for which the dispatch table provides refs. NPI/NMR can be used, e.g., for communication between two kernel-mode components.

In some examples, the service routine 1006 is registered with a callback object (executive callback). The callback object can have a predetermined name, e.g., a string passed to InitializeObjectAttributes( ). The consumer can invoke the callback object by calling ExNotifyCallback( ). In some examples, callback objects are used for communication between kernel-mode components.

In some examples, a ref to service routine 1006 (e.g., a function pointer or other ref described above) is stored in a driver-object extension created by calling IoAllocateDriverObjectExtension( ). The consumer can call ObOpenObjectByName( ) to retrieve the driver object associated with a predetermined name, then call IoGetDriverObjectExtension( ) to get the driver-object extension associated with a predetermined client-identification address. The consumer can then invoke service routine 1006 via an indirect call through the ref. In some examples, driver-object extensions are used for communication between kernel-mode components.

The verification message 1010 can be received via a write operation, an ioctl operation, or another operation. For example, the service routine 1006 can be a handler for an IRP_MJ_WRITE (write, from user or kernel mode), IRP_MJ_DEVICE_CONTROL (ioctl, from user or kernel mode), or IRP_MJ_INTERNAL_DEVICE_CONTROL (ioctl, from kernel mode) IRP, or an ioctl(2) call. For example, a service routine 1006 associated with an IRP_MJ_DEVICE_CONTROL ioctl can receive the verification message 1010 in an input buffer referenced in the IRP_MJ_DEVICE_CONTROL IRP.

At 1012, the control unit can send a confirmation message 1014 via the interface 1004. Operation 1012 can be performed, e.g., in response to receipt of the confirmation message 1014. For example, the confirmation message 1014 can be an HRESULT or other return value of service routine 1006. Additionally or alternatively, the confirmation message 1014 can be loaded into an output buffer that is referenced in an ioctl IRP or that is provided as a parameter to the file operations member implementing ioctl (e.g., on LINUX). Additionally or alternatively, the confirmation message 1014 can be added to a queue of data (stream or message) accessible via a read operation.

In some examples, the control unit can send the confirmation message 1014 by calling ExNotifyCallback( ) to signal callback(s) registered by consumer(s) with a callback object (executive callback). The callback object can have a predetermined name.

In some examples, operation 1012 includes, before sending the confirmation message 1014, validating an interface type or a version (or both) included in or otherwise identified by verification message 1010. For example, the control unit can determine that the interface type is supported by first driver 226, or that the version is a version that first driver 226 is configured to use. OS-provided communications mechanisms often provide raw byte transfers without semantic checks. Validating the interface type or version can permit detecting mismatches that might otherwise cause improper operation or reduced functionality. Some examples of validation are described herein with reference to operations 1706 and 1712.

FIG. 11 is a dataflow diagram that illustrates an example technique 1100 for communicating via an interface, and related dataflow (shown dashed for clarity). In some examples, technique 1100 can be performed by a control unit, as described herein, e.g., of a computing device 200. For example, technique 1100 can be performed by third driver 246 or fourth driver 254. In some examples, technique 1100 can be used together with technique 1000. This is indicated by use of some common reference numbers between FIGS. 10 and 11. In other examples, technique 1100 can be used independently of technique 1000, and vice versa.

At 1102, the control unit can locate the interface 1004. For example, the control unit can call SetupDiGetClassDevs( ) and SetupDiEnumDeviceInterfaces( ) functions from user mode to enumerate devices and interfaces that are active on a WINDOWS system. Additionally or alternatively, the control unit can call IoGetDeviceInterfaces( ) from kernel mode to perform this enumeration. On a UNIX (including UNIX-like, e.g., GNU/Linux, and likewise throughout) system, the control unit can use readdir(3) or getdents(2) to read directory entries in the /dev or /proc trees, or in another predetermined location on a filesystem. Examples are discussed above.

From an appropriate one of these sets of interfaces or names, the control unit can select the interface 1004 matching predetermined criteria. For example, on WINDOWS, the control unit can select the first interface 1004 matching a predetermined device interface class GUID. Additionally or alternatively, the control unit can select the first interface 1004 matching a predetermined glob pattern, e.g., </var/provider/pipe/*> or <\\.\pipe\provider*>, or (on UNIX) can select the interface 1004 associated with a given (major, minor) device-number pair (e.g., (13, 37)). The criteria can be provided to routines of OS 220 (e.g., SetupDI*( )) to locate candidate interface(s), can be applied to a list of candidates provided by OS 220 after calling readdir( ) or similar functions, or both. Operation 1102 can include locating a path or other identifying information that can be used to access interface 1004, e.g., "/var/provider/pipe/0" or "ACPI#PNP#{6378776d-696b-4656-8f6c-646669656c64}". Examples are discussed above.

At 1104, the control unit can open a handle 1106 to the interface 1004. For example, the control unit can call CreateFile( ), open(2), fopen(3), connect(2) (e.g., for UNIX-domain sockets) shmat(2) (e.g., for a POSIX shared-memory communications mechanism), or other file-access or IPC functions using the path or other identifying information determined at operation 1102. The OS 220 can provide the handle 1106. Handle 1106 can include a file number, file descriptor, FILE*, HANDLE, pointer to an attached shared-memory segment, or other value usable with, or facilitated by, services of OS 220 to identify the interface 1004. Examples are discussed above.

In some examples, the control unit can open more than one handle to the interface 1004. For example, the control unit can open separate read and write file descriptors, or can open both a file handle (or descriptor) and a handle (or descriptor) to an event that can be signaled (e.g., CreateEvent( )).

At 1108, the control unit can send the verification message 1010 via the handle 1106. For example, the control unit can invoke DeviceIoControl( ), WriteFile( ), ioctl(2), write(2), fprintf(3), fputs(3), or other functions that associate data with handle 1106; can write data to a shared-memory segment associated with handle 1106; or can retrieve function pointer(s) or other information associated with handle 1106 and invoke routines via those pointer(s) or other information. The verification message can identify (e.g., include data representing) at least an interface type 1110 or a version 1112. For example, interface type 1110 and version 1112 can be represented by GUIDs (in binary or textual representations), integer numbers, or strings (e.g., reverse domain names). Additionally or alternatively, the control unit can signal an event (e.g., SetEvent( ) or kill(2)).

At 1114, the control unit can receive, via the handle 1106, the confirmation message 1014 associated with the verification message 1010. For example, the control unit can receive a return value or output buffer from a DeviceIoControl( ) or ioctl( ) call as confirmation message 1014. Additionally or alternatively, the control unit can call read(2), fgets(3), fscanf(3), or similar functions to retrieve data of confirmation message 1014 from handle 1106. Receiving the confirmation message 1014 can indicate to the control unit that communications have been established, e.g., that the interface type 1110 or version 1112 sent in the verification message 1010 have been accepted. Verification of the interface type 1110 or version 1112 can permit communication between modules even if one may have been upgraded or downgraded differently from the other and therefore be expecting a different type 1110 or version 1112 than the other.

Figure 12:
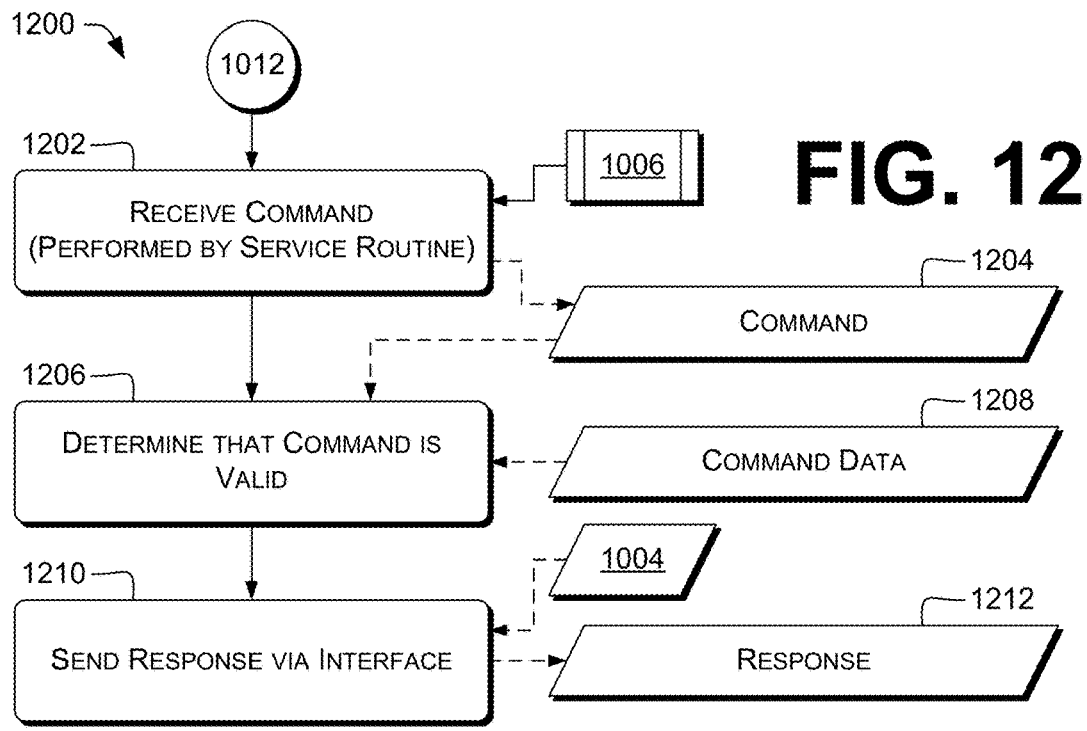
FIG. 12 is a dataflow diagram that illustrates an example technique for responding to commands sent via an interface.

FIG. 12 is a dataflow diagram that illustrates an example technique 1200 for providing an interface and responding to commands sent via the interface, and related dataflow (shown dashed for clarity). In some examples, technique 1200 can be performed by a control unit, as described herein, e.g., of a computing device 200. For example, techniques 1000 can be performed by first driver 226, 604 or second driver 228, 610. In some examples, operation 1012 can be followed by operation 1202.

At 1202, the control unit can receive, by the service routine 1006, a command 1204, which can include a command identifier, parameters, or other data. The command 1204 can include data received via a write or ioctl operation, or another operation. Examples are discussed herein, e.g., with reference to operation 1008. Command 1204 can include a command identifier or other data, e.g., described herein with reference to verification message 1010.

In some examples, command 1204 does not identify an interface type, does not identify a version, or identifies neither an interface type nor a version. Verifying type or version (operations 1008 and 1012) before receiving command 1204 can permit omitting the verified information from command 1204. This can reduce the amount of data to be transferred as part of command 1204, which can save memory and reduce the transmission or processing time of command 1204.

At 1206, the control unit can determine that the command 1204 is a valid command based at least in part on stored command data 1208 (which can represent command data described herein with reference to FIG. 2) associated with the interface 1004. For example, the command data 1208 can include data for each of one or more supported commands. For each supported command, the command data 1208 can indicate at least one of: a minimum version that supports the command, an amount of required input, an amount of optional input, type(s) of required input data, type(s) of optional input data, an amount of required buffer space for output, type(s) of output data, or a command identifier, such as a number or name. Verifying type or version, either before receiving command 1204 or as part of operation 1206, can reduce the probability of negative effects on a computing system due to bugs or version mismatches of software components running on that system and communicating via interface 1004, and can reduce the attack surface of interface 1004.

In some examples, the control unit can check a command identifier provided in command 1204 to see if a command having that identifier is present in command data 1208. The control unit can additionally or alternatively check version 1112 (if provided) to make sure that it is at least the minimum version specified for that command. The control unit can additionally or alternatively check provided input or output buffer(s) to see whether they meet size or type requirements specified for that command. Types can be checked using, e.g. type fields of type-length-value formats such as ASN.1 encodings or protobufs.

At 1210, the control unit can send, via the interface, a response 1212 to the command 1204. For example, the control unit can return an HRESULT, integer, or Boolean return value, or can provide data in response to the command 1204 (e.g., in response to a query command). Additionally or alternatively, the control unit can load data of response 1212 into a buffer provided by the caller, e.g., as part of an ioctl operation. Examples are discussed herein, e.g., with reference to operation 1012.

Figure 13:
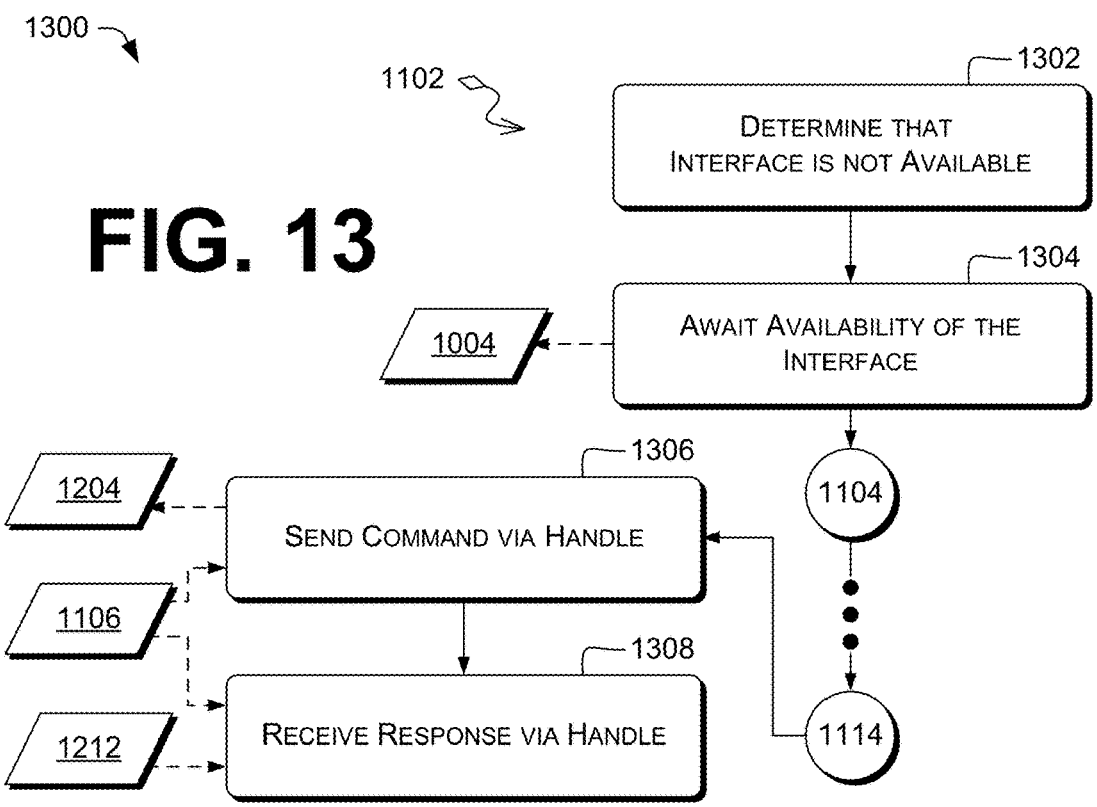
FIG. 13 is a dataflow diagram that illustrates example techniques for locating and communicating via an interface.

FIG. 13 is a dataflow diagram that illustrates example techniques 1300 for locating and communicating via an interface, and related dataflow (shown dashed for clarity). In some examples, techniques 1300 can be performed by a control unit, as described herein, e.g., of a computing device 200. For example, technique 1100 can be performed by third driver 246 or fourth driver 254. In some examples, operations 1302 and 1304 can precede operation 1104. For example, operation 1102 can include operations 1302 and 1304. In some examples, operation 1114 can be followed by operation 1306.

In some examples, e.g., of a PnP driver, the interface 1004 may not be available at the time a consumer wishes to make use of it. For example, the lifecycle (e.g., startup/activation/deactivation/shutdown triggers and timing) of PnP drivers is controlled by OS 220. Therefore, if OS 220 begins running third driver 246 before initializing first driver 226, third driver 246 will not be able to interact with first driver 226 via interface 1004. Some of these examples use operations 1302 and 1304 to permit drivers 226, 246 to be loaded in either order and still communicate. This can permit interactions between software modules (e.g., drivers or applications) with different lifecycle models regardless of the load or activation order of those modules.

At 1302, the control unit can determine that the interface 1004 is not available. For example, the control unit can use SetupDi*( ) routines, readdir( ), or other routines described herein with reference to operation 1102 to attempt to locate interface 1004. In some examples, OS 220 indicates that, or the control unit determines that, no devices of the given device interface class exist, or that no device nodes of particular names or (major, minor) pairs exist. In other examples, OS 220 indicates that, or the control unit determines that, interface 1004 is unavailable, e.g., because a process other than that executing operation 1302 has an exclusive lock on interface 1004 or a device associated therewith or is holding a semaphore or mutex controlling access to interface 1004. In response to any of those, the control unit makes the determination that interface 1004 is not available.

At 1304, the control unit can await availability of the interface 1004. Operation 1304 can be performed subsequent (e.g., in response) to operation 1302. For example, the control unit can sleep, busy-wait, or otherwise wait until the interface 1004 or a device or driver associated there with is loaded, activated, or released by a process holding an exclusive lock. In some examples, the control unit can call select( ), WaitForSingleObject( ), WaitForMultipleObjectsEx( ), read( ), sem_wait(3), or other functions that wait for an event associated with interface 1004 to occur, a condition variable associated with interface 1004 to be signaled, or a lock on interface 1004 to be released.

In some examples, interface 1004 is associated with a PnP driver or other driver for which OS 220 supplies lifecycle notifications. In some examples, operation 1304 can include, in kernel mode (e.g., by third driver 246), calling IoRegisterPlugPlayNotification( ) or another notification function, and providing a ref to a callback to be invoked when interface 1004 becomes available, or may have become available. In some examples, the control unit provides OS 220 information identifying interface 1004, e.g., a GUID, and OS 220 invokes the callback only when that specific interface 1004 becomes available. In other examples, OS 220 invokes the callback whenever an interface becomes available that may be the interface 1004, e.g., when any new instance of a specific device interface class is enabled (GUID_DEVICE_INTERFACE_ARRIVAL). The control unit then, in the callback, determines whether the interface is interface 1004. If not, the control unit continues to wait for other invocations of the callback.

In some examples, operation 1304 can include, in kernel mode or user mode, calling RegisterDeviceNotification( ) or another function that registers for notifications when interfaces arrive, e.g., all interfaces, or interfaces matching predetermined criteria. Operation 1304 can then include waiting for such a notification from OS 220. Examples are discussed herein, e.g., with reference to service routine 1006.

In some examples, operation 1304 includes waiting for, or receiving, a notification from OS 220. For example, the notification can be a WM_DEVICECHANGE message of a DBT_DEVICEARRIVAL subtype. In some examples, the control unit provides OS 220 with information identifying interface 1004, e.g., a GUID, and OS 220 sends the notification only when that specific interface 1004 becomes available. In other examples, OS 220 invokes the notification whenever an interface becomes available that may be the interface 1004, e.g., when any new instance of a specific device interface class is enabled. The control unit then, in response to the notification, determines whether the interface is interface 1004. If not, the control unit continues to wait for other notifications.

In some examples, operation 1304 includes creating a process, a thread or other lightweight process (LWP), or a hidden window in which callbacks will be invoked, or to which notifications will be delivered. Some examples of a user-mode consumer awaiting an interface 1004 provided by a user- or kernel-mode provider include creating a hidden window to receive the WM_DEVICECHANGE or other notification. Some examples of a kernel-mode consumer awaiting an interface 1004 provided by a kernel-mode provider include creating a thread in which device-notification callbacks will be invoked.

Some examples including creating or signaling a thread or other LWP to take action in response to a callback or other notification. Some examples of a kernel-mode consumer awaiting an interface 1004 provided by a kernel-mode provider include creating or signaling a worker thread in response to a notification callback. The worker thread can then perform filtering or other processing with reduced chance of deadlock due to activation of an interface by a thread other than a thread in which the callback is delivered.

In some examples, once the handle 1106 is open and the interface 1004 is verified (e.g., by performing operations 1108, 1008, 1012, 1114, e.g., in that order), commands can be sent via the handle 1106. Some of these examples include operations 1306 and 1308.

At 1306, the control unit can send, via the handle 1106, the command 1204. Examples are discussed herein, e.g., with reference to operation 1108. In some examples, command 1204 does not identify an interface type, does not identify a version, or identifies neither an interface type nor a version. Examples are discussed herein, e.g., with reference to operation 1206. Command 1204 can be a command defined in, or that otherwise accords with, command data 1208. After operation 1306 is performed, the provider can perform operations 1206 and 1210.

At 1308, the control unit can receive, via the handle 1106, the response 1212 to the command 1204. Examples are discussed herein, e.g., with reference to operation 1114. For example, operation 1308 can take place in a consumer subsequent to performance by the provider of operation 1210.

Figure 14:
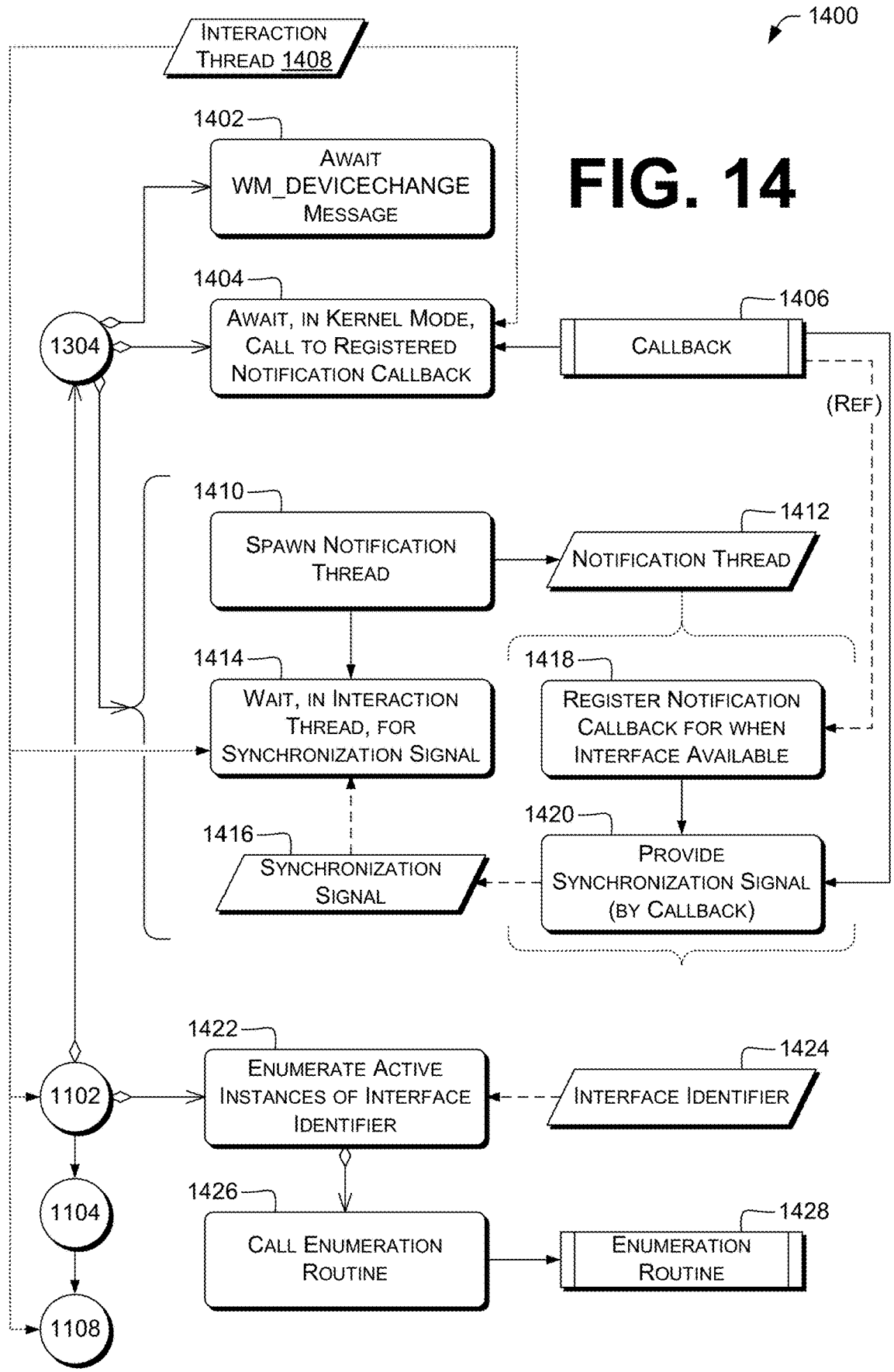
FIG. 14 is a dataflow diagram that illustrates example techniques for communicating via an interface.

FIG. 14 is a dataflow diagram that illustrates example techniques 1400 for communicating via an interface, and related dataflow (shown dashed for clarity). In some examples, techniques 1400 can be performed by a control unit, as described herein, e.g., of a computing device 200. For example, techniques 1400 can be performed by third driver 246, fourth driver 254, or another consumer of an interface 260, 262, 264. As noted above, operation 1102 can include operation 1304. In some examples, operation 1304 can include operation 1402; operation 1304 can include operation 1404; operation 1304 can include operations 1410 and 1414; operation 1304 can be preceded by operation 1410 and include operation 1414; or operation 1102 can include operation 1422.

At 1402, the control unit can await a WM_DEVICE-CHANGE message. For example, the control unit can await the message in a user mode by running a message loop of a predetermined window until a window procedure of that window is called with a message type of WM_DEVICE-CHANGE (and, in some examples, a WPARAM of DBT_DEVICEARRIVAL or DBT_DEVNODES_CHANGE). In some examples, operation 1402 or 1304 includes calling RegisterDeviceNotification( ) to request from OS 220 delivery of the WM_DEVICECHANGE message before awaiting the message. Examples are discussed herein, e.g., with reference to operation 1304.

At 1404, the control unit can await, in a kernel mode, a call to a registered notification callback 1406. In some examples, operation 1404 or 1304 includes calling IoRegisterPlugPlayNotification( ) or a similar routine to register notification callback 1406 to be invoked by OS 220 when interface 1004, or a device supporting interface 1004, becomes available. In some examples, represented by the stippled arrow, operation 1404 is performed by an interaction thread 1408 (or other LWP or process) of a consumer such as third driver 246. The interaction thread 1408 can block, e.g., in a call to read( ), WaitForSingleObject( ), or similar synchronization functions, until notification callback 1406 runs and satisfies the condition for which the synchronization function is waiting. Additionally or alternatively, the interaction thread 1408 can sleep after registering the callback, and the callback can perform operations responsive the availability of interface 1004 or a device supporting interface 1004.

Some examples of kernel-mode communication use multiple threads in a producer or a consumer. In some examples, the verification message 1010 is sent (operation 1108) by interaction thread 1408. In some of these examples, operation 1304 can include performing operations 1410-1420 in a kernel mode.

At 1410, the control unit can spawn a notification thread 1412. The notification thread can be a thread that will be notified by OS 220 (e.g., a PnP manager) when interface 1004 becomes available. For example, the control unit can call PsCreateSystemThread( ), IoCreateSystemThread( ), kthread_create( ), or another thread-creation routine.

At 1414, the control unit can wait, in the interaction thread 1408, for a synchronization signal 1416. The synchronization signal 1416 can be, e.g., a WINDOWS window-procedure event, signaling of a WINDOWS event object, a semaphore V( ), a mutex release, a POSIX signal, signaling of a condition variable, writing of data to a pipe, or another occurrence detectable by interaction thread 1408. Examples are discussed herein, e.g., with reference to operation 1404.

At 1418, the control unit can register the notification callback 1406 to be executed in the notification thread 1412 when the interface 1004 becomes available. Examples are discussed herein, e.g., with reference to service routine 1006, operation 1304, and operation 1404. For example, the control unit can provide a ref to notification callback 1406 to a registration routine of OS 220. Registration can be performed in either thread 1408, 1412 as long as the notification is delivered in the notification thread 1412. Operations 1414 and 1418 are mutually independent. In some examples, operation 1418 is performed before operation 1414.

Subsequent to operation 1418, the notification callback 1406 can be invoked by OS 220. At 1420, the control unit can, by the notification callback 1406, provide the synchronization signal 1416. For example, the notification callback 1406 can signal any of the types of signals described herein with reference to operation 1414. Receiving the notification from OS 220 in notification callback 1406 running in notification thread 1412, and then delivering the notification to interaction thread 1408, can reduce the risk of deadlock due to concurrent attempts by multiple threads to access PnP drivers in WINDOWS, for example. Examples are discussed herein, e.g., with reference to operation 1304.

In some examples, the locating (operation 1102) is performed by the interaction thread 1408. The interaction thread 1408 can run in user mode or kernel mode. In some of these examples, operation 1102 can include operation 1422.

At 1422, the control unit can enumerate active device instances associated with a predetermined interface identifier 1424, e.g., a device class interface GUID. Examples of identifiers are discussed herein, e.g., with reference to interface type 1110. Examples are discussed herein, e.g., with reference to operation 1102. In some examples, operation 1422 can include operation 1426.

At 1426, the control unit can call an enumeration routine 1428 associated with the mode of the interaction thread 1408. For example, one enumeration routine 1428 can be used in user mode (e.g., SetupDiGetClassDevs( ) or SetupDiEnumDeviceInterfaces( )), and a different enumeration routine 1428 can be used in kernel mode (e.g., IoGetDeviceInterfaces( )).

Figure 15:
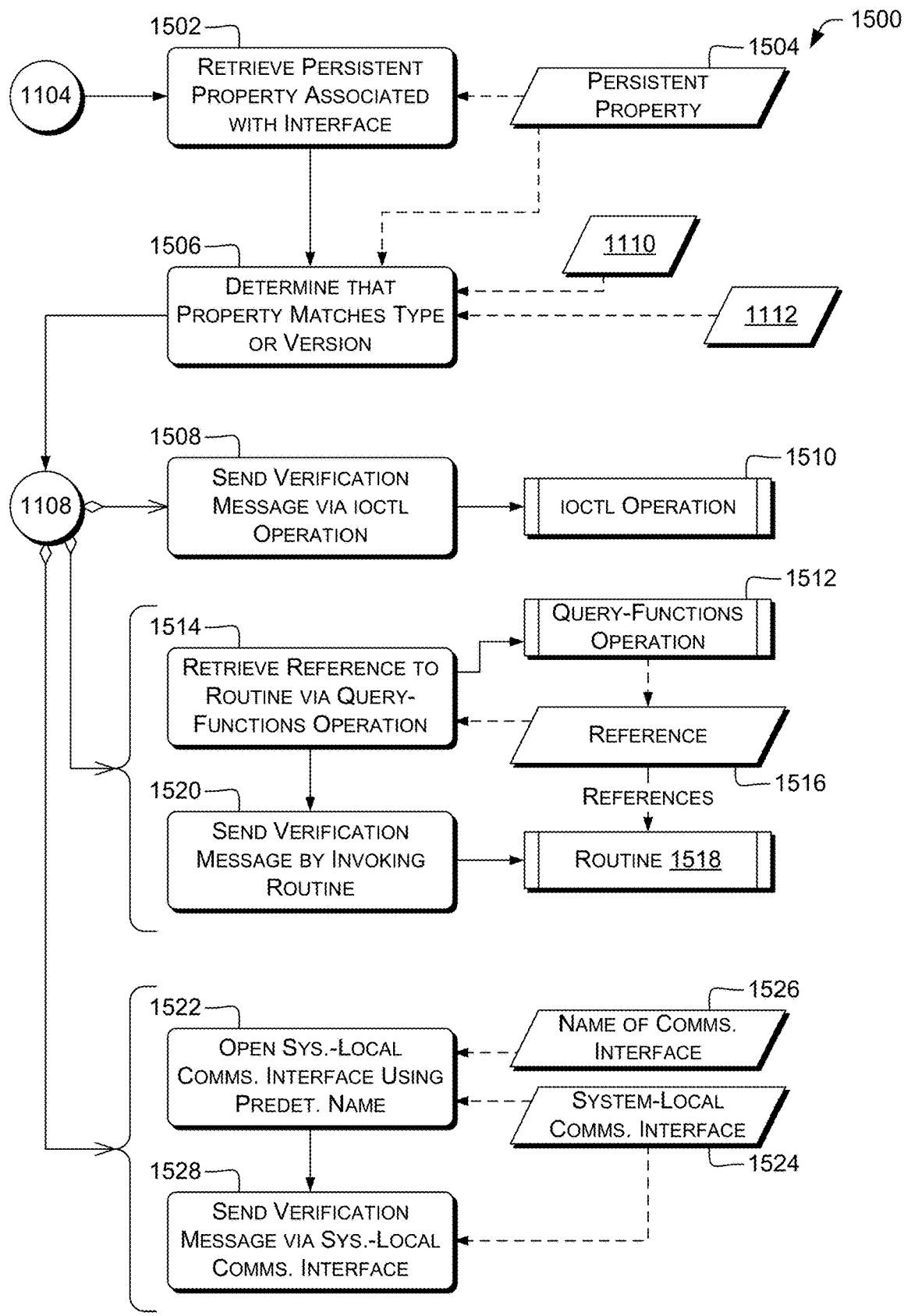
FIG. 15 is a dataflow diagram that illustrates example techniques for communicating via an interface.

FIG. 15 is a dataflow diagram that illustrates example techniques 1500 for communicating via an interface, and related dataflow (shown dashed for clarity). In some examples, techniques 1500 can be performed by a control unit, as described herein, e.g., of a computing device 200. For example, techniques 1500 can be performed by third driver 246, fourth driver 254, or another consumer of an interface 260, 262, 264. In some examples, operation 1104 is followed by operation 1502; operation 1506 is followed by operation 1108; operation 1108 includes operation 1508; operation 1108 includes operations 1514 and 1520; operation 1108 is preceded by operation 1514 and includes operation 1520; operation 1108 includes operations 1522 and 1528; or operation 1108 is preceded by operation 1522 and includes operation 1528. In some examples, operations 1502 and 1506 are performed after opening handle 1106 (operation 1104) and before sending verification message 1010 (operation 1108).

At 1502, the control unit can retrieve a persistent property 1504 associated with the interface 1004. The persistent property 1504 can be, e.g., an interface version or an interface type. For example, the control unit can call SetupDiGetDeviceProperty( ) (e.g., from user or kernel modes) or IoGetDeviceProperty( ) (from kernel mode). Persistent property 1504 can be stored in registry 258 or another configuration datastore, e.g., configuration datastore 402 or 620, the WINDOWS device metadata store, or another datastore that can retain values, e.g., across system reboots. In some examples, the provider (e.g., first driver 226) creates persistent property 1504 upon installation. For example, persistent property 1504 can be a device property value associated with a custom device property category (e.g., a GUID) and a property identifier (e.g., numeric).

At 1506, the control unit can determine that the persistent property 1504 matches the corresponding one of the interface type 1110 and the version 1112. For example, the control unit can determine that value of the persistent property 1504 is equal to a value of the corresponding one of the interface type 1110 and the version 1112.

In some examples, testing for matches at operation 1506 can include comparing values with a test other than equality. For example, interface type 1110 or version 1112 can specify a minimum or maximum value, or a range of values. Operation 1506 can include determining that the persistent property 1504 is at least the minimum, at most the maximum, or within the range. This can permit communication between modules (e.g., drivers or applications) that support different but overlapping ranges of versions.

At 1508, the control unit can send the verification message 1010 via an ioctl operation 1510 supported by interface 1004. Examples are discussed herein, e.g., with reference to service routine 1006 or operation 1108.

In some examples, operation 1108 is performed by an interaction thread 1408 running in kernel mode, as discussed above with reference to FIG. 14. The interface supports a query-functions operation 1512, e.g., IRP_MJ_PNP/IRP_MN_QUERY_INTERFACE, CoCreateInstance( ), or NmrRegisterClient/ClientAttachProvider (NPI). Examples are discussed herein, e.g., with reference to service routine 1006. Some of these examples include operations 1514 and 1520.

At 1514, the control unit can retrieve from the interface 1004, using the query-functions operation 1512, a ref 1516 to a routine 1518. Examples are discussed herein, e.g., with reference to operations 1002 or 1826.

At 1520, the control unit can send the verification message by invoking the routine 1518. For example, the control unit can perform an indirect call or other dispatch through the ref 1516. Examples are discussed herein, e.g., with reference to service routine 1006 or operation 1008.

At 1522, the control unit can open a system-local communications interface 1524 (which can represent an OS-provided communications mechanism) using a predetermined name 1526 of the system-local communications interface 1524. The system-local communications interface 1524 can be, e.g., a UNIX-domain socket. Examples are discussed herein, e.g., with reference to OS-provided communications mechanisms throughout, or operations 1008, 1104, or 1808.

At 1528, the control unit can send the verification message 1010 via the system-local communications interface 1524. For example, the control unit can call write( ), send( ), sendto( ), sendmsg( ), WriteFile( ), ioctl( ), or other writing functions that provide data to the underlying module associated with handle 1106.

Figure 16:
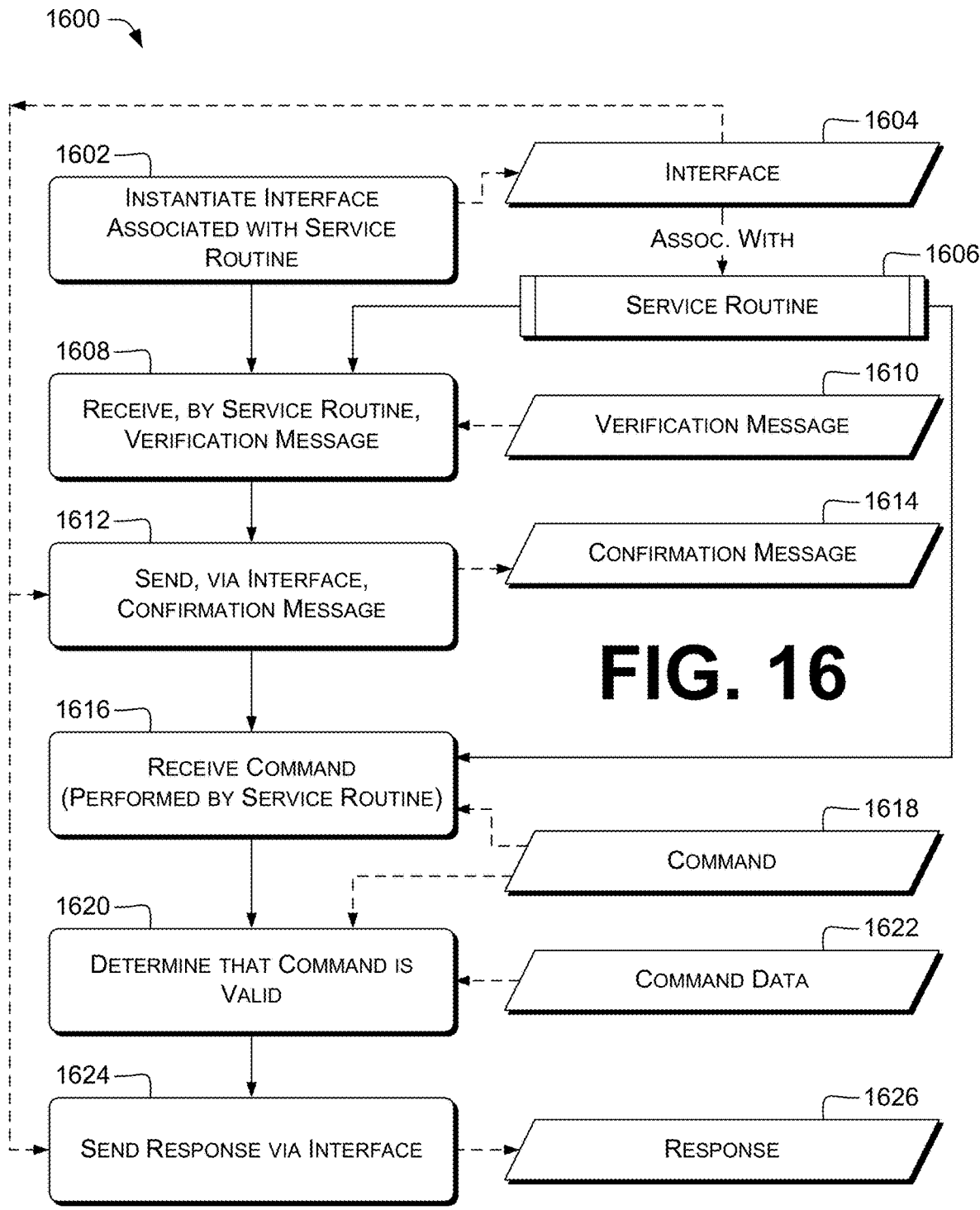
FIG. 16 is a dataflow diagram that illustrates example techniques for providing an interface and communicating via the interface.

FIG. 16 is a dataflow diagram that illustrates an example technique 1600 for providing an interface and communicating via the interface, and related dataflow (shown dashed for clarity). In some examples, technique 1600 can be performed by a control unit, as described herein, e.g., of a computing device 200. For example, technique 1600 can be performed by first driver 226, 604 or another provider of an interface 260, 262, 264. Some examples include at least one CRM carrying processor-executable instructions of a provider module such as first driver 226, 604 or second driver 228, the instructions executable to cause one or more processing units 210 to perform technique 1600 (and likewise techniques 1700 and 1800).

At 1602, the control unit can instantiate an interface 1604 (which can represent interface 260, 262, 264, or 1004) associated with the provider module. Examples are discussed herein, e.g., with reference to operation 1002. Interface 1604 can be associated with a service routine 1606.

At 1608, the control unit can receive, by a service routine 1606 (which can represent service routine 1006) of the provider module, a verification message 1610 (which can represent verification message 1010) associated with the interface 1604. Examples are discussed herein, e.g., with reference to operation 1008.

At 1612, the control unit can send a confirmation message 1614 (which can represent confirmation message 1014) via the interface 1604. Operation 1612 can be performed in response to operation 1608. Examples are discussed herein, e.g., with reference to operation 1012.

At 1616, the control unit can receive, by the service routine 1606, a command 1618 (which can represent command 1204) associated with the interface 1604. Operation 1616 can be performed after or in response to operation 1612. Examples are discussed herein, e.g., with reference to operation 1202.

At 1620, the control unit can determine that the command 1618 is a valid command based at least in part on stored command data 1622 (which can represent command data 1208). Examples are discussed herein, e.g., with reference to operation 1206.

At 1624, the control unit can send, via the interface, a response 1626 (which can represent response 1212) to the command 1618. Examples are discussed herein, e.g., with reference to operation 1210.

Figure 17:
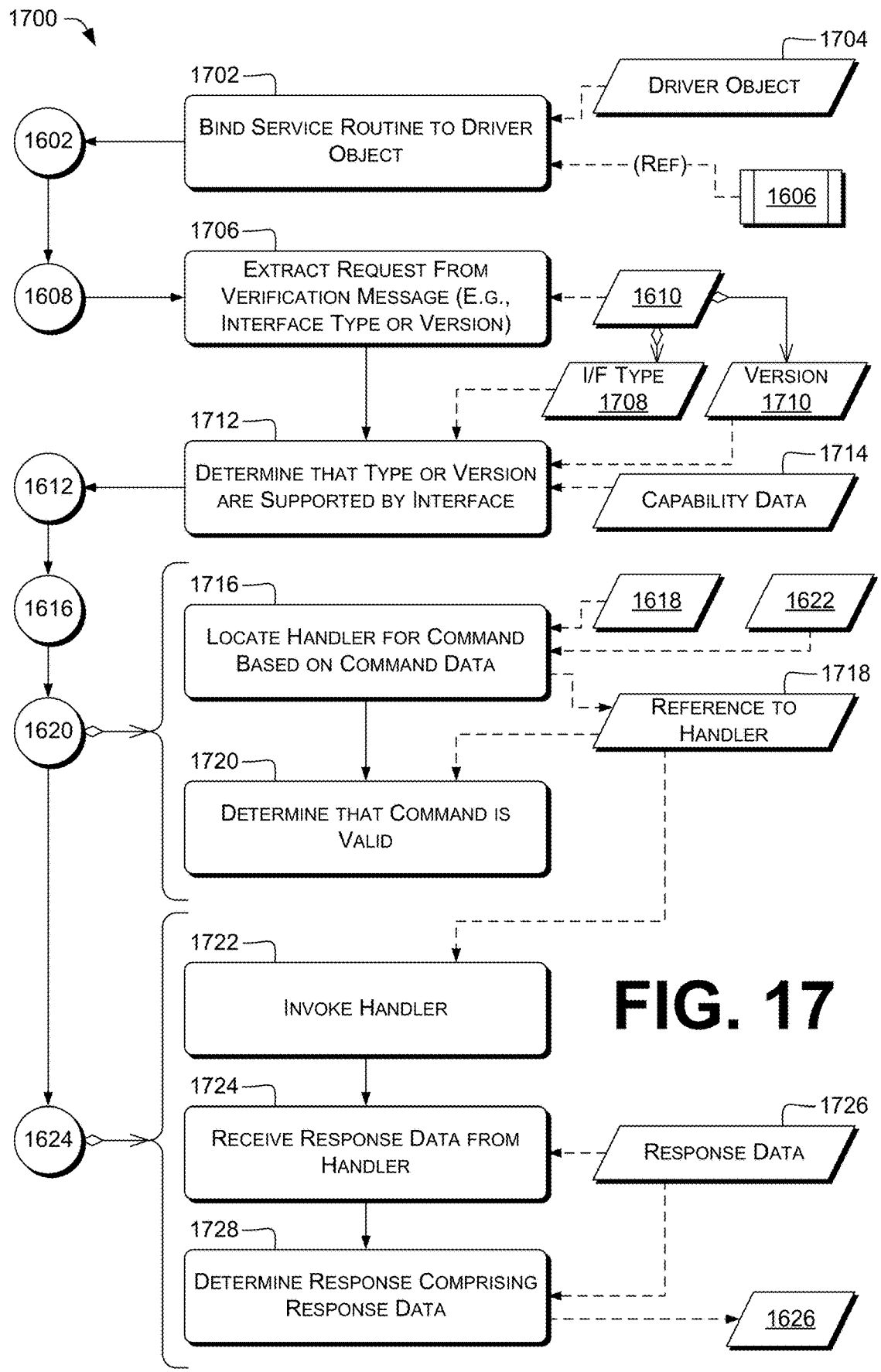
FIG. 17 is a dataflow diagram that illustrates example techniques for providing an interface and communicating via the interface.

FIG. 17 is a dataflow diagram that illustrates example techniques 1700 for providing an interface and communicating via the interface, and related dataflow (shown dashed for clarity). In some examples, techniques 1700 can be performed by a control unit, as described herein, e.g., of a computing device 200. For example, techniques 1700 can be performed by first driver 226 or another provider module. In some examples, operation 1702 precedes operation 1602; operation 1608 is followed by operation 1706; operation 1712 precedes operation 1612; operation 1620 includes operations 1716 and 1720; or operation 1624 includes or is preceded by any of operations 1722, 1724, or 1728.

At 1702, the control unit can bind, in response to loading of the provider module (e.g., first driver 226), the service routine 1606 to a driver object 1704. For example, in a DriverEntry( ) routine provided by the provider module, the control unit can load a ref to service routine 1606 into a member of a DRIVER_OBJECT structure (or other driver object 1704) corresponding with an operation to be handled by service routine 1606 (e.g., read, write, ioctl, or PnP). Additionally or alternatively, the control unit can load the ref to service routine 1606 into an NPI dispatch table, COM interface instance, or other table accessible via a query-functions operation associated with driver object 1704. Examples are discussed herein, e.g., with reference to service routine 1006. Operation 1702 can additionally or alternatively include storing a ref to an AddDevice routine into the DRIVER_OBJECT's DriverExtension member, or otherwise storing a ref to a per-device initialization routine where bus manager 222 can access it.

In some examples, operation 1702 can be followed by operation 1602. Operation 1602 can include, after binding the service routine 1606, instantiating the interface 1604 associated with the driver object 1704. This can permit OS 220 to route messages on interface 1604 via driver object 1704 to service routine 1606. For example, operation 1602 can be performed by an AddDevice routine or other per-device initialization routine. Separating operations 1702 and 1602 can permit loading modules such as drivers 226 and 246 in either relative order, while still permitting discovery of, and communication via, interface 1604.

At 1706, the control unit can extract from the verification message 1610 a request, e.g., at least one of an interface type 1708 (which can represent interface type 1110) or a version 1710 (which can represent version 1112). For example, the control unit can parse the request out of at least a portion of the verification message 1610 using a parser for type-length-value (TLV) formats, tagged formats such as XML, or custom data formats (e.g., packed binary). Example formats include ASN.1 serializations, GOOGLE protobufs, JSON records, XML documents or subtrees, associative arrays, or other forms of tagged or key-value storage. Operation 1706 can additionally or alternatively include uncompressing, decrypting, or otherwise transforming verification message 1610 to determine the request. Operation 1706 can additionally or alternatively include computing checksums of verification message 1610 or otherwise validating verification message 1610 itself.

At 1712, the control unit can determine that the request is supported by the interface 1604 based at least in part on stored capability data 1714 (which can represent capability data described herein with reference to FIG. 2). The capability data 1714 can include, e.g., a list or range of supported interface type(s) or version(s). Examples are discussed herein, e.g., with reference to operation 1506. For example, the request can specify a version 1710, and the capability data 1714 can specify a minimum or maximum version, or a range of versions, supported by the interface 1604. Operation 1712 can include determining that the version 1710 is at least the minimum, at most the maximum, or within the range. Operation 1712 can be followed by operation 1612.

At 1716, the control unit can locate a handler 1718 for command 1618 based at least in part on the stored command data 1622. In some examples, as shown, the control unit determines a ref to handler 1718. In some examples, the control unit can index into, or lookup a value in, command data 1622 based on a command index or identifier in command 1618, and retrieve the ref. In some examples, in addition to or as an alternative to a command index or identifier, the control unit can compare interface types, versions, parameters, or other values to command data 1622 to locate a handler 1718. This can permit, for example, multi-dispatch scenarios in which a single command index or identifier maps to one of several different handlers (including handler 1718) depending on the parameters provided.

In some examples (omitted for brevity), if handler 1718 is not found, the control unit can respond to command 1618 with an error indication. The error indication can be transmitted or otherwise provided to the consumer in any of the ways described herein with reference to confirmation messages (e.g., as discussed herein with reference to operations 1012 or 1210).

At 1720, the control unit can determine that the command 1618 is a valid command in response to the locating of the handler 1718. That is, since the handler 1718 was located, the control unit can determine that the command 1618 is valid. In some examples, operation 1720 can also include validating parameter(s) in command 1618, e.g., by applying presence, type, or range checks to parameter(s) based on specifications given in command data 1622 of what constitute valid parameter(s).

At 1722, the control unit can invoke the handler 1718. This can be done, e.g., by an indirect function call or method call. Examples are discussed herein, e.g., with reference to service routine 1006.

At 1724, the control unit can receive, from the handler 1718, response data 1726. In some examples, the control unit can receive a return value from handler 1718. Additionally or alternatively, handler 1718 can load response data 1726 into a buffer. In some examples, handler 1718 provides other output in addition to response data 1726. Examples are discussed herein, e.g., with reference to service routine 1006 or operation 1012.

At 1728, the control unit can determine the response 1626 comprising the response data 1726. Examples are discussed herein, e.g., with reference to operation 1012; techniques for determining confirmation message 1014 can additionally or alternatively be used to determine response 1626. Operation 1728 can be followed by transmission of the response 1626, described herein with reference to operation 1624 (FIG. 16).

Figure 18:
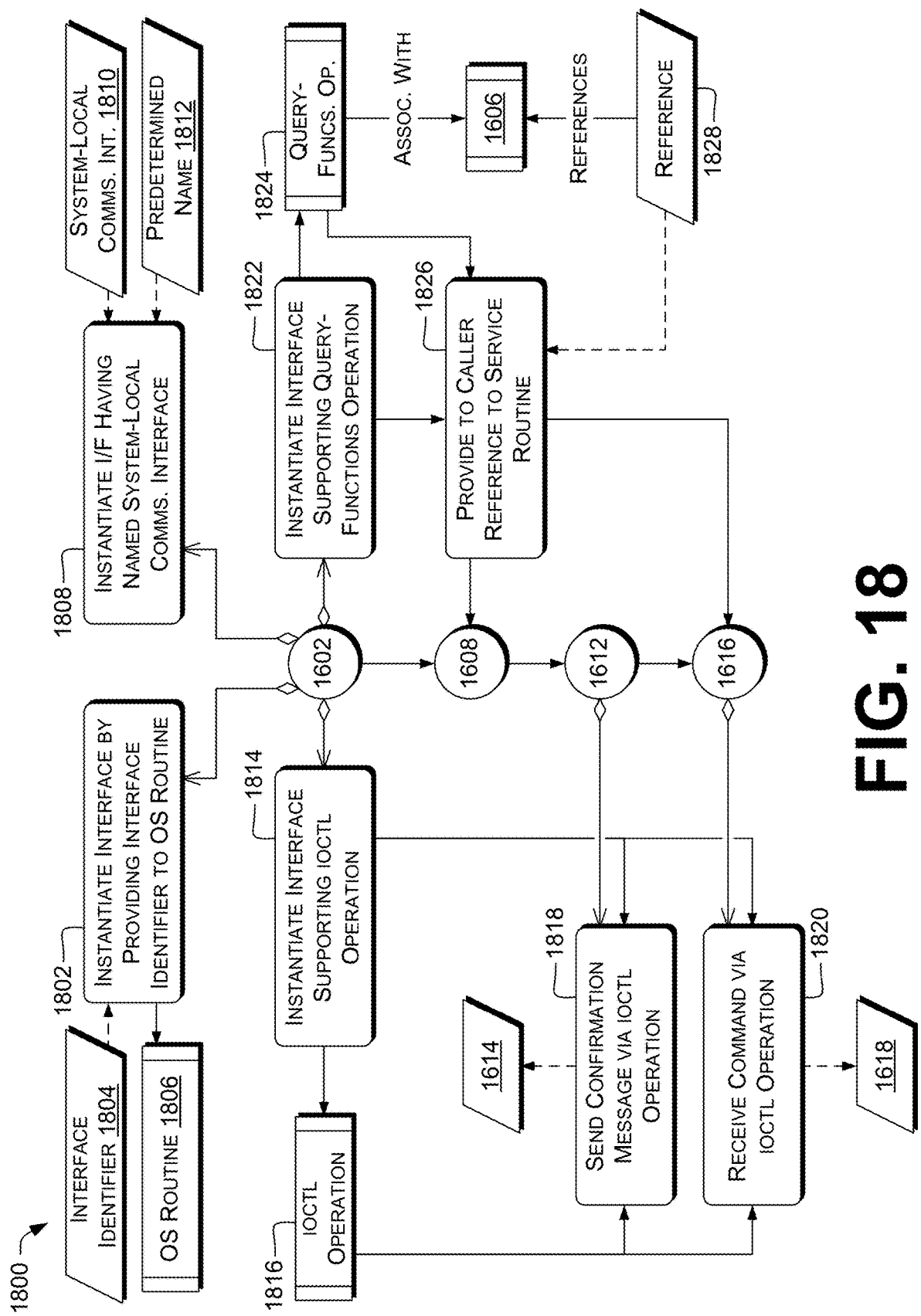
FIG. 18 is a dataflow diagram that illustrates example techniques for providing an interface and communicating via the interface.

FIG. 18 is a dataflow diagram that illustrates example techniques 1800 for providing an interface and communicating via the interface, and related dataflow (shown dashed for clarity). In some examples, techniques 1800 can be performed by a control unit, as described herein, e.g., of a computing device 200. For example, technique 1800 can be performed by first driver 226 or another provider module. In some examples, operation 1602 includes operation 1802, 1808, 1814, or 1822; operation 1826 precedes operation 1608; operation 1612 includes operation 1818; or operation 1616 includes operation 1820.

At 1802, the control unit can instantiate the interface 1604 at least partly by passing a predetermined interface identifier 1804 of the interface 1604 to an OS routine 1806 provided by OS 220 (e.g., IoRegisterDeviceInterface( )). Interface identifier 1804 can include, e.g., a device class interface GUID or other GUID, or another type of identifier herein (e.g., a D-Bus well-known bus name or object path). The OS routine 1806 can create the device or otherwise trigger the OS 220 to send device-available notifications to any registered consumers, in some examples.

At 1808, the control unit can instantiate the interface 1604 comprising a system-local communications interface 1810 (which can represent an OS-provided communications mechanism) associated with a predetermined name 1812. For example, the control unit can create or open a UNIX-domain socket or named pipe (system-local communications interface 1810) having a specific name 1812 in a filesystem, an Internet-domain socket (1810) bound to localhost and having a specific port number (1812); or a message queue, shared memory segment, or other IPC mechanism (e.g., POSIX or SysV) (1810) having a numeric or string key or ID (1812). Using an interface having a name 1812 can permit decoupling providers and consumers of interfaces, which can increase the robustness of each. Other examples are described herein with reference to operations 1522 and 1528.

At 1814, the control unit can instantiate the interface 1604 supporting an ioctl operation 1816. For example, the control unit can store, into a DRIVER_OBJECT structure associated with interface 1604, dispatch routine(s) for IRP_MJ_DEVICE_CONTROL or IRP_MJ_INTERNAL_DEVICE_CONTROL. Additionally or alternatively, the control unit can load a file operations structure with a handler for ioctl( )s. Examples are discussed herein, e.g., with reference to service routine 1006. Operation 1814 can be followed by at least one of operation 1818 or 1820.

At 1818, the control unit can send the confirmation message 1614 via the ioctl operation 1816. For example, the control unit can receive an ioctl request from the consumer, and respond via a return value or output buffer of the ioctl operation. Examples are discussed herein, e.g., with reference to service routine 1006 or operations 1008 or 1012.

At 1820, the control unit can receive the command 1618 via the ioctl operation 1816. For example, the control unit can receive an ioctl request from the consumer, and the ioctl request can include data of the command 1618. Examples are discussed herein, e.g., with reference to service routine 1006 or operations 1202 or 1210.

At 1822, the control unit can instantiate the interface 1604 supporting a query-functions operation 1824 associated with the service routine 1606. For example, the control unit can load, into a DRIVER_OBJECT structure associated with interface 1604, a dispatch routine for IRP_MJ_PNP, and that dispatch routine can be configured to support IRP_MN_QUERY_INTERFACE requests by responding with a structure including a ref to service routine 1606. Additionally or alternatively, the query-functions operation 1824 can be a COM/DCOM CoCreateInstance( ) call, and operation 1822 can include registering a GUID of an interface supporting the service routine 1606 in registry 258 (or configuration datastore 402 or 620) so that CoCreateInstance( ) can create instances supporting that interface (or corresponding operations for other object systems). Additionally or alternatively, the query-functions operation 1824 can be an interface-request call in another object system, e.g., CORBA or D-BUS, or another function call that returns a vtable pointer or other pointer to a function table or object instance including or supporting service routine 1606. Examples are discussed herein, e.g., with reference to service routine 1006 or operation 1002 or 1514.

At 1826, the control unit can provide a ref 1828 to the service routine 1606. Operation 1826 can be performed in response to invocation by a caller of the query-functions operation 1824, and can provide the ref 1828 to the caller. For example, in response to receipt from a caller (e.g., a consumer such as third driver 246) of an IRP_MJ_PNP/IRP_MN_QUERY_INTERFACE IRP, or in response to receipt from OS 220 of an NMR ProviderAttachClient callback, the control unit can respond with a function table including ref 1828 to the service routine 1606 that the caller can invoke to send data to the provider (e.g., first driver 226). Operation 1826 can be followed by operation 1608 or 1616, as the caller can invoke the service routine 1606 using ref 1828. Examples are discussed herein, e.g., with reference to operations 1002 or 1008.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A system, comprising: at least one processing unit; a volatile memory comprising at least one tangible, non-transitory volatile computer-readable medium; and a non-volatile (nonV) memory communicatively connected with the at least one processing unit and comprising at least one tangible, non-transitory non-volatile computer-readable medium; wherein the volatile memory comprises: a first driver; and wherein the nonV memory comprises: a driver-configuration file; a driver store comprising a first copy of a second driver, the second driver being different from the first driver; and an installed-driver backing store comprising a second copy of the second driver.

B: The system according to paragraph A, wherein: the second driver stored in the nonV memory comprises executable instructions that, when executed by the at least one processing unit, cause the at least one processing unit to perform second-driver operations; the second-driver operations comprise writing at least one driver-configuration entry to a configuration datastore; and the driver-configuration file excludes the driver-configuration entry.

C: The system according to paragraph A or B, wherein: the first driver comprises an earlier version of a particular driver; the second driver comprises a later version of the particular driver; and the driver-configuration file omits a non-chronological version identifier distinguishing the second driver from the first driver.

D: The system according to paragraph C, wherein the non-chronological version identifier comprises at least one of an interface type or an interface version.

E: The system according to any of paragraphs A-D, wherein: the first driver comprises executable instructions that, when executed by the at least one processing unit, cause the at least one processing unit to perform first-driver operations; the second driver stored in the nonV memory comprises executable instructions that, when executed by the at least one processing unit, cause the at least one processing unit to perform second-driver operations; the second-driver operations comprise: receiving a second-driver request (e.g., via an interface, FIGS. 10-18); determining that the second-driver request specifies a second-driver version identifier; and at least partly in response to the second-driver version identifier, sending a second-driver success response (e.g., via the interface, FIGS. 10-18); and the first-driver operations comprise: receiving a first-driver request (e.g., via the interface, FIGS. 10-18); determining that the first-driver request specifies the second-driver version identifier; and at least partly in response to the second-driver version identifier, sending a first-driver failure response (e.g., via the interface, FIGS. 10-18).

F: The system according to any of paragraphs A-E, wherein: the first driver comprises a first Plug-and-Play (PnP) driver; the second driver comprises a second PnP driver; the volatile memory further comprises a third, non-PnP driver; the driver store further comprises a copy of a fourth, non-PnP driver; the second driver comprises executable instructions that, when executed by the at least one processing unit, cause the at least one processing unit to perform second-driver operations; the fourth driver comprises executable instructions that, when executed by the at least one processing unit, cause the at least one processing unit to perform fourth-driver operations; the fourth-driver operations comprise transmitting a request; and the second-driver operations comprise receiving the request.

Fprime: The system according to paragraph 1, wherein: the first driver comprises a first Plug-and-Play (PnP) driver; the second driver comprises a second PnP driver; the volatile memory further comprises a third root-enumerated PnP driver; the driver store further comprises a copy of a fourth, root-enumerated PnP driver; the second driver comprises executable instructions that, when executed by the at least one processing unit, cause the at least one processing unit to perform second-driver operations; the fourth driver comprises executable instructions that, when executed by the at least one processing unit, cause the at least one processing unit to perform fourth-driver operations; the fourth-driver operations comprise transmitting a request; and the second-driver operations comprise receiving the request.

G: The system according to paragraph F or Fprime, wherein the installed-driver backing store comprises a second copy of the fourth, non-PnP driver.

H: The system according to any of paragraphs A-G, wherein: the first driver comprises a first Plug-and-Play (PnP) driver; the second driver comprises a second PnP driver; the volatile memory further comprises a third driver; the first driver comprises executable instructions that, when executed by the at least one processing unit, cause the at least one processing unit to perform first-driver operations; the second driver comprises executable instructions that, when executed by the at least one processing unit, cause the at least one processing unit to perform second-driver operations; the third driver comprises executable instructions that, when executed by the at least one processing unit, cause the at least one processing unit to perform third-driver operations; the first-driver operations comprise: processing a request indicating a first interface version; and rejecting a request indicating a second interface version different from the first interface version; the second-driver operations comprise processing a request indicating the second interface version; and the third-driver operations comprise: transmitting a request indicating the second interface version; receiving a rejection of the request; and in response to the rejection, transmitting a second request indicating the first interface version.

I: The system according to any of paragraphs A-H, wherein: the first driver comprises executable instructions that, when executed by the at least one processing unit, cause the at least one processing unit to perform first-driver operations; and the first-driver operations comprise: receiving a PnP device-state query; and responding to the query with a hide-device flag.

J: The system according to any of paragraphs A-I, the nonV memory comprising executable instructions that, when executed by the at least one processing unit, cause the at least one processing unit to: reboot the system; after reboot, load the first copy of the second driver from the driver store of the nonV memory into the volatile memory to provided a loaded second driver; and subsequently, activate the loaded second driver in the volatile memory.

K: The system according to any of paragraphs A-J, wherein the volatile memory excludes operating-system data indicating that a reboot is required.

L: A method, comprising performing the first-driver operations recited in any of paragraphs A-K.

M: A method, comprising performing the second-driver operations recited in any of paragraphs A-L.

N: A method, comprising performing the third-driver operations recited in any of paragraphs A-M.

O: A method, comprising performing the fourth-driver operations recited in any of paragraphs A-N.

P: A method comprising, by at least one processing unit: determining that a first driver is loaded in a volatile memory communicatively connected with the at least one processing unit; subsequently, performing installation operations comprising: installing at least a portion of a second driver to an installed-driver backing store on a non-volatile (nonV) memory; and replacing the first driver in a driver store of the nonV memory with the second driver without replacing the first driver in the volatile memory with the second driver; subsequently, determining that the second driver has been loaded into the volatile memory; and writing, by the second driver loaded into the volatile memory, a driver-configuration entry in a configuration datastore.

Q: The method according to paragraph P, further comprising, by the at least one processing unit: responding, by the first driver and before determining that the second driver has been loaded into the volatile memory, to a first request indicating a first interface version; and responding, by the second driver loaded into the volatile memory, to a second request indicating a second, different interface version.

R: The method according to paragraph P or Q, further comprising, by the at least one processing unit, after performing the installation operations and before determining that the second driver has been loaded into the volatile memory: detecting failure of a second installation operation; and rolling back the installation operations.

S: The method according to any of paragraphs P-R, further comprising, by the at least one processing unit, after performing the installation operations and before determining that the second driver has been loaded into the volatile memory, installing a software module different from the second driver.

T: The method according to any of paragraphs P-S, the replacing comprising, by the at least one processing unit, requesting a driver update by invoking an operating system service routine.

U: The method according to any of paragraphs P-T, further comprising performing at least one of the installation operations based at least in part on a driver-configuration file, wherein the driver-configuration file excludes the driver-configuration entry.

V: The method according to any of paragraphs P-U, further comprising performing the writing after a reboot that followed the performing the installation operations.

W: The method according to any of paragraphs P-V, further comprising writing, by the third driver loaded into the volatile memory, at least one of an interface type or an interface version.

X: The method according to any of paragraphs P-W, the replacing the first driver in the driver store of the nonV memory with the second driver being performed without updating at least one driver-configuration entry associated with the first driver.

Y: A method comprising, by at least one processing unit: attempting to perform two or more installation operations of a predetermined operation sequence, the installation operations comprising first installation operations for: installing at least a portion of a replacement driver to an installed-driver backing store on a non-volatile (nonV) memory, the nonV memory communicatively connected with the at least one processing unit; and installing the replacement driver in a driver store of the nonV memory without replacing a superseded driver in a volatile memory with the replacement driver, wherein the volatile memory is communicatively connected with the at least one processing unit; detecting failure of a trigger operation of the two or more installation operations; in response to the detecting, selecting at least one installation operation preceding the trigger operation in the predetermined operation sequence; and rolling back the selected at least one installation operation.

Z: The method according to paragraph Y, wherein: the installation operations comprise second installation operation(s) for uninstalling the superseded driver from the nonV memory; the second installation operation(s) precede the first installation operations in the predetermined operation sequence; the second installation operation(s) precede the trigger operation in the predetermined operation sequence; the selecting comprises selecting at least the second installation operation(s); and the rolling back the first installation operation(s) comprises installing the superseded driver to the nonV memory.

AA: The method according to paragraph Z, wherein the installation operations exclude operations for writing driver-configuration entries to a configuration datastore AB: The method according to any of paragraphs Y-AA, wherein: the method further comprises, by the at least one processing unit: completing an earlier installation operation of the two or more installation operations; and subsequently, completing a later installation operation of the two or more installation operations; and the rolling back comprises: rolling back the later installation operation; and subsequently, rolling back the earlier installation operation.

AC: The method according to any of paragraphs Y-AB, the installing the replacement driver in a driver store of the nonV memory being performed without updating at least one driver-configuration entry associated with the superseded driver.

AD: As any of the preceding, wherein the command does not identify an interface type, does not identify a version, or identifies neither an interface type nor a version.

AE: Any of the preceding, further comprising taking a mitigation action (e.g., paras. [0049]-[0050]) against an enumerated-bus device in response to policy information received via the interface.

AF: Any of the preceding, wherein the reboot comprises a warm boot.

AG: Any of the preceding, wherein sending requests or replies, receiving requests or replies, or communicating via interfaces is carried out using techniques described herein with reference to FIGS. 10-18 or paragraphs AH-BD.

AH: A system comprising at least one processing unit, wherein: the system further comprises at least one tangible non-transitory computer-readable storage medium comprising first processor-executable instructions and second processor-executable instructions; the first processor-executable instructions are executable by the at least one processing unit to cause the at least one processing unit to perform first operations comprising: instantiating an interface associated with a service routine; receiving, by the service routine, a verification message; and sending, in response, a confirmation message via the interface; and the second processor-executable instructions are executable by the at least one processing unit to cause the at least one processing unit to perform second operations comprising: locating the interface; opening a handle to the interface; sending the verification message via the handle, the verification message identifying at least an interface type or a version; and receiving, via the handle, the confirmation message associated with the verification message.

AI: The system according to paragraph AH, wherein: the first operations further comprise: receiving, by the service routine, a command; determining that the command is a valid command based at least in part on stored command data associated with the interface; and sending, via the interface, a response to the command; and the second operations further comprise: sending, via the handle, the command; and receiving, via the handle, the response to the command.

AJ: The system according to paragraph AH or AI, the second operations further comprising: determining that the interface is not available; and subsequently, awaiting availability of the interface.

AK: The system according to any of paragraphs AH-AJ, wherein: the first processor-executable instructions are associated with a first driver; the second processor-executable instructions are associated with a second driver; and at least one of the first driver and the second driver is a Plug and Play (PnP) driver.

AL: A computer-implemented method comprising: locating an interface; opening a handle to the interface; sending a verification message via the handle, the verification message comprising at least an interface type or a version; and receiving, via the handle, a confirmation message associated with the verification message.

AM: The computer-implemented method according to paragraph AL, the locating comprising: determining that the interface is not available; and subsequently, awaiting availability of the interface.

AN: The computer-implemented method according to paragraph AM, the awaiting comprising at least: awaiting, in a user mode, a WM_DEVICECHANGE message; or awaiting, in a kernel mode, a call to a registered notification callback.

AO: The computer-implemented method according to paragraph AM or AN, wherein the verification message is sent by an interaction thread and the awaiting comprises at least, in a kernel mode: spawning a notification thread; in the interaction thread, waiting for a synchronization signal; registering a notification callback to be executed in the notification thread when the interface becomes available; and subsequently, providing, by the notification callback, the synchronization signal.

AP: The computer-implemented method according to any of paragraphs AL-AO, wherein: the locating is performed by an interaction thread; the interaction thread runs in a mode selected from the group consisting of a user mode and a kernel mode; and the locating comprises enumerating active device instances associated with a predetermined interface identifier at least partly by calling an enumeration routine associated with the mode of the interaction thread.

AQ: The computer-implemented method according to any of paragraphs AL-AP, further comprising, after the opening and before the sending: retrieving a persistent property associated with the interface, the persistent property selected from the group consisting of an interface version and an interface type; and determining that the persistent property matches the corresponding one of the interface type and the version.

AR: The computer-implemented method according to any of paragraphs AL-AQ, wherein: the interface supports an ioctl operation; and the method further comprises sending the verification message via the ioctl operation.

AS: The computer-implemented method according to any of paragraphs AL-AR, wherein: the sending is performed by an interaction thread running in a kernel mode; the interface supports a query-functions operation; the method comprises retrieving from the interface, using the query-functions operation, a reference to a routine; and the method further comprises sending the verification message by invoking the routine.

AT: The computer-implemented method according to any of paragraphs AL-AS, further comprising: opening a system-local communications interface using a predetermined name of the system-local communications interface; and sending the verification message via the system-local communications interface.

AU: At least one tangible non-transitory computer-readable storage medium comprising processor-executable instructions of a provider module, the processor-executable instructions executable by at least one processing unit to cause the at least one processing unit to perform operations comprising: instantiating an interface associated with the provider module; receiving, by a service routine of the provider module, a verification message associated with the interface; sending, in response, a confirmation message via the interface; subsequently, receiving, by the service routine, a command associated with the interface; determining that the command is a valid command based at least in part on stored command data; and sending, via the interface, a response to the command.

AV: The at least one tangible, non-transitory computer-readable medium as recited in paragraph AU, the operations comprising: in response to loading of the provider module, binding the service routine to a driver object; and instantiating the interface after binding the service routine, the interface associated with the driver object.

AW: The at least one tangible, non-transitory computer-readable medium as recited in paragraph AU or AV, the operations comprising, before sending the confirmation message, extracting from the verification message at least one of an interface type or a version; and determining that the at least one of the interface type or the version is supported by the interface based at least in part on stored capability data.

AX: The at least one tangible non-transitory computer-readable storage medium according to any of paragraphs AU-AW, the operations further comprising: locating a handler for the command based at least in part on the stored command data; determining that the command is a valid command in response to the locating of the handler; invoking the handler; receiving, from the handler, response data; and determining the response comprising the response data.

AY: The at least one tangible non-transitory computer-readable storage medium according to any of paragraphs AU-AX, the operations further comprising instantiating the interface at least partly by passing a predetermined interface identifier of the interface to an operating-system routine.

AZ: The at least one tangible non-transitory computer-readable storage medium according to any of paragraphs AU-AY, the operations comprising: instantiating the interface supporting an ioctl operation; and at least: sending the confirmation message via the ioctl operation; or receiving the command via the ioctl operation.

BA: The at least one tangible non-transitory computer-readable storage medium according to any of paragraphs AU-AZ, the operations comprising: instantiating the interface supporting a query-functions operation associated with the service routine; and in response to invocation by a caller of the query-functions operation, providing to the caller a reference to the service routine.

BB: The at least one tangible non-transitory computer-readable storage medium according to any of paragraphs AU-BA, the operations comprising instantiating the interface comprising a system-local communications interface associated with a predetermined name.

BC: As any of paragraphs AI-AK or AU-BB, wherein the command does not identify an interface type, does not identify a version, or identifies neither an interface type nor a version.

BD: Any of paragraphs AH-AK, AL-AT, or AU-BB, further comprising taking a mitigation action against an enumerated-bus device in response to policy information received via the interface.

BE: A computer-readable medium, e.g., a computer storage medium, having thereon computer-executable instructions, the computer-executable instructions upon execution configuring a computer to perform operations as any of paragraphs A-K, L, M, N, O, P-X, Y-AC, AD, AE, AF, AG, AH-AK, AL-AT, AU-BB, BC, or BD recites.

BF: A device comprising: at least one processing unit; and a computer-readable medium, e.g., a computer storage medium, having thereon computer-executable instructions, the computer-executable instructions upon execution by the at least one processing unit configuring the device to perform operations as any of paragraphs A-K, L, M, N, O, P-X, Y-AC, AD, AE, AF, AG, AH-AK, AL-AT, AU-BB, BC, or BD recites.

BG: A system comprising: means for processing; and means for storing having thereon computer-executable instructions, the computer-executable instructions including means to configure the system to carry out a method as any of paragraphs A-K, L, M, N, O, P-X, Y-AC, AD, AE, AF, AG, AH-AK, AL-AT, AU-BB, BC, or BD recites.

BH: Any of the preceding, wherein the non-PnP driver is a WDM driver.

CONCLUSION

Various examples provide control of system reboot timing without requiring modifications to the operating system. Various examples provide uninstall-before-install semantics of module updates so that only one version of a particular system component is installed at any given time. Various examples maintain consistency between installed modules (e.g., drivers) and configuration information associated with those modules, reducing the chance of incorrect system behavior due to race conditions during parallel usage and updating of a component. Various examples provide combinations of any or all of these. Some examples permit a security agent to monitor or control enumerated-bus devices. Some examples perform these functions even in systems that do not include enumerated busses or enumerated-bus devices. Various examples permit performing upgrading, downgrading, rollback, or other update or installation operations with respect to security software modules without interrupting the functionality of those modules.

Some examples may provide any of, or none of, the benefits listed herein, or other benefits. The claims are not limited to examples providing the benefits described above, and at least one embodiment within the scope of the claims may not provide any of the benefits described above. Furthermore, the claimed subject matter is not limited to implementations that solve any or all disadvantages noted in any part of this disclosure.

The "Overview" section above is intended only to provide a brief overview of subject matter disclosed herein according to one or more illustrative embodiments, and does not serve as a guide to interpreting the claims or to define or limit scope. The Overview is provided to introduce illustrative features in a simplified form; these features are further described in the sections following the Overview. The Overview is not intended to identify key features or essential features of the claimed subject matter, nor is it intended to be used as an aid in determining the scope of the claimed subject matter. The claimed subject matter is not limited to implementations that solve any or all disadvantages noted herein. The claimed subject matter is not limited to implementations that provide at least one of the results listed herein. Subsection headers in the Detailed Description are solely for convenience in reading. Some examples include features from only one subsection. Some examples include features from more than one subsection.

The word "or" and the phrase "or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," or any of those phrases with "or" substituted for "or," unless specifically stated otherwise, is to be understood as signifying that an item, term, etc. can be either X, or Y, or Z, or a combination of any elements thereof (e.g., a combination of XY, XZ, YZ, or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" is synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

Although some features and examples herein have been described in language specific to structural features or methodological steps, it is to be understood that the appended claims are not necessarily limited to the specific features or steps described herein. Rather, the specific features and steps are disclosed as preferred forms of implementing the claimed examples. For example, computing devices 102 or 104, network 108, processing units 210, or other structures described herein for which multiple types of implementing devices or structures are listed can include any of the listed types, or multiples or combinations thereof.

Moreover, this disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method," "methods," "technique," "techniques," and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

Some operations of example techniques or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described techniques. For example, in alternative implementations included within the scope of the examples described herein, elements or functions can be deleted, or executed out of order from that shown or discussed, including substantially synchronously or in reverse order. In some examples, combinations of the described functions can be performed in batch, in a streamed or pipelined manner, or in any combination of batch, stream, and pipelined processing. In each flow diagram, fewer than all of the depicted operations can be performed, except as expressly noted.

Each illustrated block (e.g., the operations in each of FIGS. 6-18) can represent one or more operations that can be implemented in hardware, software, or a combination thereof. In the context of software, the operations described herein represent computer-executable instructions stored on at least one computer-readable medium (e.g., computer storage medium) that, when executed by one or more processing units, cause or enable the one or more processing units to perform the recited operations. In the context of hardware, the operations represent logic functions implemented in circuitry, e.g., datapath-control and finite-state-machine sequencing functions. Therefore, descriptions of operations herein also describe such software or hardware structures to carry out the described functions. Generally, computer-executable instructions include routines, programs, objects, modules, code segments, components, data structures, and the like that perform particular functions or implement particular abstract data types.

Accordingly, the methods, techniques, or operations described above can be embodied in, and fully automated via, software code modules executed by one or more computers or processing units. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality or similar functionality can be arranged differently (e.g., combined into a smaller number of modules, broken into a larger number of modules, etc.). In some instances, the functionality or modules discussed herein may be implemented as part of a computer operating system (OS) 220. In other instances, the functionality or modules may be implemented as part of a device driver, firmware, application, or other software subsystem.

What is claimed is:

1. A system, comprising:
   at least one processing unit;
   a volatile memory comprising at least one tangible, non-transitory volatile computer-readable medium, wherein the volatile memory comprises a first driver; and
   a non-volatile (nonV) memory communicatively connected with the at least one processing unit and comprising at least one tangible, non-transitory non-volatile computer-readable medium, wherein the nonV memory comprises:
      a driver store comprising a first copy of a second driver, the second driver being a different version of the first driver; and
      an installed-driver backing store comprising a second copy of the second driver,
   wherein an operating system of the system is configured to prompt a reboot of the system to update a driver based on a determination that the driver store and the installed-driver backing store include different versions of the driver, and
   wherein the first copy of the second driver in the driver store and the second copy of the second driver in the installed-driver backing store cause the operating system to avoid prompting the reboot of the system to update the first driver.

2. The system according to claim 1, wherein:
   the nonV memory further comprises a driver-configuration file that excludes at least one driver-configuration entry associated with the second driver, and
   the second driver stored in the nonV memory comprises executable instructions that, when executed by the at least one processing unit, cause the at least one processing unit to write the at least one driver-configuration entry to a configuration datastore.

3. The system according to claim 2, wherein:
   the driver-configuration file omits a non-chronological version identifier distinguishing the second driver from the first driver.

4. The system according to claim 3, wherein the non-chronological version identifier comprises at least one of an interface type or an interface version.

5. The system according to claim 1, wherein:
   the first driver comprises first executable instructions that, when executed by the at least one processing unit, cause the at least one processing unit to perform first-driver operations;
   the second driver stored in the nonV memory comprises second executable instructions that, when executed by the at least one processing unit, cause the at least one processing unit to perform second-driver operations;
   the second-driver operations comprise:
      receiving a second-driver request;
      determining that the second-driver request specifies a second-driver version identifier; and
      at least partly in response to determining that the second-driver request specifies the second-driver version identifier, sending a second-driver success response; and
   the first-driver operations comprise:
      receiving a first-driver request;
      determining that the first-driver request specifies the second-driver version identifier; and
      at least partly in response to determining that the first-driver request specifies the second-driver version identifier, sending a first-driver failure response.

6. The system according to claim 1, wherein:
   the first driver and the second driver are different versions of a Plug-and-Play (PnP) driver;
   the volatile memory further comprises a third driver, the third driver being a first version of a non-PnP driver or a root-enumerated PnP driver that is configured to communicate with at least one of the first driver or the second driver;
   the driver store further comprises a copy of a fourth driver, the fourth driver being a second version of the non-PnP driver or the root-enumerated PnP driver;

the fourth driver comprises first executable instructions that, when executed by the at least one processing unit after a system reboot that removes the first driver and the third driver from the volatile memory and that causes the second driver and the fourth driver to be loaded into the volatile memory from the driver store, cause the at least one processing unit to transmit a request to the second driver; and the second driver comprises second executable instructions that, when executed by the at least one processing unit after the system reboot, cause the second driver to receive the request.

7. The system according to claim 1, wherein:

the first driver comprises a first version of a Plug-and-Play (PnP) driver that is configured to:
process a first request that indicates a first interface version associated with the first driver; and
reject a second request that indicates a second interface version associated with the second driver;

the second driver comprises a second version of the PnP driver that is configured to process the second request that indicates the second interface version; and the volatile memory further comprises a third driver comprising executable instructions that, when executed by the at least one processing unit, cause the at least one processing unit to:
transmit the second request indicating the second interface version;
receive a rejection of the first request from the first driver; and
in response to the rejection, transmit the first request indicating the first interface version.

8. The system according to claim 1, wherein:

the first driver comprises executable instructions that, when executed by the at least one processing unit, cause the at least one processing unit to perform first-driver operations; and the first-driver operations comprise:
receiving a PnP device-state query; and
responding to the PnP device-state query with a hide-device flag.

9. The system according to claim 1, the nonV memory comprising executable instructions that, when executed by the at least one processing unit, cause the at least one processing unit to:
load, after a system reboot, the first copy of the second driver from the driver store of the nonV memory into the volatile memory to provide a loaded second driver; and
activate the loaded second driver in the volatile memory.

10. A method comprising:

determining, by at least one processing unit, that a first driver is loaded in a volatile memory communicatively connected with the at least one processing unit;

installing, by the at least one processing unit subsequent to determining that the first driver is loaded in the volatile memory, at least a portion of a second driver to an installed-driver backing store on a non-volatile (nonV) memory, wherein the second driver is a different version of the first driver;

replacing, by the at least one processing unit subsequent to determining that the first driver is loaded in the volatile memory, the first driver in a driver store of the nonV memory with the second driver, without replacing the first driver in the volatile memory with the second driver prior to a system reboot;

determining, by the at least one processing unit, that the second driver has been loaded into the volatile memory from the nonV memory following the system reboot; and writing, by the at least one processing unit in response to determining that the second driver has been loaded into the volatile memory, a driver-configuration entry in a configuration datastore.

11. The method according to claim 10, further comprising:
responding, by the at least one processing unit based on the first driver and before determining that the second driver has been loaded into the volatile memory, to a first request indicating a first interface version associated with the first driver; and
responding, by the at least one processing unit based on the second driver and after determining that the second driver has been loaded into the volatile memory, to a second request indicating a second interface version associated with the second driver.

12. The method according to claim 10, further comprising, after installing the at least the portion of the second driver to the installed-driver backing store and replacing the first driver in the driver store with the second driver, and before determining that the second driver has been loaded into the volatile memory:
detecting, by the at least one processing unit, failure of a second installation operation associated with an additional driver; and
rolling back, by the at least one processing unit, the installing of the at least the portion of the second driver to the installed-driver backing store and the replacing of the first driver in the driver store with the second driver.

13. The method according to claim 10, further comprising, by the at least one processing unit, after installing the at least the portion of the second driver to the installed-driver backing store and replacing the first driver in the driver store with the second driver and before determining that the second driver has been loaded into the volatile memory, installing a software module different from the second driver.

14. The method according to claim 10, wherein the replacing comprises requesting, by the at least one processing unit, a driver update by invoking an operating system service routine.

15. The method according to claim 10, further comprising performing at least one of installing the at least the portion of the second driver to the installed-driver backing store or replacing the first driver in the driver store with the second driver based at least in part on a driver-configuration file, wherein the driver-configuration file excludes the driver-configuration entry.

16. The method according to claim 10, further comprising performing the writing after the system reboot.

17. A method comprising:

attempting, by at least one processing unit, to perform a predetermined operation sequence comprising:
a first installation operation comprising installing at least a portion of a replacement driver to an installed-driver backing store on a non-volatile (nonV) memory communicatively connected with the at least one processing unit; and
a second installation operation comprising installing the replacement driver in a driver store of the nonV memory, without replacing a superseded driver in a volatile memory with the replacement driver, wherein the volatile memory is communicatively connected with the at least one processing unit;

detecting, by the at least one processing unit, that a trigger operation of the predetermined operation sequence has failed;

in response to the detecting, selecting, by the at least one processing unit, at least one installation operation in the predetermined operation sequence that preceded the trigger operation; and rolling back, by the at least one processing unit, the at least one installation operation selected by the at least one processing unit.

18. The method according to claim 17, wherein:

the predetermined operation sequence further comprises, prior to the first installation operation and the second installation operation, an uninstallation operation comprising uninstalling the superseded driver from the nonV memory;

the uninstallation operation precedes the trigger operation in the predetermined operation sequence;

the selecting comprises selecting at least the uninstallation operation; and the rolling back comprises installing the superseded driver to the nonV memory.

19. The method according to claim 17, wherein:

the at least one processing unit completes at least two installation operations of the predetermined operation sequence; and the rolling back comprises rolling back the at least two installation operations in reverse order relative to an order in which the at least two installation operations were completed.

20. The system according to claim 8, wherein the hide-device flag further causes the operating system to avoid prompting the reboot of the system to update the first driver.

* * * * *